(12) United States Patent
Kashimoto et al.

(10) Patent No.: US 12,271,299 B2
(45) Date of Patent: Apr. 8, 2025

(54) DATA MANAGEMENT METHOD USING MULTIPLE EDGE DEVICES CONNECTED TO THE INTERNET

(71) Applicants: KABUSHIKI KAISHA TOSHIBA, Tokyo (JP); Toshiba Digital Solutions Corporation, Kawasaki (JP)

(72) Inventors: Shinichi Kashimoto, Shinagawa (JP); Keisuke Azuma, Chuo (JP); Yuji Chotoku, Ota (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 17/479,526

(22) Filed: Sep. 20, 2021

(65) Prior Publication Data
US 2022/0004487 A1      Jan. 6, 2022

Related U.S. Application Data

(60) Division of application No. 16/059,494, filed on Aug. 9, 2018, now abandoned, which is a continuation of
(Continued)

(30) Foreign Application Priority Data

Feb. 9, 2016   (JP) ................... 2016-022780

(51) Int. Cl.
*G06F 3/00*      (2006.01)
*G06F 3/06*      (2006.01)
*G06F 12/02*     (2006.01)

(52) U.S. Cl.
CPC ........ *G06F 12/0238* (2013.01); *G06F 3/0619* (2013.01); *G06F 3/0649* (2013.01); *G06F 3/0653* (2013.01); *G06F 3/0683* (2013.01)

(58) Field of Classification Search
CPC .. G06F 12/0238; G06F 3/0619; G06F 3/0649; G06F 3/0653; G06F 3/0683
See application file for complete search history.

(56) References Cited

U.S. PATENT DOCUMENTS

| | | | |
|---|---|---|---|
| 7,974,954 B2 * | 7/2011 | Aridome | G11B 27/329 707/674 |
| 9,280,483 B1 | 3/2016 | Ghoshal | |
| 11,175,993 B2 * | 11/2021 | Liu | G06F 16/164 |

(Continued)

FOREIGN PATENT DOCUMENTS

| | | |
|---|---|---|
| JP | 2006-345208 | 12/2006 |
| JP | 2010-187124 | 8/2010 |

(Continued)

OTHER PUBLICATIONS

International Search Report issued May 9, 2017 in PCT/JP2017/004810 filed Feb. 9, 2017 (with English Translation).

(Continued)

*Primary Examiner* — Reginald G Bragdon
*Assistant Examiner* — Michael L Westbrook
(74) *Attorney, Agent, or Firm* — Maier & Maier, PLLC

(57) ABSTRACT

According to one embodiment, data stored in past can be effectively used without being influenced by the characteristics and capacity of a memory storing storable data. Maintenance data are generated by managing a state in a memory area, alert notification data are transferred on the basis of the generated maintenance data, and/or at least a part of the data which are already stored in the memory area is transferred.

5 Claims, 33 Drawing Sheets

Related U.S. Application Data application No. PCT/JP2017/004810, filed on Feb. 9, 2017.

(56) References Cited

U.S. PATENT DOCUMENTS

| | | |
|---|---|---|
| 2004/0103260 A1 | 5/2004 | Nalawadi |
| 2005/0238319 A1 | 10/2005 | Chen |
| 2007/0186757 A1 | 8/2007 | Yagi |
| 2009/0058635 A1 | 3/2009 | Lalonde et al. |
| 2009/0058636 A1 | 3/2009 | Gaskill et al. |
| 2009/0062887 A1 | 3/2009 | Mass et al. |
| 2009/0063187 A1 | 3/2009 | Johnson et al. |
| 2009/0063193 A1 | 3/2009 | Barton et al. |
| 2011/0252198 A1 | 10/2011 | Ogasawara et al. |
| 2012/0002054 A1 | 1/2012 | Ohkawa et al. |
| 2012/0137343 A1 | 5/2012 | Uchida |

FOREIGN PATENT DOCUMENTS

| | | |
|---|---|---|
| JP | 2011-502369 A | 1/2011 |
| JP | WO 2011/128935 A1 | 10/2011 |
| JP | 2012-203434 | 10/2012 |
| JP | 2013-517536 | 5/2013 |
| JP | 2014-64241 A | 4/2014 |
| JP | 2015-91070 A | 5/2015 |
| JP | 2015-95176 A | 5/2015 |
| JP | 2016-6922 A | 1/2016 |
| WO | WO 2011/018937 A1 | 2/2011 |

OTHER PUBLICATIONS

Written Opinion issued May 9, 2017 in PCT/JP2017/004810 filed Feb. 9, 2017.

* cited by examiner

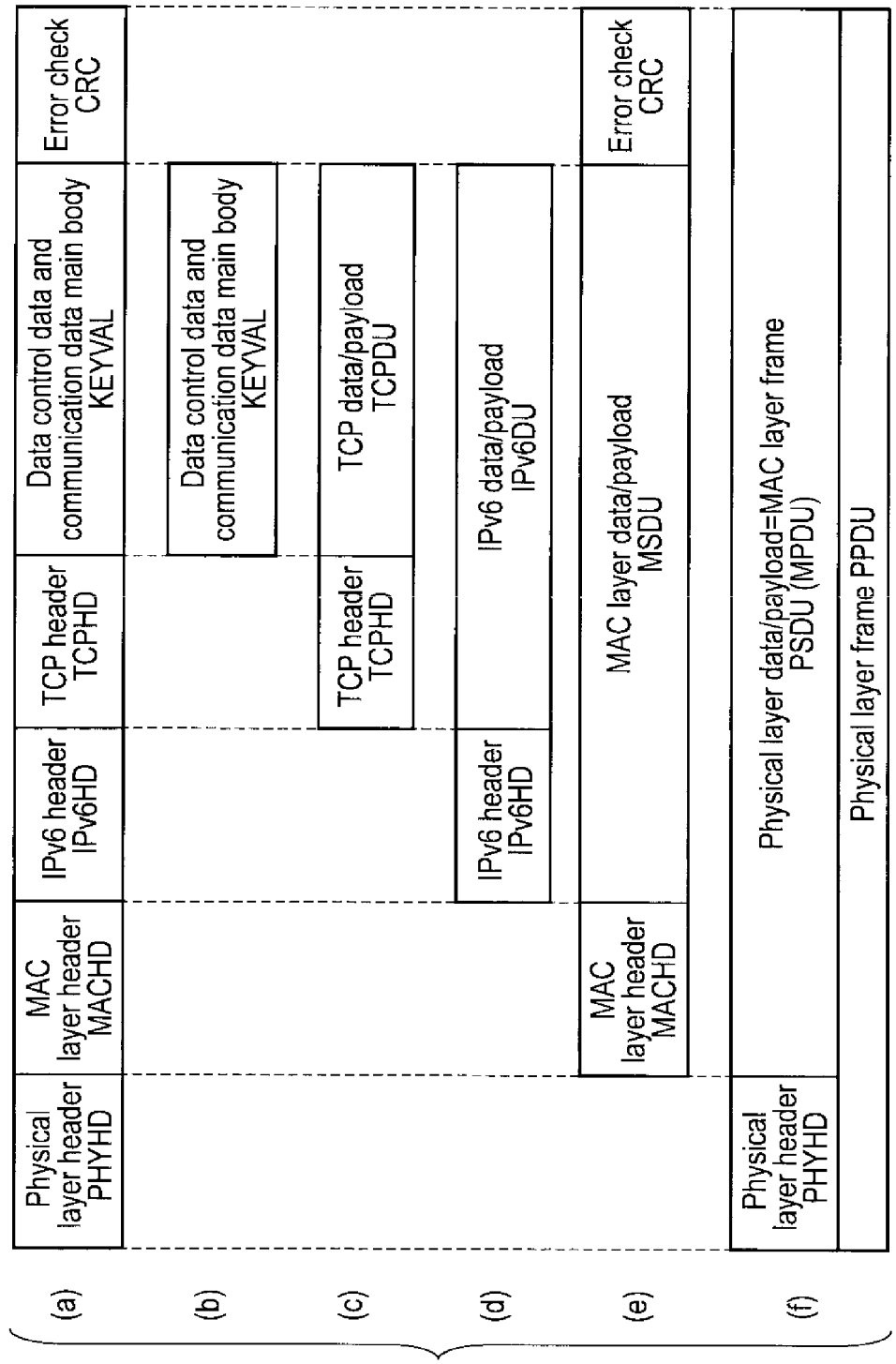
F I G. 2

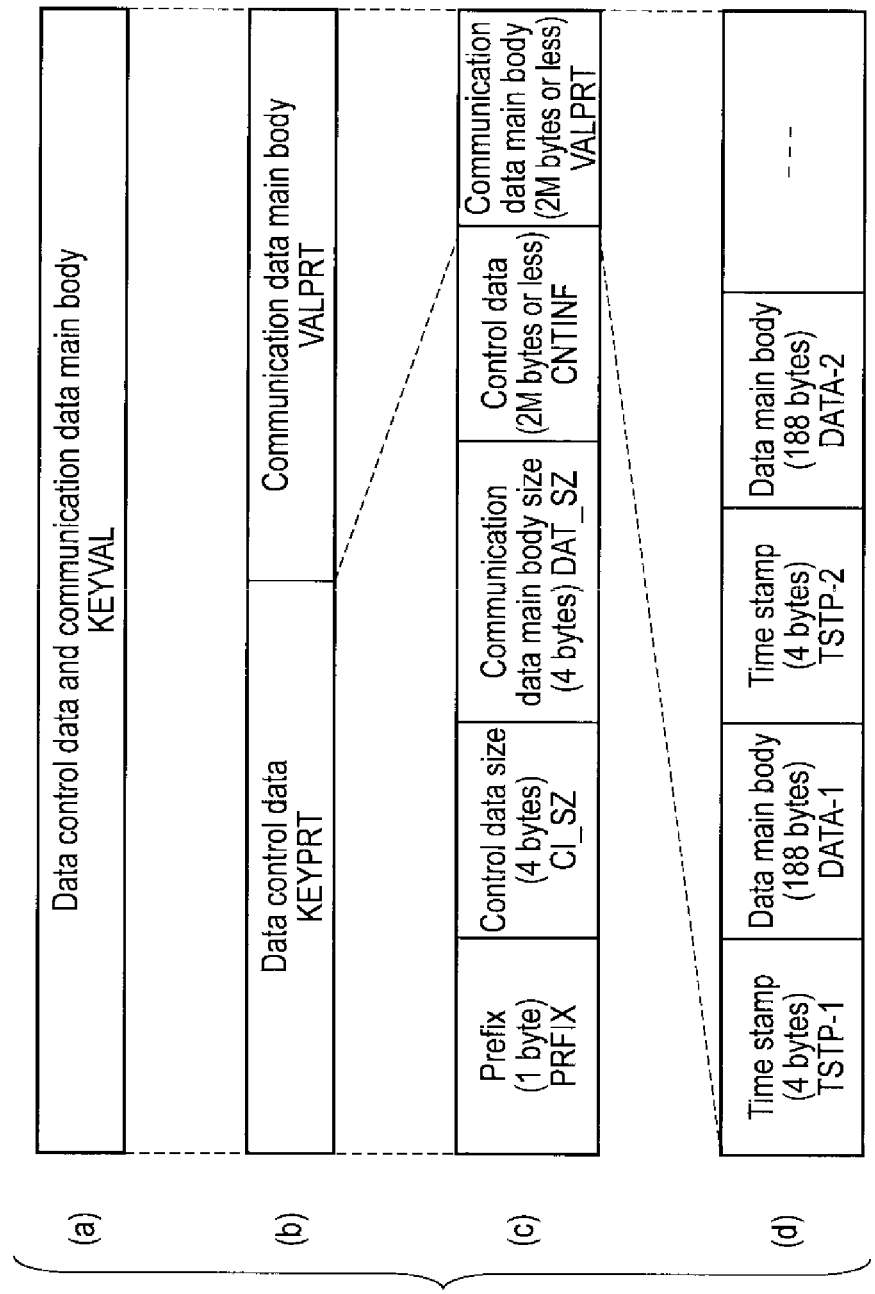
F I G. 4

| Control type CTTYPE | Control content | Corresponding parameter |
|---|---|---|
| GET | Data reception Data collection | Request parameter Response parameter |
| PUT | Data transfer Data storage | Request parameter |
| DELETE | Data deletion | Request parameter |
| ALERT | Alert notification | Request parameter |

(a) GET/v*/{tenant_id}/RTdata/{"RTdata_id":"$$$","Time-Zone":"###-##&"}

(b) GET/v*/RTdata/{"RTdata_id":"$$$","content_length":"%%%"}/real-time data (c) PUT/v*/RTdata/{"RTdata_id":"$$$","Time-Zone":"###-##&",
"content_length":"%%%"}/real-time data (d) PUT/v*/RTdata/{"RTdata_id":"$$$","number_of_key-word":"3","key-word":"aaa","bbb","ccc","content_length":"%%%",
⎣_____⎦
                    Retrieval related data SRCINF "Record-start_Time":"YMDHMS","Forbidden-Transmission_Period":"ftp","Preservation_Period":"pp",
⎣_____⎦
                            Period management data TMMN "Publication_Class":"pbc","Publication_Fee":"pbf",
⎣_____⎦
        Data publication/charge data DTPUB "Encryption":"yes","Data-Distribution":"no","Block-Distribution":"yes"}
⎣_____⎦
              Data main body attribution data DTATTR

F I G. 8

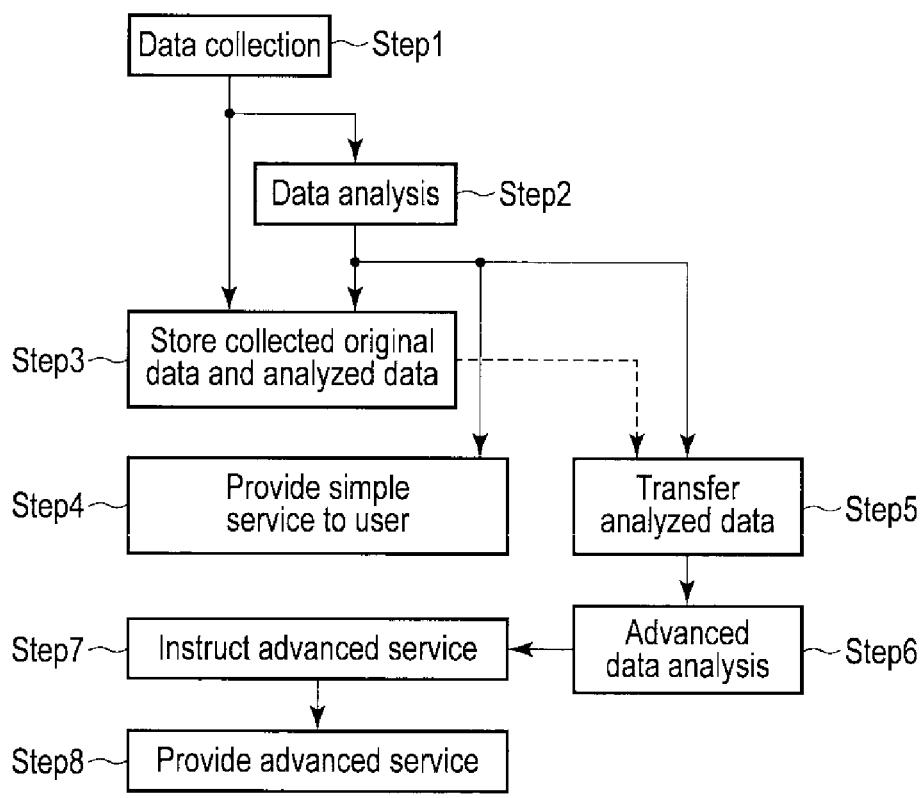
F I G. 9B

| | Individual user or family user | | U1 | U2 | U3 | ... |
|---|---|---|---|---|---|---|
| USEINF | | USR_ID | ... | ... | ... | ... |
| | | PASSWD | ... | ... | ... | ... |
| | | EMADRS | ... | ... | ... | ... |
| | | BNKACT | ... | ... | ... | ... |
| USRECG | | FRECLK | ... | ... | ... | ... |
| | | FGPRLK | ... | ... | ... | ... |
| USBL | | GRP_ID | ... | ... | ... | ... |
| | | NDM_ID | ... | ... | ... | ... |
| PUBCND | PUBDPN | PUBORG | $d.ef | | Banned | |
| | | PUBCDA | | | | |
| | | PUBCDB | | | | |
| | PUBDMN | PUBORG | $a.bc | Banned | $1.00 | ... |
| | | PUBCDA | | | | |
| | | PUBCDB | | | | |
| | PUBMMB | PUBORG | $0.00 | | $0.00 | |
| | | PUBCDA | | | | |
| | | PUBCDB | | | | |

F I G. 10

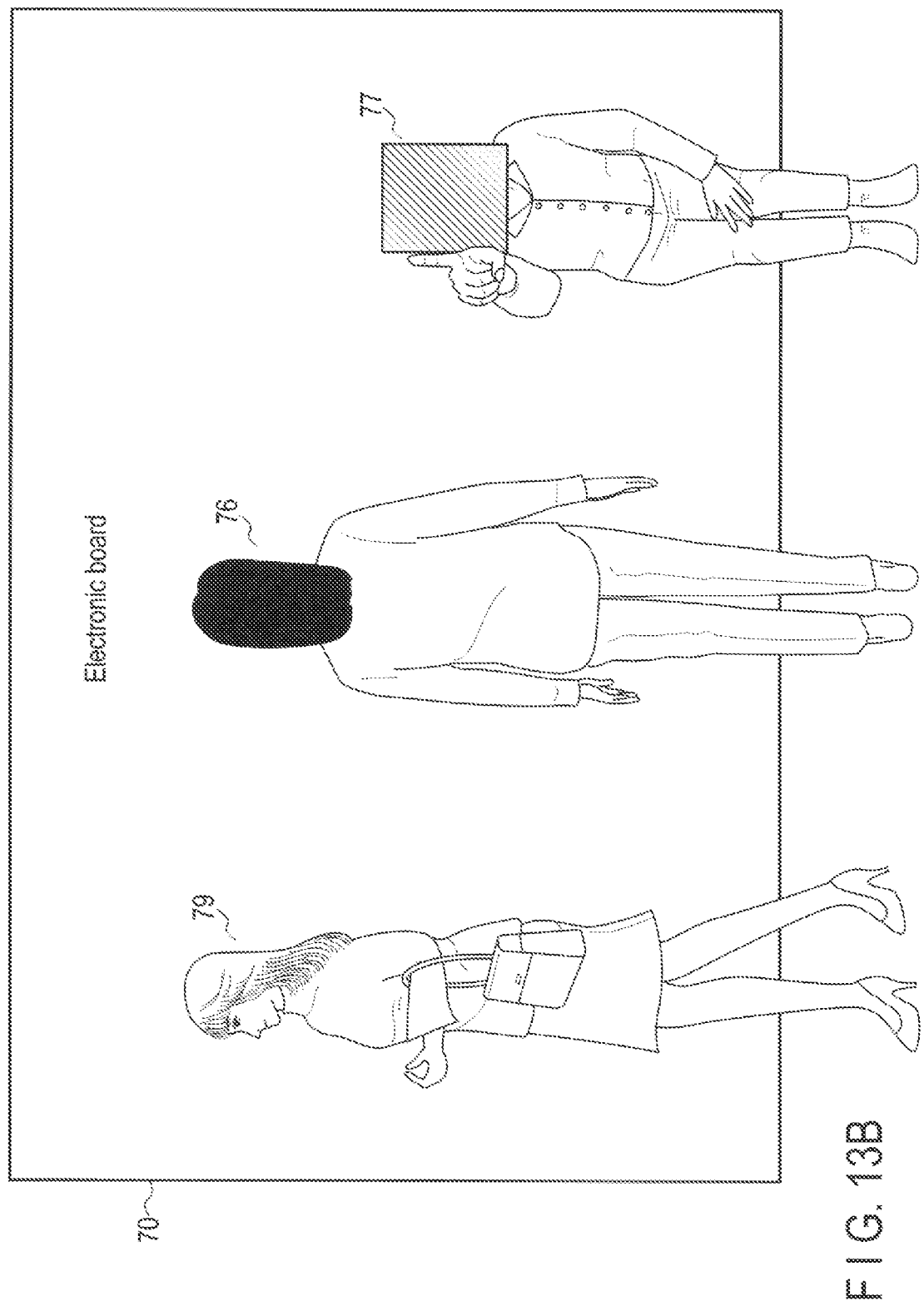
F I G. 13B

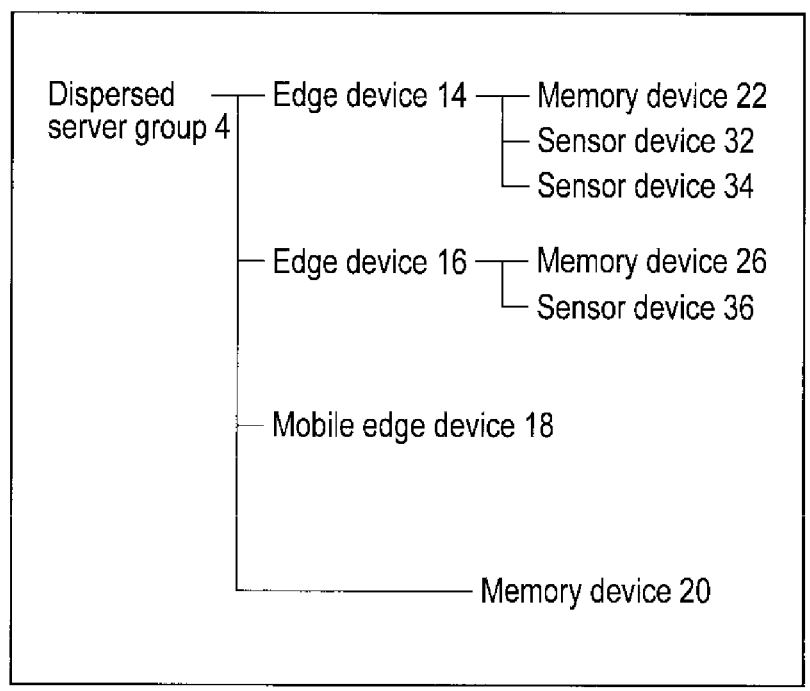
F I G. 15

| Type EDDR | Set/arrangement data EDDRIF ||||| Memory area management data RDMG ||||
|---|---|---|---|---|---|---|---|---|---|
| | Individual identification EDR_ID | IP address IPADRS | Function characteristics CHARA | Higher connection destination UPCNT | | Partition/folder/directory/drive identification FLD_ID | Data publication class DPUBCL | Memory area use fee (Dollar/byte, monthly) FEEMEM | Manager identification data MAN_ID |
| Device | 22 | α α α | | 14 | | A | Specific user only | ⋮ | Suzuki |
| | 26 | β β β | Memory | 16 | | B | Full open | ⋮ | |
| | | | | | | A | Specific user only | ⋮ | Ando |
| | 20 | γ γ γ | | 4 | | B | Group member | ⋮ | |
| | 32 | δ δ δ | Image capture sensor | 14 | | D | Domain | | |
| | 34 | ε ε ε | Audio input sensor | | | A | Full open | | Kato |
| | 22 | ζ ζ ζ | Memory | | | | | | |
| Edge device | 14 | ξ ξ ξ | Situated edge | Dispersed server group 4 | | | | | |
| | 16 | η η η | | | | | | | |
| | 18 | μ μ μ | Mobile edge | | | | | | |

FIG. 16

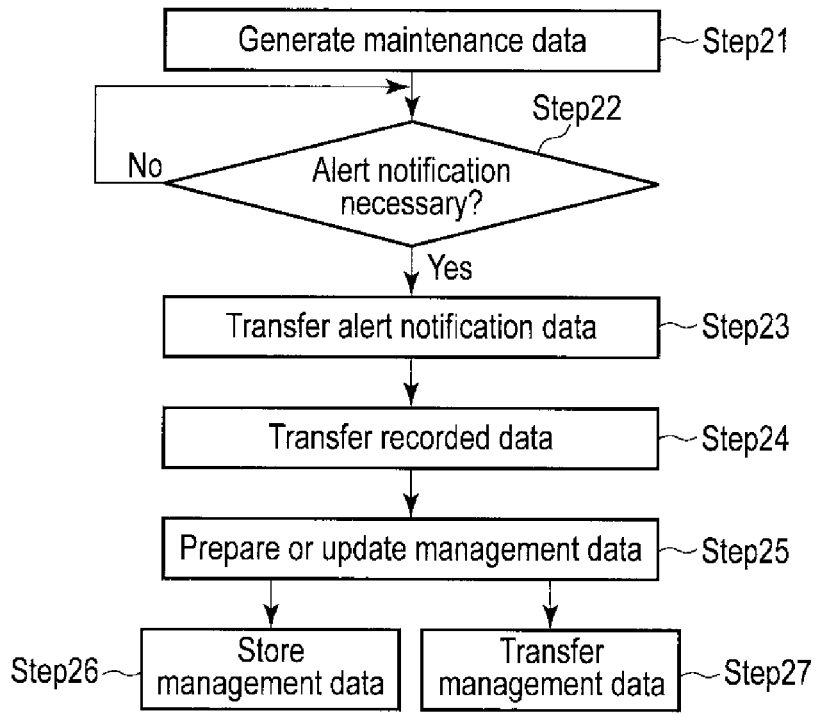
F I G. 20C
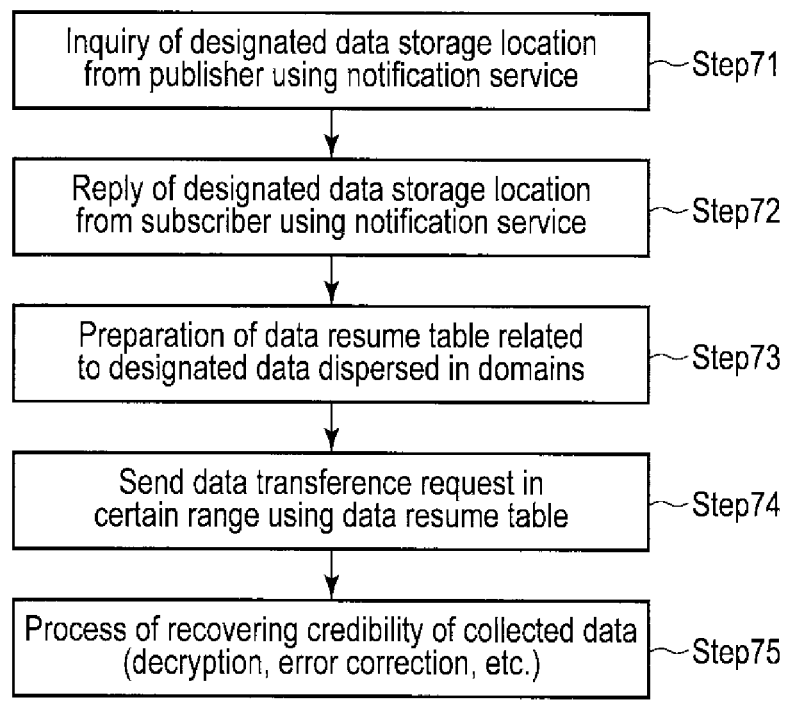
F I G. 21

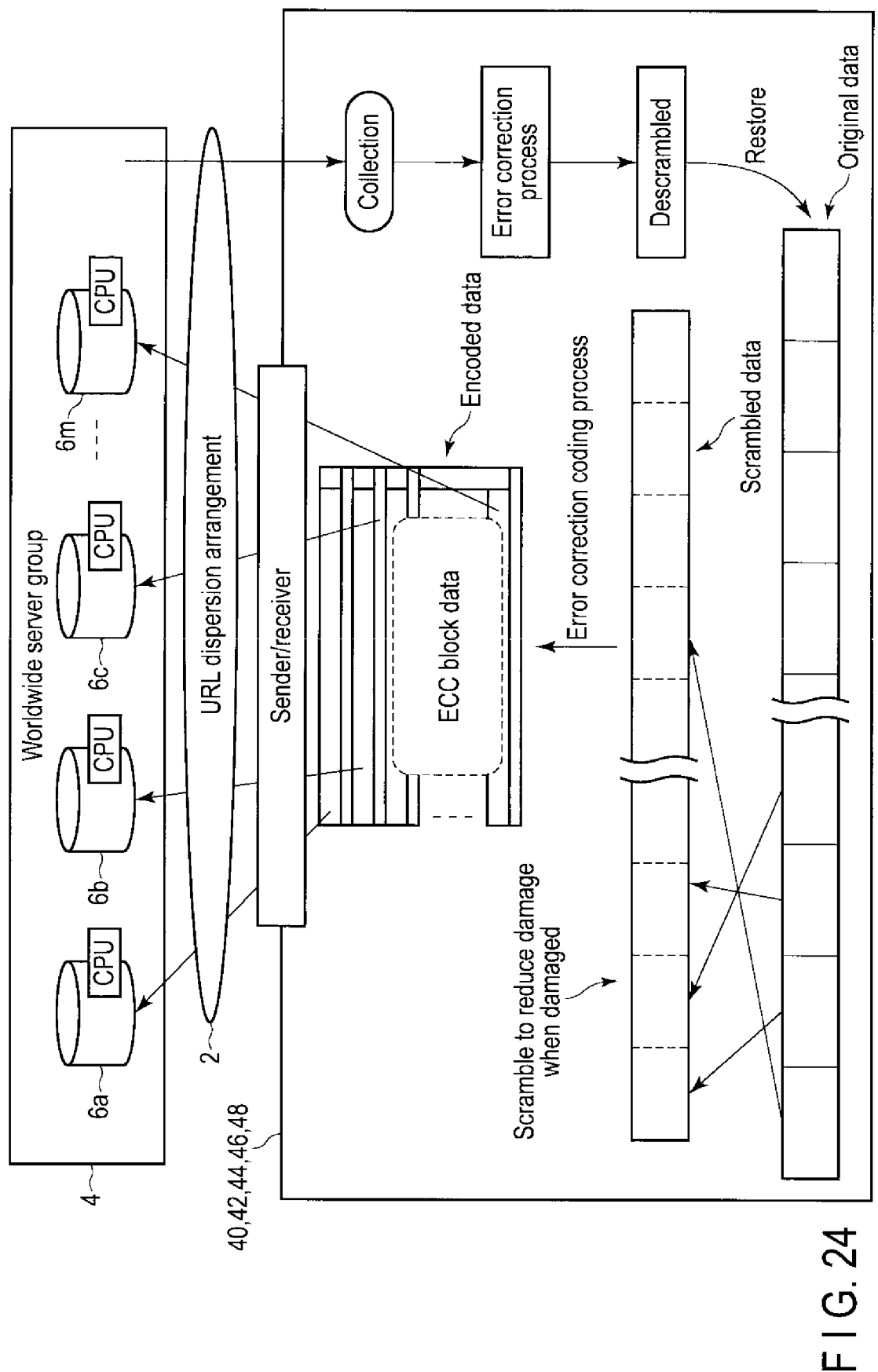
F I G. 24

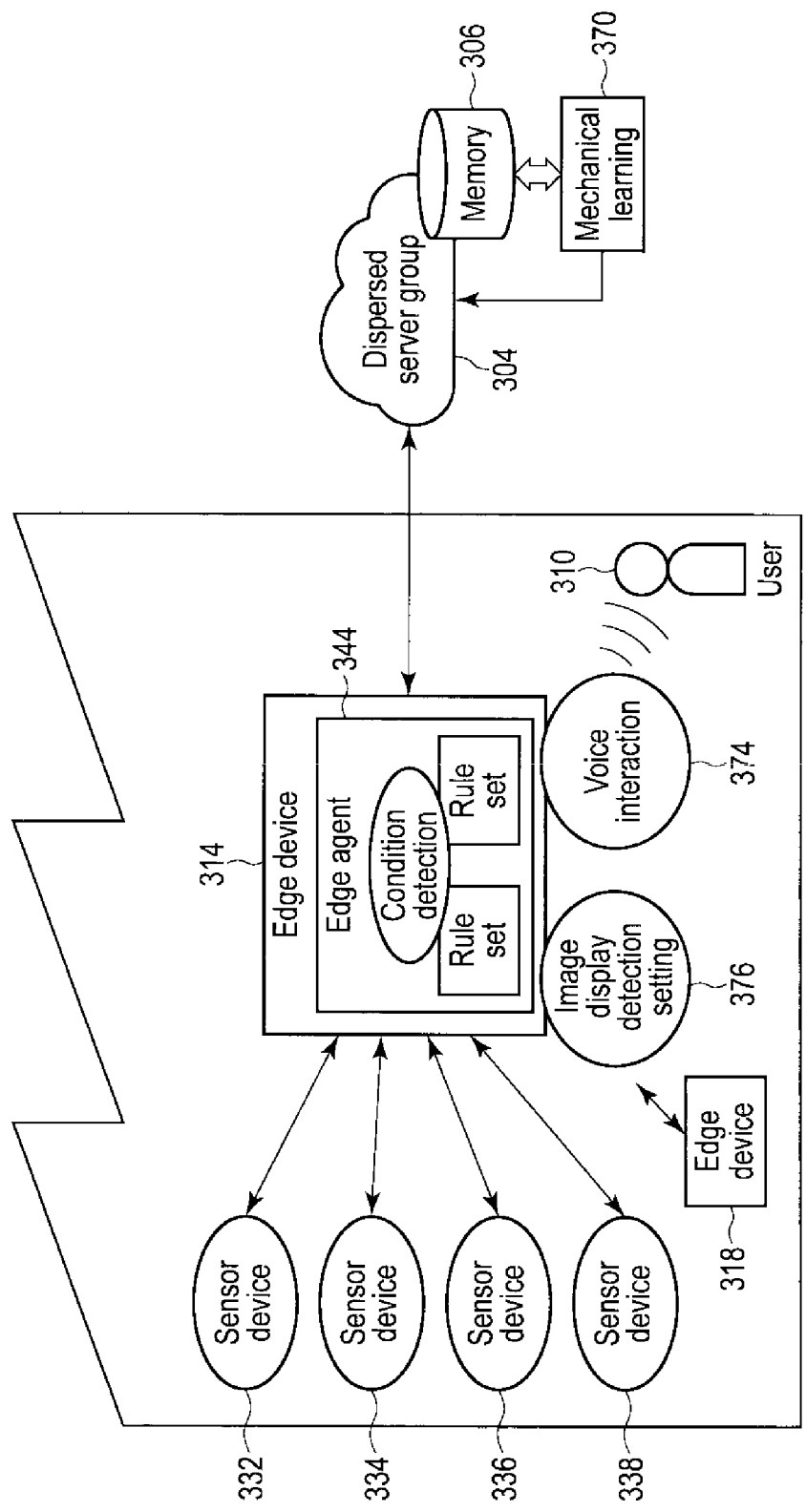
F I G. 25

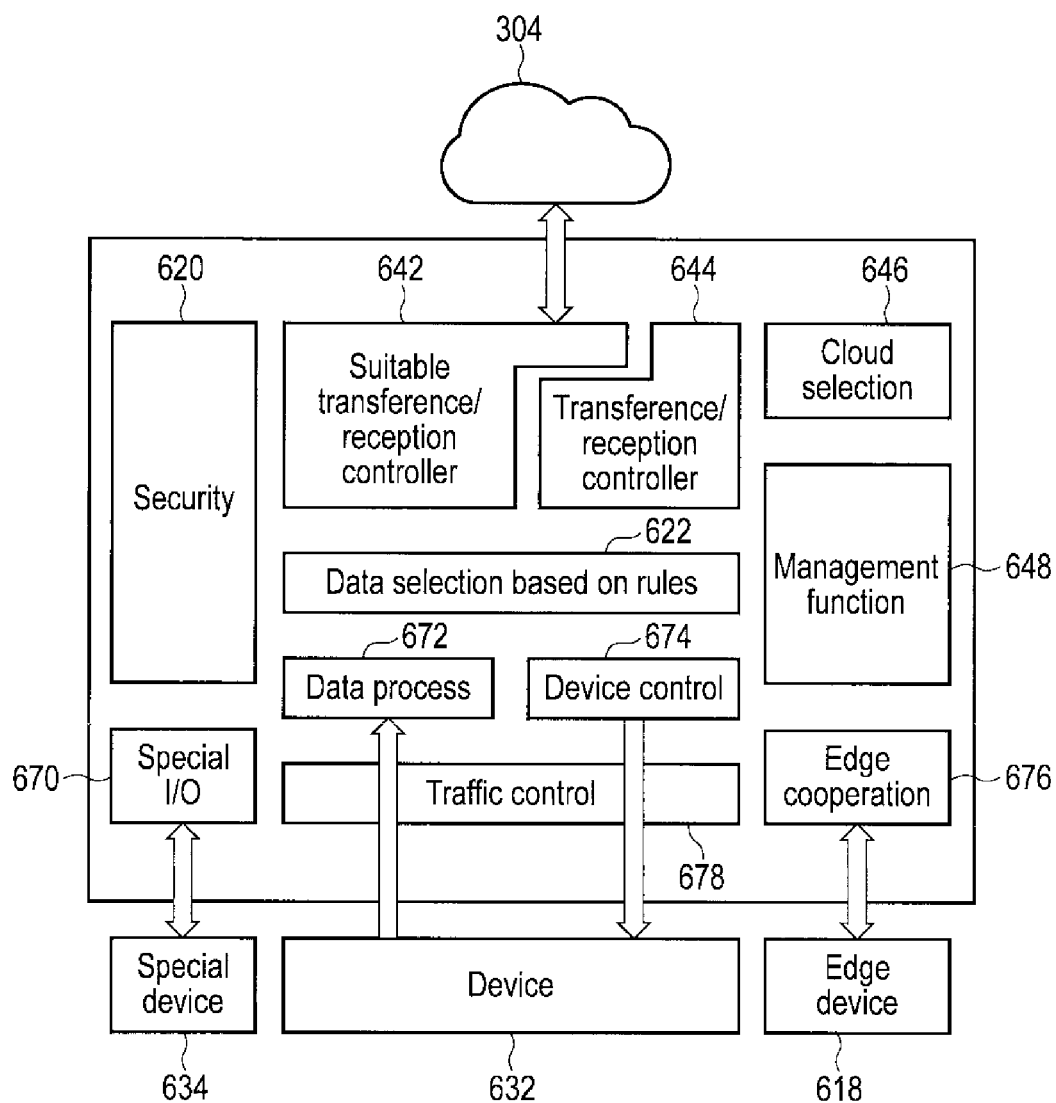
F I G. 30

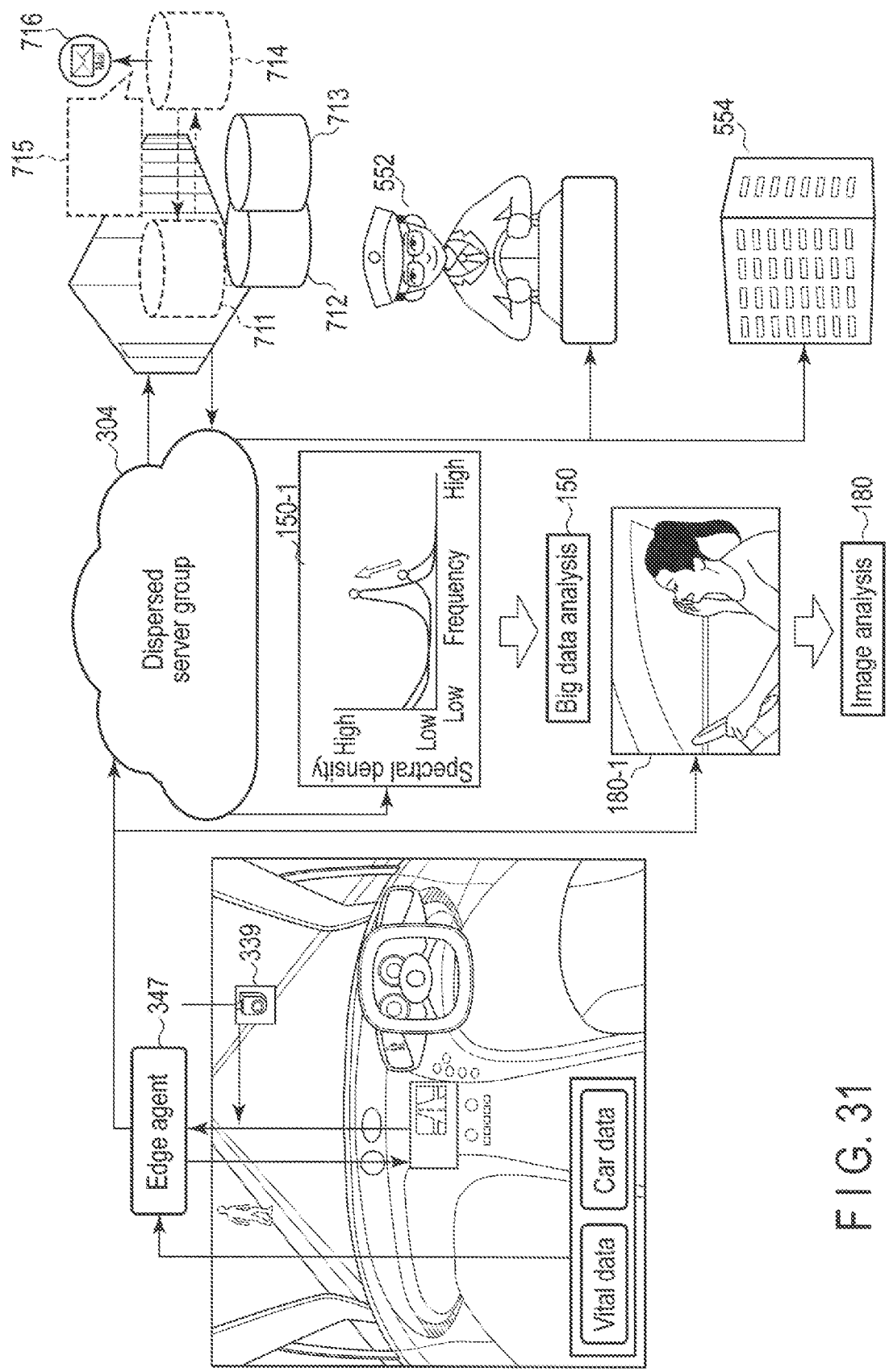
F I G. 31

DATA MANAGEMENT METHOD USING MULTIPLE EDGE DEVICES CONNECTED TO THE INTERNET

CROSS-REFERENCE TO RELATED APPLICATIONS

This application is a Divisional of U.S. application Ser. No. 16/059,494 filed Aug. 9, 2018 and which is a Continuation Application of PCT Application No. PCT/JP2017/004810, filed Feb. 9, 2017 and based upon and claiming the benefit of priority from Japanese Patent Application No. 2016-022780, filed Feb. 9, 2016, the entire contents of all of which are incorporated herein by reference.

FIELD

Embodiments described herein relate generally to a management method of data successively stored and devices handling the data.

BACKGROUND

In recent years, IoT related techniques are drawing wide attention, and data from various sensors are successively collected. Furthermore, in order to use the collected data effectively, data collected in the past are retrieved for the use in many cases. Thus, data successively collected are stored and accumulated in a memory. As a result, the amount of data stored in the memory becomes too large as the time passes.

SUMMARY

Technical Problem

As a specific example of storable data, Patent Literature 1 (JP 2006-345208 A) discloses a technique of temporarily storing a surveillance image in a digital video recorder (DCR). Furthermore, the surveillance image temporarily stored in the recorder is arbitrarily transferred to a user in response to a request from the user. Here, the amount of surveillance image stored in the digital video recorder increases as the time passes and will exceeds the capacity of the recordable amount of data. However, there is no disclosure of a technique to deal with the amount of data of surveillance image exceeding the capacity of the recordable amount of data of the recorder.

Regarding this matter, Patent Literature 2 (JP 2010-187124 A) discloses a method to deal with the amount of data exceeding the capacity of a recorder in which an overwriting process of a newly collected surveillance image is performed. However, in this method, a previously recorded surveillance image cannot be used effectively after the overwriting process.

Solution to Problem

Thus, a data management method which can effectively use data stored in past regardless of characteristics and capacity of a memory storing data, or a device using the same method are required.

According to an embodiment, maintenance data are generated by managing a state in a memory area, alert notification data are transferred on the basis of the generated maintenance data, and at least a part of the data which are already stored in the memory area is transferred.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 shows the structure of communication data used on the internet.

FIG. 4 shows a data structure of data control data and communication data main body.

FIG. 8 shows example of description of the control data.

FIG. 9B shows a flow of collection and analysis of data in the edge device.

FIG. 10 shows management data of a user.

FIG. 13B shows an example of processed data with respect to the live sensor data.

FIG. 15 shows an example of a network connection relationship between the edge device and other devices.

FIG. 16 shows an example of edge/device table contents.

FIG. 20C shows a dealing flow corresponding to the change of condition in the memory device.

FIG. 21 shows an example of a database retrieval method.

FIG. 24 shows a data credibility increase method based on data record location dispersion arrangement.

FIG. 25 shows an application example of the embodiment in a factory.

FIG. 30 shows a process of the edge agent in a movable body which is connectable to the network.

FIG. 31 shows a data analysis method in a movable body which is connectable to the network.

DETAILED DESCRIPTION

Figure 1:
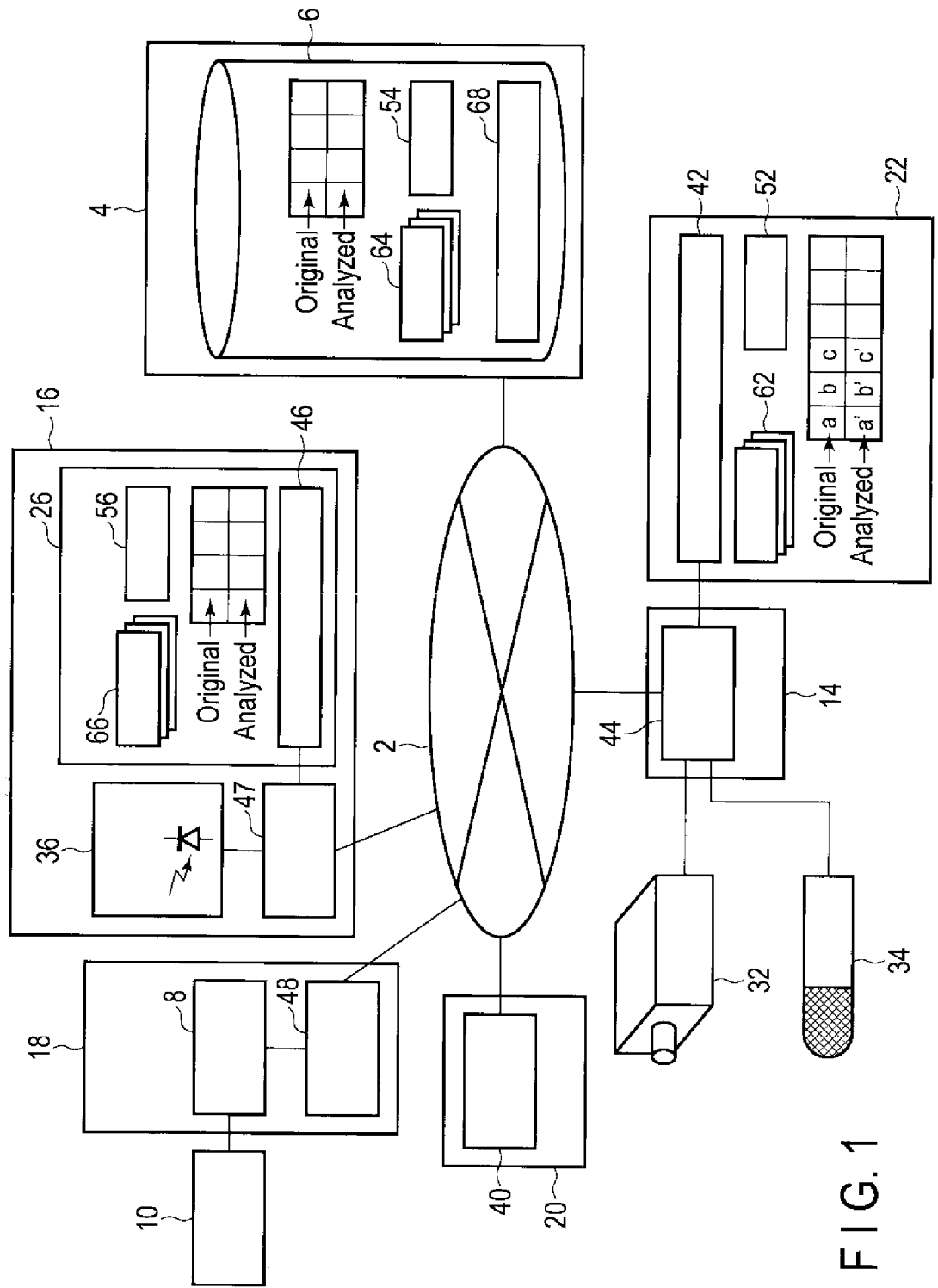
FIG. 1 shows the structure of a network system of an embodiment.

Various embodiments will be described hereinafter with reference to the accompanying drawings. Initially, Chapters and Sections of the present application are listed as below.
Chapter 1 Outline of Present Embodiment
Section 1.1 Whole structure of Network System
Section 1.2 Device
Section 1.2.1 Works of Device and Device Agent
Section 1.2.2 Memory Device
Section 1.2.3 Sensor Device
Section 1.3 Edge Device and Edge Agent
Chapter 2 Communication data Used in Network
Section 2.1 Structure of Communication Data Used on the Internet
Section 2.2 Structure of Communication Data Used in Communication Path Other Than Internet
Section 2.3 Structure of Data in Data Control Data and Communication Data Main Body
Chapter 3 Data Communication Method in Network Path
Section 3.1 Data Collection and Data Analysis
Section 3.2 Data Analysis and Data Publication/Charge Condition Corresponding to Personal Information Protection
Section 3.3 In-Domain Memory Area Expansion Method
Section 3.4 Management and Network Communication of Maintenance Data
Section 3.5 Method of Database Retrieval
Section 3.6 Method of Control of Pay-as-you-go
Section 3.6.1 Method of Control of Pay-as-you-go in Resuming Storage Data
Section 3.6.2 Method of Control of Pay-as-you-go in Changing Data Storage Location
Chapter 4 Method of Securing Credibility of Dispersed Data and Management Data
Chapter 5 Another embodiment of Edge Device
Chapter 1 Outline of Present Embodiment Initially, the structure of a whole network system of the present embodiment will be explained, and structural elements of the network system will be explained.
Section 1.1 Whole Structure of Network System In the system of the present embodiment, as shown in FIG. 1, data communication is performed between different locations via a network line such as the internet 2. FIG. 1 shows the internet 2 as a specific example of the network line. However, it may be a certain local network line. Furthermore, as a communication medium of the network line, a wired line or a wireless line can be used.

In the present embodiment, targets of connection to the network line including the internet 2 are classified into a dispersed server group 4, edge devices 14, 16, and 18, and devices 20, 22, 32, 34, and 36. Here, the device 36 may be stored in the edge device 16, and the network connection may be established between the edge device 14 and the devices 22, 32, and 34. Furthermore, the internet protocol (IP) address which will be described in Chapter 2 may be preliminarily set in the entire edge devices 14, 16, and 18 and the entire devices 20, 22, 32, 34, and 36. Thus, a direct access from an optional location to any of the edge devices 14, 16, and 18 or the devices 20, 22, 32, 34, and 36.

As a connection style of the network line including the internet 2, a three-level structure of dispersed server group 4/edge device 14/devices 22, 32, and 34, or a two-level structure of dispersed server group 4/edge devices 16 and 18, or a two-level structure of edge device 14/devices 22, 32, and 34, or a two-level structure of dispersed server group 4/device 20 in which a direct access from the dispersed server group 4 to the device 20 is possible may be used in the present embodiment. Furthermore, if a plurality of devices 22, 32, and 34 are connected to the edge device 14 as shown in FIG. 1, the network line can take a tree structure with the edge device 14 as an apex. Furthermore, in the example of FIG. 1, the edge device 14, another edge device 16, mobile edge device 18, and memory device 20 are included in the tree structure with the dispersed server group 4 as an apex.

In the data communication via the network line of the present embodiment, one side mainly operates the data communication and the other side participates the data communication. Since the data communication is performed in a not equal relationship, the data communication with stable control can be achieved with respect to a plurality of connection conditions to the same network line. Thus, in the connection model of the network line, specifically, the following priority in the data communication (left is controller side and the right is controlled side) is defined.

Dispersed Server Group 4>Edge Devices 14, 16, and 18>Device

In such a priority relationship, as will be described in Section 2.3, (1) the controller side sends a request (communication data of the request are received in the controlled side) and (2) the controlled side sends a response or status (communication data of the response or the status are received in the controller side).

As a classification method to clarify the priority relationship in the data communication process using the network line, other classification methods than the example of FIG. 1 may be used. That is, as compared to the three-level structure, two-level structure, or tree structure corresponding to the above classification method, if a different classification method is performed, other multilevel (four-level or more) structure or non-tree structure may be used.

Furthermore, in the present embodiment, an autonomous processing function may be applied to the controlled side. As an on-network effect obtained as a result, (1) the controlled side sends a request (communication data of the request are received in the controller side) and (2) the controller side sends a response or a status (communication data of the response or the status are received in the controlled side) which is an opposite process to the above process.

As a method to apply the autonomous processing function to the controlled side, function of agents 40, 42, 44, 46, 47, and 48 may be applied to the edge devices 14, 16, and 18 and the devices 20, 22, 32, 34, and 36. As an example to realize the agent function, a combination of a central processing unit (CPU) and a memory in which the program is preliminarily stored, or a special integrated circuit (IC) which can realize a simple agent function may be stored. Furthermore, as an internal structure of the special IC, a structure of simple logic circuits combined or a structure in which a logic is programmable may be used.

Here, the controlled side may autonomously perform, in both the edge devices 14, 16, and 18 and the devices 20, 22, 32, 34, and 36, management of condition in special IC, autonomous control of data processing in special IC, simple analysis and selection of data obtained, preparation of data generated by process of data obtained, transmission control of data selected or analyzed to controller side, detection of abnormality of condition of special IC or preliminary detection of risk of data recorded in special IC, transmission control of result of abnormality detection or preliminary risk detection in special IC, management of maintenance data and control of transmission, and management of condition of communication party (controller side), for example. Specifically, in the edge devices 14 and 16, automatic calculation of charge data related to data disclosure in a certain range under management may be performed with management data 62 and 66 which will be described later. Furthermore, if the automatic calculation of the charge data is performed, charge values (including free) may vary depending on attribution of data to be handled (data of user and data of administrator of memory and system).

As can be understood from the above, in the network line in which the priority relationship of the data communication is defined, if the autonomous processing function is applied to the controlled side, the efficiency of the process in the whole network system is increased. That is, if a large number of controlled sides without an agent function are connected to a single controller via a network line, the work load becomes excessive for the single controller in order to smoothly control the operations in the controlled sides. As compared to such a case, the work load of the controller side is greatly reduced if the agent function is applied to the controlled side as in the present embodiment.

The dispersed server group 4 of FIG. 1 is composed of one or more servers. In this embodiment, a service provider for a user via a network line (which may include the internet 2) will be defined as a server. Thus, the dispersed server group 4 may be specified as servers of different service contents which are connected on the same network (internet 2), or one server connected to a network line (which may include internet 2) providing a plurality of different services to a user, or one interface server connected to a network line (which may include internet 2) and a plurality of servers which can perform parallel processing in the background connected to the interface server.

Furthermore, functions of the server (service contents provided to users) are not limited, and for example, the server may function as a client server which control a certain domain, web server which is related to a website display, and a database server which manage the data in common domains.

Section 1.2 Device
Section 1.2.1 Works of Device and Device Agent

In the embodiment explained here, a complex including a certain unique function and a communication function will be defined as a device. Devices with a sensor function as their unit function will be referred to as sensor devices 32, 34, and 36, and devices with a memory function will be referred to as memory devices 20, 22, and 26. In addition, a device with a certain drive mechanism may be referred to as drive device (actuator device), a device with a display function may be referred to as a display device, and a device with a computing function may be referred to as a processor device.

A communication method related to the communication function between the devices may be performed through a wired communication or a wireless communication. The connection may be realized as the memory device 20 of FIG. 1 which is directly connected to the internet 2, or as the sensor devices 32 and 34 and the memory device 22 of FIG. 1 which exist independently and are connected to the intranet, or as the sensor device 36 and the memory device 26 of FIG. 1 which are integrated in the edge device 16 and related to the communication in the edge devices, for example, or may be realized as any other models as device.

In this embodiment, the agents are resident in the devices 20, 22, 26, 32, 34, and 36 as explained in Section 1.1.1 (although this is not shown in FIG. 1, agents may be resident in the sensor devices 32, 34, and 36). Amongst the agents resident in the devices 20, 22, 26, 32, 34, and 36, agent directly connectable to the internet 2 will be referred to as small agent 40, and agents which have network connection to the other device will be referred to as device agents 42 and 46. Different communication protocols are used in the data communication between the small agent 40 and the device agents 42 and 46. As will be described in Section 2.1 with reference to FIG. 2, a header group transfer from a physical layer header PHYHD to a TCP header TCPHD in the communication protocol used in the internet 2. In comparison, in the data communication other than the internet 2, data communication of data control data KEYVAL (and its precedent physical layer header PHYHD and a MAC layer header) alone is acceptable.

Section 1.2.2 Memory Device

Although this is not shown, the memory devices 20, 22, and 26 of FIG. 1 include a data storage memory area, communication controller, and CPU. Furthermore, a memory area specialized for the CPU may be included to be used for a control program for realizing the agent functions explained in Sections 1.1 and 1.2.1 (small agent 40 and device agents 42 and 46), or for temporary storage for data for preparing the communication data conforming to the communication protocol. Here, instead of a memory area specialized for the CPU, the control program and communication data may be stored in a specific area which is a division of the data storage memory area.

Furthermore, original sensor data collected by the sensor devices 32 and 34 of FIG. 1 and data (analyzed) obtained from the analysis by the edge agent 44 are successively recorded in the data storage memory area. Furthermore, management data 62 and common keys 52, 54, and 56 may be stored in a certain area in the data storage memory area.

The autonomous process performed in the devices are aforementioned in Section 1.1. As examples of the internal conditions autonomously managed by the small agent 40 or the device agents 42 and 46 in the memory devices 20, 22, and 26, there are not only the recordable capacity in the data storage memory area and a sampling speed related to writing speed, but also life data related to the number of rewrites in the data storage memory area and a maintaining period of recorded data.

Furthermore, as examples of abnormality to be detected in the internal condition and risk data to be preliminarily detected in the recording data, there are a risk of data loss which occurs near a term limit of maintaining recording data by the memory devices 20, 22, and 26, and a risk of old data loss which is caused by an overwriting process of new data in a case where the recording capacity by the memory devices 20, 22, and 24 excesses, for example.

On the other hand, as examples of conditions to be managed with respect to the network communication party (controller side), there are data transfer speed in the controller side and recording capacity of the memory area of the memory devices 20, 22, and 26 inside the controller side, for example.

Section 1.2.3 Sensor Device

In the sensor devices 32, 34, and 36, a communication controller and sensors specified to the sensors. With the sensors, various data such as voice, image, and video, and furthermore, temperature, humidity, pressure, vibration, velocity, and angular velocity can be collected.

Furthermore, as in Section 1.2.2, a memory area and a special CPU (and corresponding program storage area) may be included.

As examples of internal conditions autonomously managed by the small agent or the device agent in the sensor devices 32, 34, and 36, in relation to the explanation of Section 1.1, there are data of sensor type, performance of process of sensor, and recording capacity of (a memory area of) the sensor device, for example. Furthermore, data of contents of process where special processes are performable in the sensor devices 32, 34, and 36 may be managed, too.

Especially, as to the sensor devices 32, 34, and 36, as the abnormality and risk of the internal condition to be detected, there are decrease of sensor function (including sensor performance) and breakdown.

On the other hand, as examples of conditions to be managed in the network communication party (controller side), data transfer speed in the controller side and recording capacity of a memory area of the controller side may be managed in the small agent or the device agent.

Section 1.3 Edge Device and Edge Agent

In the present embodiment, devices connectable to the internet 2 or the intranet is defined as edge devices 14, 16, and 18. A location close to an end user may be referred to as front end. An edge device is a device which can be used in the front end side.

The edge devices 14, 16, and 18 may be independently connected to the dispersed server group 4 in a wired or wireless manner.

The edge devices 14, 16, and 18 may be situated, or mobile, or movable. These types are as follows.

The situated type includes, for example, a personal computer, router (gateway), CPU-installed home device (television, refrigerator, washing machine, audio device, and the like), intelligent speaker (phone and television phone system), and panelboard or monitoring system with an agent function (including image surveillance and weather monitoring).

The mobile type includes, for example, a smartphone, tablet, mobile phone, wearable terminal (watch and glasses including an agent function), and mobile biometric sensor (pedometer, thermometer, pulse and heartbeat counter, blood oxygen concentration and blood glucose level counter, and the like).

The movable type includes, for example, connected car, connected bus, connected truck, and connected ship.

However, no limitation is intended thereby, and in the present embodiment, all connectable devices are included in the edge devices 14, 16, and 18.

The edge devices 14, 16, and 18 may include an agent function (autonomous processing function) as explained in Section 1.1 with reference to FIG. 1. Furthermore, through the specific method explained in Section 1.1, the functions of the edge agents 44, 47, and 48 are achieved. An example of a function to perform analysis and selection of obtained data by an edge agent 44 will be explained below. With respect to original sensor data a, b, and c collected by the sensor device 36 of the edge device 16 and sensor devices 32 and 34 connected to the edge device 14 or original data obtained through the internet 2 or the intranet line, data may be analyzed in the edge agent 44 (47 and 48) and a result of analysis (analyzed data) a', b', and c' may be stored in the memory device 22 with the original data a, b, and c. Note that the data analysis includes not only a high-end image (video) analysis/study but also a recognition process of a character and an image.

Furthermore, in addition, an automatic calculation process of charge data within a scope managed by the edge devices 14, 16, and 18 may be performed in the edge agents 44, 47, and 48, and a result may be notified to the dispersed server group 4 in the controller side.

A user interface 8 shown in the mobile edge device 18 of FIG. 1 may be a part which can perform input/output at the same time (touchpanel or the like). However, the user interface 8 includes an input part and an output part where the input part corresponds to a touchpad, voice input part, image capture part, keyboard, and character input part, and furthermore, all sensor devices explained in Section 1.2.3 (sensor data are input in the mobile edge device 18). Furthermore, the output part may correspond to a voice output structure and image (video) display structure, and furthermore, a drive device with any display or drive mechanism.

In addition, although this is not shown in FIG. 1, the edge devices 14 and 16 may include parts similar to the user interface 8, or input part, or output part.

Chapter 2 Communication data Used in Network

In Chapter 2, the structure of communication data used in the network communication in the system of the present embodiment will be explained.

Section 2.1 Structure of Communication Data Used on the Internet

FIG. 2 shows the structure of communication data used in the internet 2 of FIG. 1. The communication data as a block are intermittently transferred through a wired or wireless manner on the internet 2. The block corresponds to a physical layer frame PPDU of FIG. 2(*f*).

One physical layer frame PPDU includes, as shown in FIG. 2(*a*), a physical layer header PHYHD, MAC layer header MACHD, IPv6 header IPv6HD, TCP header TCPHD, data control data and communication data main body KEYVAL, error check CRC in this order from the sender side to the receiver side (order from the head or order of sending data). On the other hand, when the data arrangement is viewed from the standpoint of FIG. 2(*f*), the physical layer header PHYHD is arranged in the head of the physical layer frame PPDU, then the physical layer data or physical layer payload PSDU is arranged, and the MAC layer header MACHD, IPv6 header IPv6HD, TCP header TCPHD, communication middleware data APLDT, extension data EXDT, and error check code CRC are stored in the physical layer data/payload PSDU in this order.

Similarly, the area after the MAC layer header MACHD may be regarded as MAC layer data or a payload MSDU of MAC layer. Similarly, the area after the IPv6 header IPv6HD may be regarded as IPv6 layer data or a payload IPv6DU of IPv6, and the area after the TCP header TCPHD may be regarded as TCP layer data or a TCP payload TCPDU.

The wired communication used in the present embodiment may be, for example, local image and voice signal transfer lines, and any other communication methods including Ethernet (registered trademark). The wireless communication may be any communication methods including ZigBee (registered trademark), Bluetooth (registered trademark), close range wireless communication methods such as Ultra Wide Band (UWB) and Z-wave, middle range wireless communication methods such as Wireless Fidelity (Wi-Fi) and EnOcean, and long range wireless communication methods such as Second Generation/Personal Digital Cellular (2G/PDC), Global System for Mobile Communications (GSM) (registered trademark), Third Generation/Code Division Multiple Access (#G/CDMA), and Worldwide Interoperability for Microwave Access (WiMAX).

In each communication method, a proper data structure of the physical layer header PHYHD and the MAC layer header MACHD is preliminarily determined. Thus, in the present embodiment, in either the wired communication or the wireless communication, the physical layer header PHYHD and the MAC layer header MACHD are switched corresponding to the data communication of selected communication method. As can be understood, in the present embodiment, the level structure shown in FIG. 2 is adopted in the communication data such that the communication data conforming to any kind of communication methods can be transferred/received by simply switching a part of the communication data in either the wired communication or the wireless communication.

Figure 3:
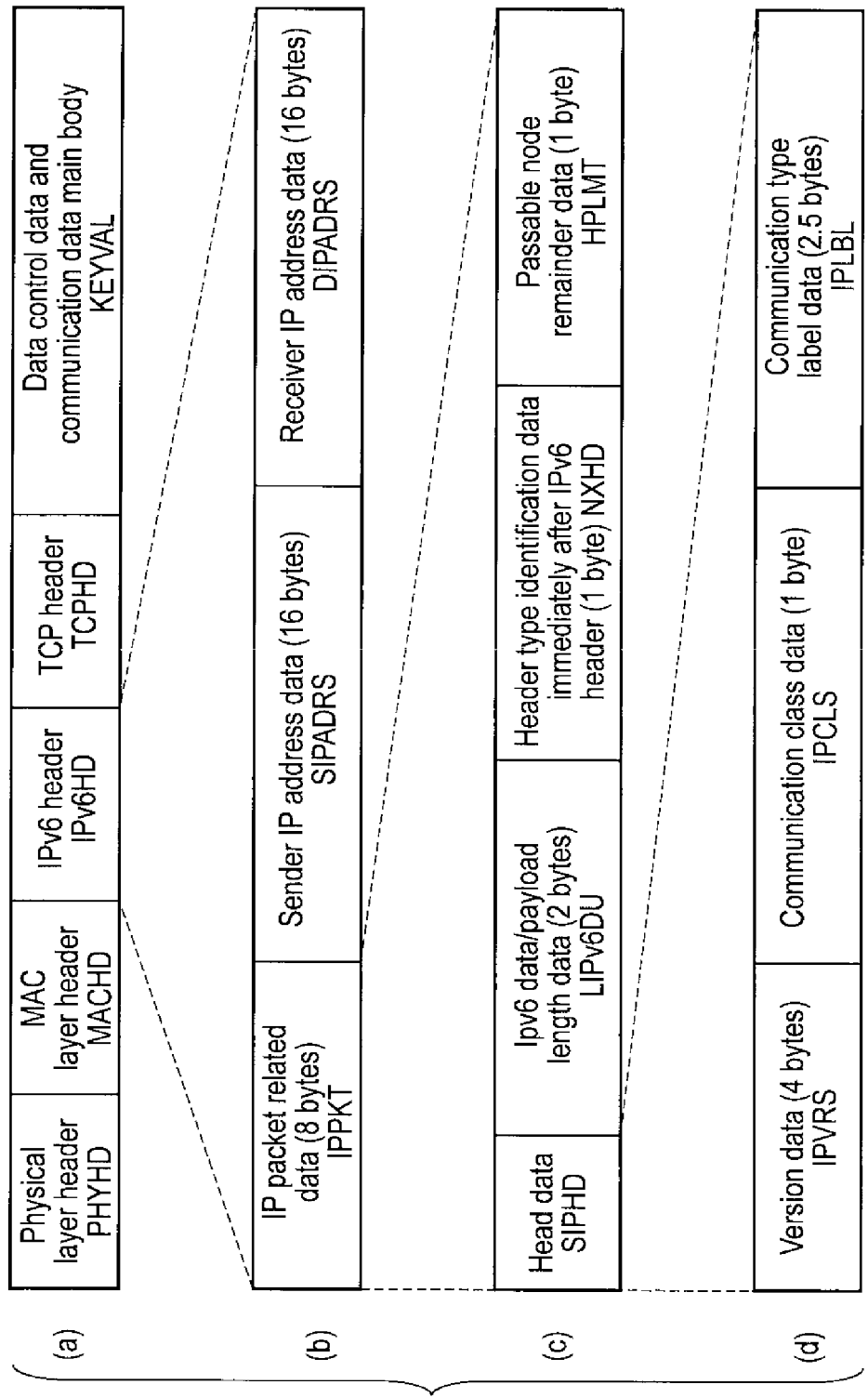
FIG. 3 shows a data structure of IPv6 header.

An IP address mentioned in Section 1.1 is described in the area of IPv6 header IPv6HD of FIG. 2(d). The structure of IPv6 header IPv6 is shown in FIG. 3. Specifically, the area storing sender IP address data SIPADRS and receiver IP address data DIPADRS each described in 16 bytes shown in FIG. 3(b) is important. If these IP addresses are preset in the edge devices 14, 16, and 18 and the devices 20, 22, 26, 32, 34, and 36 in the whole world (Section 1.1), and the data communication can be performed between specific edge devices 14, 16, and 18 and specific devices 20, 22, 26, 32, 34, and 36 from anywhere in the world.

IP packet related data IPPKT are stored in the first 8 bytes area shown in FIG. 3(b) formed in the IPv6 header IPv6HD. Furthermore, as shown in FIG. 3(c), the IPv6 header IPv6HD includes head data SIPHD, IPv6 data/payload length data LIPv6DU, identification data NXHD of header type immediately after the IPv6 header, and passable node remainder data HPLMT, which are arranged in this order. The IPv6 data/payload length data LIPv6DU indicates the data size of the IPv6 data/payload IPv6DU of FIG. 2(d), and the area storing the data has a 2 bytes size.

Furthermore, in a 7.5 bytes area of the head data SIPHD, version data IPVRS of 4 bytes, communication class data IPCLS of 1 byte, communication type label data IPLBL of 2.5 bytes are arranged in this order.

Note that, although FIG. 2 shows a Transmission Control Protocol (TCP) used in the communication path designation, a User Datagram Protocol (UDP) may be used by arranging a UDP header immediately after the IPv6 header IPv6HD as another embodiment.

Section 2.2 Structure of Communication Data Used in Communication Path Other Than Internet In the present embodiment, a level structure can be suitably switched corresponding to the communication path using the communication data structure of FIG. 2 as a standard. With a level structure in the communication data as a standard, the communication data of each communication path is optimized, and efficient data communication is achieved. Furthermore, the level structure is partly shared between different communication paths, and the communication data structure of the communication controller installed in the edge devices 14, 16, and 18, and the devices 20, 22, 24, 26, 32, 34, and 36 can be partly shaped.

For example, since the memory device 26 and the sensor device 36 are installed in the edge device 16 of FIG. 1, direct data transfer is performable between the memory device 26 and the edge agent 47 and between the sensor device 36 and the edge agent 47. When the data transfer is performed, IP address designation or the like is unnecessary, and thus, a complicated data level structure of FIG. 2 is redundant. Thus, only the data control data and communication data main body KEYVAL of FIG. 2 are transferred between the memory device 26 and the edge agent 47 and between the sensor device 36 and the edge agent 47 in the present embodiment.

On the other hand, if a wireless communication such as Wi-Fi or ZigBee is required between the sensor devices 32 and 34 and the edge device 14 or between the memory device 22 and the edge device 14 of FIG. 1, the physical layer header PHYHD and the MAC layer header MACHD (FIG. 2) conforming to the wireless communication standard are required. Thus, in the present embodiment, only the data control data and communication data main body KEYVAL are directly arranged in the MAC layer data or payload MSDU of MAC layer related to the communication path (arrangement of IPv6 header IPv6HD and TCP header TCPHD is omitted). A method of performing data communication while the arrangement order of the headers shown in FIG. 2(a) is maintained and a part of header arrangement is deleted will be referred to as switching the level structure in the communication data.

Section 2.3 Structure of Data in Data Control Data and Communication Data Main Body FIG. 4 shows a data structure of the data control data and communication data main body KEYVAL of FIG. 2. In the present embodiment, the data control data and communication data main body KEYVAL includes data control data KEYPRT arranged in the first position and communication data main body VALPRT arranged in the second position (FIG. 4(b)).

As shown in FIG. 4(c), a prefix PRFIX is arranged in a first 1 byte area in the data control data KEYPRT. In the present embodiment, a bit display "11111111" is set in the prefix PRFIX. Since 1 continues for 1 byte, synchronization of timing (and reset thereof) is easy in the communication controllers of the edge devices 14, 16, and 18 and devices 20, 22, 26, 32, and 34.

In the present embodiment, data transferred via the network is a combination of preceding control data CNTINF (this part may be referred to as key) and following communication data main body VALPRT (this part may be referred to as value). Since the basic structure of the communication data is simplified and a process in the communication controller of the edge devices 14, 16, and 18 and the devices 20, 22, 26, 32, and 34 are simplified, and furthermore, the communication data in the communication path can be partly shared as explained in Section 2.2.

In the present embodiment, a transferable data size in one data communication is set to 2M bytes or less, and if a large amount of data communication is continuously required for a long period of time, the data communication is performed by dividing the data into a plurality of physical layer frames PPDU (FIG. 2(f)). Since the data communication above 2M bytes is divided and transferred, the communication path is not occupied for a long period of time and emergency data communication is performable.

Furthermore, allowable data size of control data CNTINF is set to approximately 2M, and thus, communication of complex control data CNTINF is performable.

In the present embodiment, the size of each of the control data CNTINF and the communication data main body VALPRT is set optionally to increase flexibility of data communication. In order to individually transfer the size of the control data CNTINF and the size of communication data main body VALPRT, as shown in FIG. 4, an area to notify control data size CI_SZ and an area to notify communication data main body size DAT_SZ are set by 4 bytes.

Here, when the control data size CI_SZ and the communication data main body size DAT_SZ are notified in advance to the control data CNTINF and the communication data main body VALPRT, data reception preparation in the communication controller of the edge devices 14, 16, and 18 and the devices 20, 22, 26, 32, and 34 can be performed smoothly.

For example, if, in FIG. 1, the sensor device 32 includes an image capture part and the sensor device 34 includes a voice input part, and video change data and voice change data can be collected chronologically, sensor data are collected and date data at the time of data collection are required. Furthermore, if the sensor device 36 of FIG. 1 includes a light receiver (configured to perform detection of a light amount change), and the light amount change is arbitrarily collected as the time passes, sensor data and date data at the time of data collection are required.

In response the above requests, in the present embodiment, sensor data continuously collected by the sensors are divided by every 188 bytes as data main bodies DATA-1, DATA-2 as shown in FIG. 4(*d*), and data collection time data (which may include date of collection) of each of Data main bodies DATA-1, DATA-2 may be inserted at their preceding positions as 4 bytes time stamps TSTP-1, TSTP-2. Thus, the data collection time data of data main bodies DATA-1, DATA-2 can be checked when the sensor data continuously collected by the sensors are played (in the edge agent 44 of FIG. 1), and the data analysis can be performed efficiently with high accuracy.

Note that, other than the sensor data, the management data 62 of FIG. 1 and data of common keys 52, 54, and 56 may be transferred in the present embodiment. In that case, the date data of data collection or generation and update of new data are not necessarily mixed in the communication data main body VALPRT, and such data may be described in a part of the file name or may be set as attribution data of the file. Thus, in the case, mixture arrangement of the time stamps TSTP-1, TSTP-2 may not be performed as shown in FIG. 4(*d*), the data main bodies DATA-1, DATA-2 may be packed and the management data 62 and data of common keys 52, 54, and 56 may be arranged therein.

Figure 5:
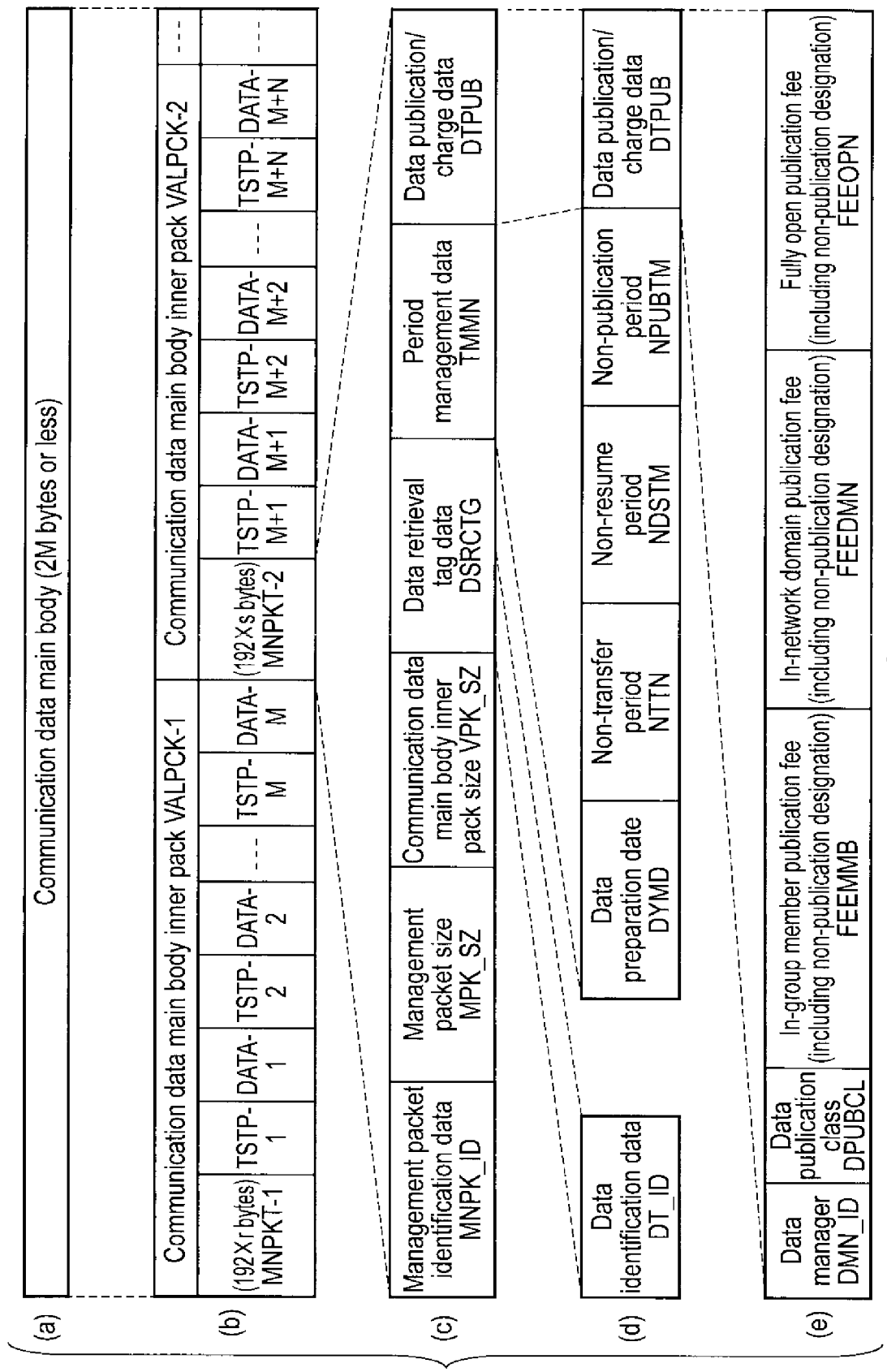
FIG. 5 shows a data structure of a communication data main body.

Another application example of a data structure of the communication data main body VALPRT shown in FIG. 4(*d*) is shown in FIG. 5. FIG. 5 shows management data of data contents and data attribution of the communication data main body VALPRT are gathered and stored in a management packet MNPKT and are arbitrarily inserted into the communication data main body VALPR (multiplying the management packet MNPKT).

In the conventional technique, prepared data are often stored in a location where the data are prepared for a long period of time. In contrast, in the present embodiment, a storage location (record location) of data prepared is arbitrarily moved to a different memory area (in the memory devices 20, 22, and 26 and the memory 6). When the storage location (record location) of data is moved to a different memory area, a risk that the management data of the moved data may be lost in the process. When the management data preliminarily inserted in the communication data main body VALPRT as shown in FIG. 5, the management data can easily be restored even if the management data stored in a different location is lost. Thus, the credibility of the communication data main body VALPRT increases.

In the application example of FIG. 5(*b*), the communication data main body VALPRT includes one or more communication data main body inner packs VALPCK-1, VALPCK-2 and management packets MNPKT-1, MNPKT-2 are arranged in the head positions of the communication data main body inner packs VALPCK-1, VALPCK-2, respectively. A cut position of the communication data main body inner packs VALPCK-1, VALPCK-2 may correspond to a change position of contents in the communication data main body VALPRT or may be divided after a certain period of time. Or, the communication data main body VALPRT may be divided into communication data main body inner packs VALPCK-1, VALPCK-2 mechanically per certain data size.

In FIG. 5(*b*), the communication data main body inner pack VALPCK-1 includes data main bodies DATA-1 to DATA-M each of which is 188 bytes and the communication data main body inner pack VALPCK-2 includes data main bodies DATA-1 to DATA-N. If a cut position between the communication data main body inner packs VALPCK-1, VALPCK-2 differs corresponding to the content of the communication data main body VALPRT as mentioned above, M and N are different (M≠N).

Furthermore, if the main body is divided at certain time intervals and image compression ratio is changed by some scenes, the data sizes of communication data main body inner packs VALPCK-1, VALPCK-2 are different. On the other hand, if the communication data main body inner packs VALPCK-1, VALPCK-2 are divided mechanically per certain data size, the sizes of the communication data main body inner packs VALPCK-1, VALPCK-2 match (M=N).

Figure 14:
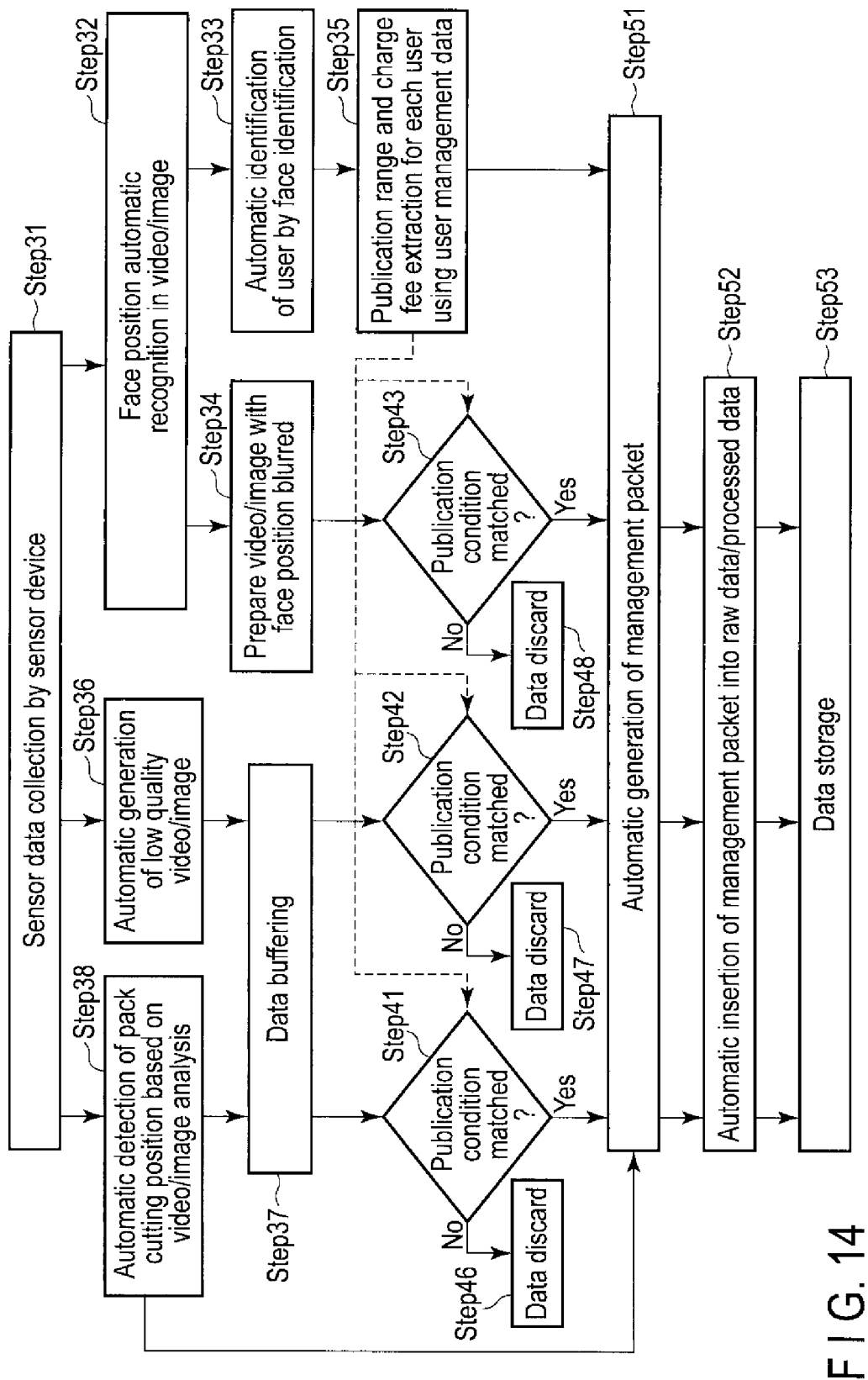
FIG. 14 shows a method of preparing management packet based on management data of user.

Note that, in order to automatically set a cut position of communication data main body inner packs VALPCK-1, VALPCK-2 to correspond to a change position of contents of the communication data main body VALPRT, the sensor data collected by the sensor device 32 may be automatically analyzed by the edge agent 44 (and device agent mounted on the sensor device 32, which is not shown) and the sizes of the communication data main body inner packs VALPCK-1, VALPCK-2 may be automatically set as shown in step 38 of FIG. 14 (cf. Section 3.2).

Note that the present embodiment is not limited to the structures of FIGS. 4(*d*) and 5(*b*), and a time stamp TSTP may not be inserted and a management packet MNPKT may be inserted at certain time intervals without forming the communication data main body inner packs VALPCK-1, VALPCK-2.

As shown in FIG. 5(*c*), management packet identification data MNPK_ID is arranged in the head position of each management packet MNPKT. As a specific code content in the management packet identification data MNPK_ID, a special code which does not occur in the other part of the communication data main body VALPRT may be set. Generally, many of data communicated on the network are transferred in modified codes. For example, if the upper limit value of the times where 1 continues (without 0 inserted therein) in a modified binary code is set to m, by including a code in which 1 continues for m+n (n is a positive integer which is 1 or more) in the management packet identification data MNPK_ID, a special code which does not occur in the other part of the communication data main body VALPRT can be set. Thus, the edge agent (or device agent or small agent) can easily extract the position of management packet MNPKT.

As mentioned above, since the time stamp TSTP size is 4 bytes and the data main body blocks DATA-1, DATA-2 are 188 bytes, processing in the agent side becomes easy if the management packet MNPKT size is set to an integer multiplication of 192 bytes. Furthermore, the management packet MNPKT size is variable in order to flexibly change the data contents inserted into the contents of the communication data main body VALPRT. In relation to this, the management packet size MPK_SZ of per management packet MNPKT is arranged directly after the management packet identification data MNPK_ID. Thus, the edge agent (or device agent or small agent) can easily distinguish the management packet MNPKT and other packets.

Furthermore, by including the pack size data (communication data main body inner pack size VPKSZ) of communication data main body inner packs VALPCK-1, VALPCK-2 in the management packet MNPKT, the edge agent (or device agent or small agent) can easily extract only the management packet MNPKT in the communication data main body VALPRT.

In the present embodiment, as management data of sensor data collected by the sensor devices 32, 34, and 36, data assisting data retrieval, data managing time and period of data, and data related to disclosure of data and to fee charge at the time of disclosure may be stored in the management packet MNPKT.

If the following data assisting the data retrieval are added to the sensor data, data retrieval on the internet 2 is easily performable. Section 1.1 explains that the edge agents 44, 47, and 48, small agent 40, and device agents 42 and 46 are applied to the edge devices 14, 16, and 18, and the analysis of the obtained data is performed. Then, keywords and symbols/icons extracted as a result of the data analysis are tagged and stored in the data detection tag data DSRCTG, and a management packet MNPKT is automatically generated in the management packet automatic generation step 51 of FIG. 14. Note that the data storable in the data retrieval tag data DSRCTG are not limited thereto, and any data related to data retrieval may be stored.

In the period management data TMMN storable in the management packet MNPKT, data of data preparation date DYMD indicate the date when the data are prepared. Here, a method of describing the date data adopts a display method of date and time defined by ISO 8601 as described in FIG. 8. A type of the data preparation date indicates a date of collection of sensor data by the sensor devices 32, 34, and 36. In parallel to this, data after process of the sensor data is prepared as shown in steps 34 and 36 of FIG. 14. Thus, in the processed data and the analyzed data, date of data processing and date of data analysis correspond to the data of the data preparation date DYMD.

In Japan, time capsules were trend for a certain period of time. For example, time capsules were buried under the ground of elementary schools and junior high schools and the capsules were dig up after twenty to thirty years for nostalgia. For a nostalgic purpose, after specific data are stored, use thereof may be prevented for a particular period of time (for example, twenty to thirty years). To enabling this time capsule effect, non-transfer period NTTN may be stored in period management data TMMN and transference may be banned from the memory device 22 (or memory 6) for the period of time. Similarly, if data communication (transfer) via the network is allowed but resume thereof is banned for a certain period of time, data corresponding to a non-resume period NDSTM (for example, attribution data such as messages and still image data) may be stored in an area of the memory device 22 (or memory 6) recording the non-resume period NDSTM.

In patent laws of many countries, a patent application is not published for a year and a half for convenience of applicants. As in such a case, data publication is sometimes required after a certain period of time. To answer to the request, a non-publication period NPUBTM may be set in an area of the management packet MNPKT where the period management data TMMN can be stored. For example, the data can be published from a date of the data preparation date DYMD to which the non-publication period NPUBTM is added.

There may be a social demand that the data collected by the sensor devices 32, 34, and 36 and the data prepared by users are used such that the data may be published while a range of publication is limited and that the data may be published if publication fee is collected. In the present embodiment, data related to the data publication and data related to charging at that time are transferrable together with the data main body. As a result, stored data can be used by many people and the data can be actively used for the community. Furthermore, data stored as the period management data TMMN are not limited to the above example, and any data related to the time and period may be stored therein.

As an area in which the data publication/charging related data can be stored, an area storing data publication/charging data DTPUB may be set in the management packet MNPKT. Data manager identification data (ID) DMN_ID indicative of a person (or organization) who determines whether or not the data are published and a charging fee at the time of data publication are arranged in the head position of the data publication/charging data DTPUB in order to allow the dispersed server group 4 and various agents 40, 42, 44, 46, 47, and 48 to determine whether or not the data are published in the early stage. The data publication here is not limited to viewing data and it means allowance of data use including using the data and processing the data.

Note that data publication class DPUBCL may be described in each of the data. A widest data publication level may be a level where everyone can use (view/use/process) via the internet 2. In this publication level, the publication is not only performed through the internet 2, and the publication may be performed by viewing a paper on which the data contents are printed and may be performed by copying the data in a non-network data memory medium.

In the present embodiment, a narrower data publication level may be a level where the data publication is performed in a specific network domain managed by a specific dispersed server group 4. The specific network domain indicates accessing to the internet 2 line managed by a certain organization using a user ID and a password 10 (FIG. 1). The certain organization may be a certain nation, corporation, NPO organization, service target group, and the like.

In this case, the data use may be allowed to a group member who commits a particular job in the certain organization or by group members who belong to some different organizations such as forums but participate an activity of common target. The publication range of the data publication class DPUBC may be narrower than the above case where the data publication is performed in the network domain. The group members may be preliminarily set members of a certain social networking service (SNS) or members of a certain mailing list.

The narrowest data publication class may be a range where the data is published to a person who prepared the data or persons designated by the person who prepared the data. Specifically, the data publication class DPUBCL of FIG. 5(e) means a class defining a data publication range for free; however, in the present embodiment, a data publication range may be set by defining a specific publication fee.

For example, a user may consider data publication is not allowed for free but is allowed for a data publication fee. To answer this request, in the present embodiment, income fees obtained in the data publication time may be set for data publication classes. That is, publication fee FEEOPN required when the data are completely published on the internet 2, network domain publication fee FEEDMN, and specific group member publication fee FEEMMB are individually set to a record area of the data publication/charge data DTPUB.

As a setting method of the publication fee, the monthly publication fee of each communication data main body inner pack VALPCK may be set to dollar-base or cent-base. Furthermore, instead of setting the price to the area, "No", "forbiddance", or "forbidden" may be described to indicate data publication banned.

As will be described later in Section 3.2 with reference to FIG. 12, the number of users related to data publication/charging may change continuously depending on the sensor data. In that case, for example, the communication data min body inner pack VALPCK is divided when the users related to the data publication/charging change, and the data publication class and the publication fee may be set in each of the communication data main body pack VALPCK. That is, in the present embodiment, the data publication/charging data DTPUB can be set in each management packet MNPKT arranged in each communication data main body inner pack VALPCK, and thus, the data publication/charging can be managed even if the users contained in the data frequently change. Note that the data storable in the data publication/charging data DTPUB are not limited to the above example, and any data related to the data publication, charging, and fee may be stored in this area.

Figures 6, 7:
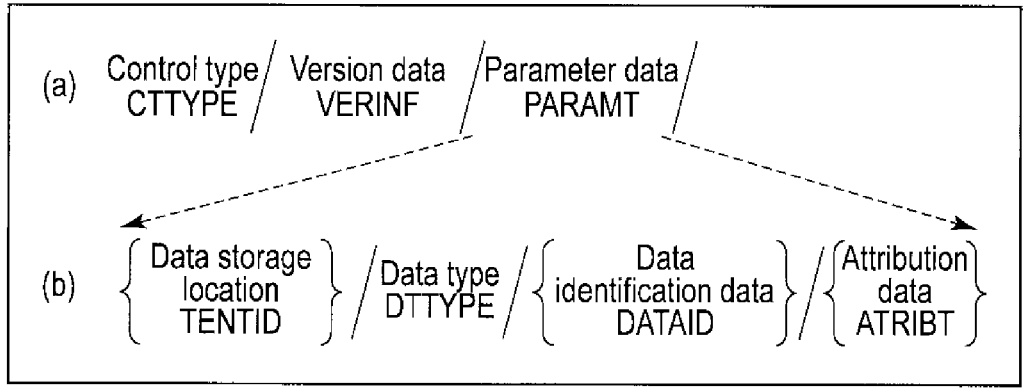
FIG. 6 shows a description format of control data.
FIG. 7 shows an example of a relationship between control type contents and parameter described in the control data.

A description method of control data CNTINF of FIG. 4(c) is shown in FIG. 6. A control type CTTYPE is described in the head position in the control data CNTINF, and thus, a quick reception response is performable in the communication controller in the edge devices 14, 16, and 18 and the devices 20, 22, 26, 32, and 34. Furthermore, the description method in the control data CNTINF changes successively at every time when the standard is updated. Thus, in order to respond to such a successive change, "/" is arranged immediately after the control type CTTYPE to describe version data VERINF. Furthermore, as will be explained later with reference to FIG. 7, required corresponding parameters are different for each of the contents of control type CTTYPE. Thus, "/" is arranged immediately after the version data VERINF and the corresponding parameter data PARAMT is described thereafter.

An example of description data in the parameter data PARAMT of the present embodiment is shown in FIG. 6(b). The original sensor data collected by the sensor devices 32, 34, and 36 (FIG. 1) (analyzed data obtained from a result of the analysis of sensor date) are stored (recorded or saved) in the memory devices 20, 22, and 26 and the memory 6 in the dispersed server group 4. The storage location is described in the description location of the data storage location data TENTID in "{-}". At that time, the description is made in Uniform Resource Identifier (URI) corresponding to the internet 2. In general, as a description method of the URI, a domain name such as "//www.**.co.jp/$$$" is described, for example. However, if the memory device 20 is isolated, for example, an IP address explained in Section 1.1 and Section 2.1 with reference to FIG. 3(b) may be directly described. Furthermore, if an IP address is directly described as an URI, a partition ID and its corresponding drive ID data may be described together.

In the example of FIG. 1, the data communication related to the sensor data obtained in the sensor devices 32, 34, and 36, management data 62, and data of common keys 52, 54, and 56 is shown. However, in the present embodiment, any type of data including non-file data and data of analogue data after quantization can be handled. In that case, data recorded in a file format such as management data 62, and data of common keys 52, 54, and 56 will be referred to as PC data, data of still images will be referred to as image data, and video and audio data will be referred to as stream data, for example, and data to continuously detect a time change condition for a certain period of time (sensor data) will be referred to as real time data. However, type classification is not limited to the above example, and in a different classification method, image data, stream data, and real time data may be classified altogether as object data, for example. Such data classification data may be described in "/-/" as shown in FIG. 6.

In order to efficiently receive data of any type in addition to the sensor data obtained from the sensor devices 32, 34, and 36 shown in FIG. 1, data identification data DATAID may be described in the parameter data PARAMT of each of the communication data as a form of "{-}". Furthermore, each attribution type of the communication data or the communication method is described in "{-}" as attribution data ATRIBT. If there are a plurality of contents of attribution data ATRIBT and parameter data PARAMT, each of them is described in a form of "-":"$$$", and they may be connected with "comma(,)".

An example of contents of control of data communication handled in the present embodiment is shown in FIG. 7. As a control type CTTYPE described in FIG. 6(a), "GET" related to a request and a response of data reception and data collection, "PUT" related to data transference and storing control in the memory devices 20, 22, and 26 or the memory 6, and "DELETE" related to data deletion may be defined. Furthermore, in addition to the above, the control type CTTYPE of other type may be defined.

As contents to be described as the parameter data PARAMT of FIG. 6(a), in the present embodiment, corresponding parameter contents are set in advance as shown in FIG. 7. For example, a request parameter related to "request" (Section 1.1) and a response parameter corresponding to "response" (Section 1.1) are defined in advance as parameters corresponding to "GET". Similarly, contents of request parameters are defined in advance with respect to "PUT" and "DELETE" as the control type CTTYPE.

Section 1.1 explains that the controlled side performs transferring status to the controller side. As a type of status, "ALERT" may be defined to perform a preliminary alert (alarm notification) of risk in the sensor devices 32 and 34 and the memory devices 20, 22, and 26. The contents of the status parameter are defined in advance with respect to "ALERT".

An example of description in the control data CNTINF according to the description rule explained in FIG. 6 is shown in FIG. 8. As mentioned above, the sensor data obtained continuously for a certain period of time by the sensor devices 32, 34, and 36 are classified as real-time data (or RTdata).

An example of description at a time of request using "GET" related to the real-time data is shown in FIG. 8(a), and an example of description at a time of response using "GET" is shown in FIG. 8(b). Furthermore, an example of description at a time of request using "GET" is shown in FIG. 8(c). In each case, identification data of real-time data are represented by "$$$" and described as "RTdata_id": "$$$". Furthermore, "real-time data" of FIGS. 8(b) and 8(c) indicates the communication data main body VALPRT (FIG. 4(b)) and are added for reference.

If reception of the real-time data is requested, a period of time in which the real-time data are collected must be determined. Thus, a collection period of the real-time data requested is described as "Time-Zone":"###-##&". Here, "###" indicates data collection start date data (data collection date data of a location where the communication starts), and "##&" indicates data collection period data (data collection period data to a location where the communication ends).

In the present embodiment, a method of data display defined by ISO 8601 as a display method of date data. For example, five minutes from 9:49:58, Aug. 27, 2015 is displayed as "2015-08-27T09:49:58-5:00". By describing the above period data instead of the end date of data collection (transfer start location), the whole data size of the description data is reduced and fine time interval control can be performed easily and accurately. Furthermore, with the description method standardized by the world standard, the time management can be commonly performed in every place in the world.

The side requesting "GET" does not know the size of transferred communication data main body VALPRT in advance. In consideration of this point, by preliminarily notifying the data size as shown in FIG. 8(b), the size of a memory area prepared (to be used for recording/storing) in the receiver side is known. Thus, data recording/storage in the receiver side or the preparation of the display are performed smoothly. In FIG. 8(b), "content-length" indicates the data size of communication data main body VALPRT, and the actual data size is described in "%%%" in a byte unit.

As another application example on the basis of FIG. 8(c), a description example further defining the parameter data PARAMT of FIG. 6(a) is shown in FIG. 8(d). Therein, retrieval related data SRCINF used in the data retrieval, period management data TMMN related to various time data (period data) on data management, data publication/charging data DTPUB related to data publication condition and charging data of the whole communication data main body VALPRT, and data main body attribution data DTATTR indicative of arrangement data related to data contents, data attribution, or data storage location of the communication data main body VALPRT, and the like may be described.

The contents of management packets MNPRK-1, MNPKT-2 described above with reference to FIGS. 5(c) to 5(e) are data which may change corresponding to each of the communication data main body inner packs VALPCK-1, VALPXK-2 while the contents described in FIG. 8(d) are common data related to the whole communication data main body VALPRT (FIG. 3(b)). Furthermore, the data of the management packet MNPKT are recorded together in the memory area recording the data main bodies DATA-1, DATA-2 while the description contents of FIG. 8(d) cooperate with the management data 62, 64, and 66 of FIG. 1 and are related to a recording location in the memory area.

As indicated in step 2 of FIG. 9B and steps 32 and 38 of FIG. 14, in the present embodiment, sensor data collection and analysis of the collected data are performed at the same time in the device agents and the edge agents 44, 47, and 48 in the sensor devices 32, 34, and 36. As a result, retrieval keywords of each of the communication data main body packs VALPCK-1, VALPCK-2 are successively recorded in the management packet MNPKT. Then, keywords commonly extracted from the entire communication data main body packs VALPCK-1, VALPCK-2 or keywords which are frequently extracted are selected and described as a part of the retrieval related data SRCINF.

The retrieval keywords may be described as many as possible (while they do not exceed the maximum data size of 2M bytes which is acceptable as the control data CNTINF of FIG. 4(c)). Thus, the number of described retrieval keywords is included in a value of "number_of_key-word". In that case, the described retrieval keywords are described continuously divided by comma (,) after the area defined by "key-word". Note that, in addition to the above, any data useful for data retrieval can be described as a part of the retrieval related data SRCINF in the present embodiment.

"Record-start_Time" described in the area where the period management data TMMN are described indicate the date data when the data collection starts corresponding to ISO 8601. Furthermore, if use of the corresponding communication data main body VALPRT are required to be banned for a certain period of time, "Forbidden-Transmission_Period" is used to designate a period of time to ban the use. That is, after a certain period of time (Forbidden-Transmission_Period) from the date when the data collection starts (Record-start_Time), the data communication of the corresponding communication data main body VALPRT via the network is allowed for the first time.

As described in Sections 3.3 and 3.4, in the present embodiment, the communication data main body VALPRT may be moved to a memory in the dispersed server group 4 and other memory devices 20 and 26 in some cases. In that case, how long the data are stored in the data storage location by "Preservation Period". That is, "Preservation Period" indicates a period of storage from the date of data collection (non-erasable period). However, during this period, erase of the whole data main body is banned but partial correction and partial deletion are allowed.

Note that, in addition to the above data, any data related to time and period may be described as a part of the period management data TMMN. For example, to sensor data collected from the sensor devices 32 and 34 of FIG. 1 (or analyzed data), retrieval related data SRCINF and period management data TMMN are added in the edge agent 44, and communication data of the data control data and communication data main body KEYVAL shown in FIGS. 4(a) and (b) are generated. The communication data generated here are handed to the device agent 42 in the memory device 22 via the network communication path. Then, the device agent 42 separates the data control data KEYPRT and communication data main body VALPRT, and only the communication data main body VALPRT is recorded in a memory area of the original data in the memory device (or memory area of analyzed data). On the other hand, the data control data LEYPRT separated and extracted in the device agent 42 are converted in a different format and stored in the management data 62.

In future, the communication data main body KEYVAL (or a part thereof) is moved in the memory of the dispersed server group 4 or to the other memory devices 20 and 26, necessary data are extracted from the management data 62 and the data control data KEYPRT are generated, and then, transferred in a form of the data control data and communication data main body KEYVAL.

On the other hand, data publication/charge data DTPUB of FIG. 8(d) effects a record location in a memory area. In the present embodiment, as will be described later in Section 3.3 with reference to FIG. 10, a record location in the memory area may be changed corresponding to a data publication class. Thus, a data storage location may be changed in the memory device 22 corresponding to description contents (pbc) of "Publication_Class" in the data publication/charge data DTPUB of FIG. 8(d).

As described above with reference to FIG. 5(e), the data publication class DPUBCL may be changed for each of the communication data main body inner packs VALPCK-1, VALPCK-2. Thus, as a publication class described as "Publication_Class" may be the widest publication class in the data publication class DPUBCL set in the whole communication data main body inner packs VALPCK. On the basis of the description contents of "Publication_Class", the data storage location of the memory device 22 is determined. Then, in a future data communication time, the device agent 42 or the edge agent 44 may interpret the data publication class DPUBCL of each of the communication data main body inner packs VALPCK-1, VALPCK-2 to select the communication data main body inner pack VALPCK used for data resume or data communication.

Similarly, a publication fee described in "Publication_Fee" in the data publication/charge data DTPUB is set to the lowest fee of the publication fees corresponding to the data storage location set in the communication data main body inner pack VALPCK. When the lowest fee and the widest publication class are described, the possibility of retrieval is increased when necessary data retrieval is performed in future. Note that, in addition to the above explained data, any data related to the data publication and publication fee may be described as a type of data publication/charge data DTPUB.

Specifically, when data which can be published to only a limited range are transferred via the internet 2, data encrypted using the common key 54 preliminarily recorded in the memory 6 of the dispersed server group 4 or the memory devices 22 and 26 are transferred. At that time, a data communication format is described as a value of "Encryption" in the data main body attribution data DTATTR. That is, if the communication data are encrypted, the value is described as "Yes", and if the communication data are in plain form, the value is described as "No".

As will be described in Section 3.4 with reference to FIG. 19B, if the communication data main body KEYVAL is dispersed in the memory of the dispersed server group 4 and in the other memory devices 20 and 26, the condition is recorded in the management data 62, 64, and 66 of FIG. 1. Then, when a part of the dispersed data is moved via the network, a value of "Data-Distribution" is described in "Yes" to notify that the data are dispersed. With this data, the receiver side easily understands whether or not the related data are dispersed and the data management is easily performed. Note that, as will be described later in Section 3.5 with reference to FIG. 21, the related data arranged in a dispersed manner are all collected using an inquiry via the internet 2.

In the present embodiment, as an example of a method of proving the credibility of stored data, a method of error correction using a parity code will be described in Chapter 5 with reference to FIG. 24. Dispersion arrangement of data in the same error correction code (ECC) block may be described by "Block-Distribution". If the value is "Yes", the data are dispersed in the ECC block, the data may be restored by an error correction function even if any of the memory devices 20, 22, and 26 may break or may be detached from the network system.

When the data control data KEYPRT (FIG. 4(b)) are transferred using a communication line of the internet 2, the data can be described in a text format as shown in FIG. 8. On the other hand, when the transference is performed in a non-internet communication line, a function to interpret a text (characters) is too much to request to, for example, the sensor device 36 and the device agent 46 in the memory device 26 shown in FIG. 1. Thus, in the present embodiment, when the data communication using such a communication line is performed, only the code data corresponding to the description contents (each character) shown in FIG. 8 are transferred. Then, by providing a correspondence table between the code data and the process contents with the device agent 46 in advance, and data communication control of the device agent 46 is performed with less workload.

Chapter 3 Data Communication Method in Network Path

A method of performing data communication in a network path using the communication data having the structure explained in Chapter 2 will be explained. Specifically, in the present embodiment, edge agents 44, 47, and 48 are resident in the edge devices 14, 16, and 18, and furthermore, the small agent 40 and the device agent 42 can be resident in the devices 20, 22, 26, 32, and 34, and they each have an autonomous processing function. The embodiment using the autonomous processing function will be explained mainly.

Section 3.1 Data Collection and Data Analysis

As a first example using the autonomous processing function by the agents, a method of performing analysis of data collected in parallel to the data collection and storing data of a result of the analysis in parallel to the collected raw data will be explained. Specifically, here, the data continuously collected for a long period of time from the sensor devices 32, 34, and 36 are handled, and on the basis of the result of data analysis, new service to an end user may be provided. At that time, a service can be provided with an active end user. Furthermore, on the basis of the result of data analysis, a user behavior estimation or a user request estimation may be performed.

For example, a healthy user rarely takes a long time sleep in the daytime, and in many cases, end users are active in the daytime. In the present embodiment, data collection and real-time data analysis are performed at the same time by the edge agents 44 and 47, and thus, a new service can be provided at a proper time while the users are active.

Figure 9A:
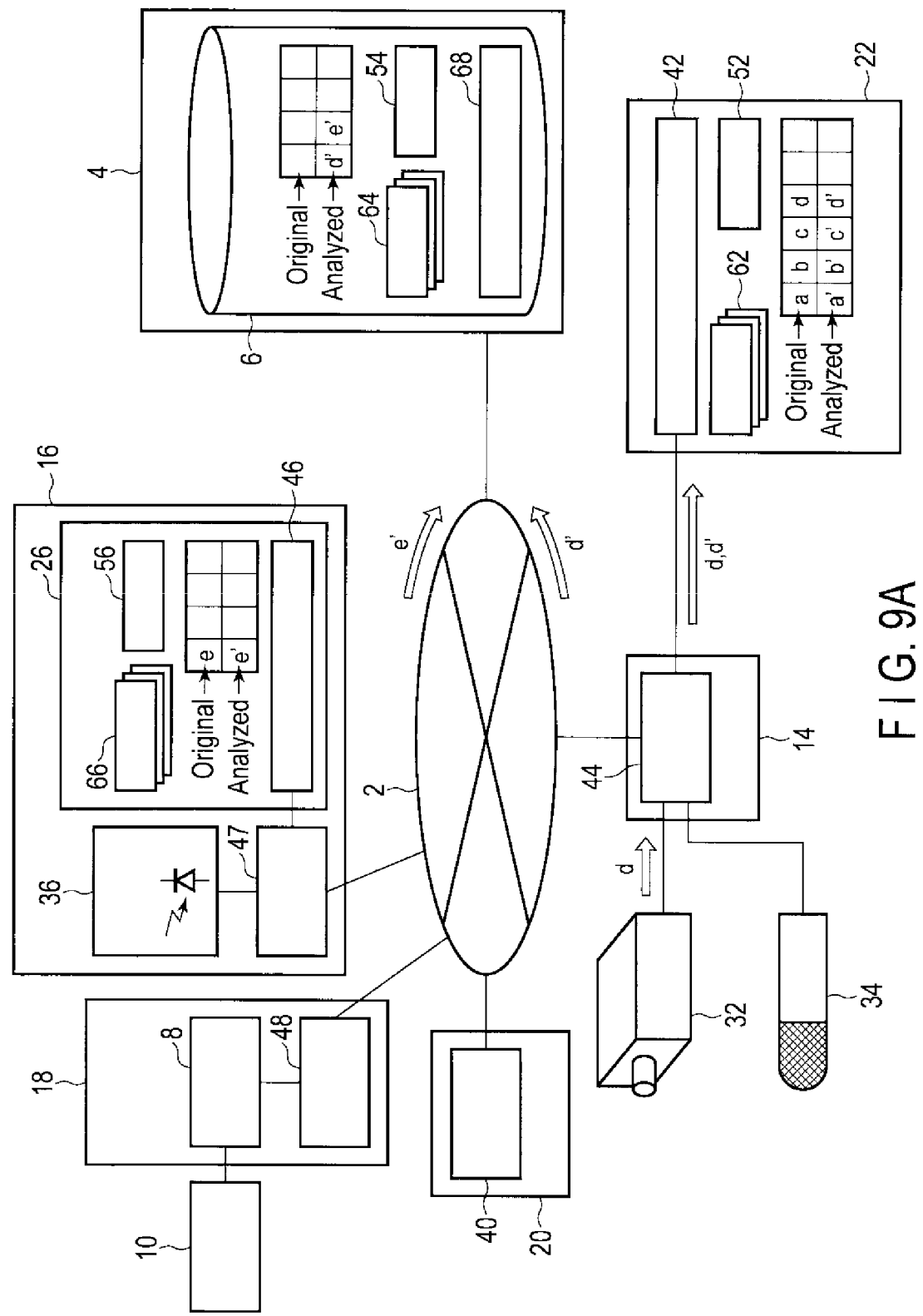
FIG. 9A shows a movement path of collected data and analyzed data in an edge device.

With reference to FIG. 9A, an example where sensor data related to behavior of an end user are collected by the sensor device 32 with an image capturing function, sensor device 34 with an voice input function, and sensor device 36 with a light amount change detection function (optical sensor function) at the same time (data collection step 1 in FIG. 9B) will be explained. The data communication path and data communication flow in that case are shown in FIG. 9A and the operation flow is shown in FIG. 9B.

Original data d collected by the sensor devices 32 and 34 are sent to the edge agent 44, and data analysis is performed by the edge agent 44 (data analysis step 2 of FIG. 9B). Furthermore, in parallel, the original data d are stored in the memory device 22 (raw data storage step 3 of FIG. 9B). Note that, if preceding original data c are required for the data analysis in the edge agent 44, the data are arbitrarily transferred to the edge agent 44 from the memory device 22.

At the same time, original data e collected by the sensor device 36 are sent to the edge agent 47, and the data analysis is performed in the edge agent 47 (data analysis step 2 of FIG. 9B). In parallel, the original data e are stored in the memory device 26 (data storage step 3 of FIG. 9B).

A specific method of data communication related to the original data d and e from the sensor devices 32, 34, and 36 to the edge agents 44 and 47 shown in FIG. 9A will be explained on the basis of Chapter 2. Initially, a request of "GET" as a control type CTTYPE is sent from the edge agents 44 and 47 to the sensor devices 32, 34, and 36. Then, in response to the request from the edge agents 44 and 47, a response of "GET" is sent from the sensor devices 32, 34, and 36 to the edge agents 44 and 47. Then, the response is sent while the original data d and e are included in an arrangement area of the communication data main body VALPRT (FIG. 4b).

Furthermore, when the original data d and e are transferred from the edge agents 44 and 47 to the memory devices 22 and 26, "PUT" as a control type CTTYPE is sent from the edge agents 44 and 47 to the memory devices 22 and 26. Note that, at that time, the original data d and e are included in the arrangement area of the communication data main body VALPRT.

Simple data analysis performed in the edge agents 44 and 47 is performed to provide a new service to end users. For example, users (not only humans but also animals) in an effective view range of the sensor device 32 may be subjected to pattern matching between faces and physical features to distinguishing the individuals in the effective view range. In parallel thereto, speaking users may be estimated by pattern matching between audio data collected from the sensor device 34 and user voice prints. Furthermore, an on/off condition of each illumination device in rooms may be estimated using the collection data from the sensor device 36, and a user movement may be detected from the collection data from the sensor device 36 used as a motion sensor.

A location and a movement condition of each user can be extracted from the data obtained from a result of the analysis as analyzed data d' and e'. If a record capacity of the memory devices 22 and 26 is low, only the number of humans and animals in a certain range may be extracted from a result of the analysis as analyzed data d' and e'. Then, the analyzed data d' and e' obtained here are arbitrarily recorded in the memory devices 22 and 26 as shown in step 3 of FIG. 9B.

As a data communication method of the analyzed data d' and e' (analyzed data generated by the edge agents 44 and 47) from the edge agents 44 and 47 to the memory devices 22 and 26, "PUT" as a control type CTTYPE in the control data CNTINF is sent from the edge agents 44 and 47 to the memory devices 22 and 26. Here, the analyzed data d' and e' are included in the arrangement area of the communication data main body VALPRT.

A simple service provided to the end users by the edge agents 44 and 47 shown in step 4 of FIG. 9B may be, for example, automatically turning on/off an illumination device corresponding to humans and animals coming in/out a certain room and automatically change temperature and humidity setting of an air conditioner of the room.

FIG. 9A shows an example where the sensor devices 32, 34, and 36 are disposed in fixed places. In addition, other data analysis may be performed. For example, with network connectable vehicles (connected car/connected bus/connected truck), analyzed data such as sudden acceleration/sudden start and driver or passenger yawning are obtained as a result of sensor data analysis.

In the present embodiment, in addition to the above, in a step of sending analyzed data of step 5 of FIG. 9B, the analyzed data d' and e' may be sent to the dispersed server group 4. In that case, as a data communication method, a control type CTTYPE in the control data CNTINF sent to the dispersed server group 4 from the edge agents 44 and 47 becomes "PUT", and the analyzed data d' and e' are included in the arrangement area of the communication data main body VALPRT.

Note that, as shown in FIG. 9A, a common key 54 is stored in the memory devices 22 and 26 and the memory 6 of the dispersed server group 4. Thus, when the analyzed data d' and e' are transferred via the internet 2, the analyzed data d' and e' encrypted by the common key 54 may be included in the arrangement area of the communication data main body VALPRT. Thus, credibility with high security can be achieved.

As shown in FIG. 9A, the data communication between the edge agents 44 and 47 and the dispersed server group 4 is via the internet 2. Thus, the communication data structure at this time becomes the structure of FIG. 2. As described above, independent IP addresses are set to each of the edge agents 44 and 47 and (reception server of) the dispersed server group 4 in advance. Thus, the IP addresses of the edge agents 44 and 47 are included in the arrangement area of the sender side IP address data SIPADRS (cf. FIG. 3(b)) and IP address data of (reception server of) the dispersed server group 4 is included in the arrangement area of the receiver side IP address data DIPADRS.

As above, in the data communication via the internet 2, the data control data and communication data main body KEYVAL shown in FIG. 4 are included as they are in the TCP data/payload TCPDU (cf. FIG. 2(c)), and thus, data d' and e' are flexibly sent to any location in the world, and a process load in the data communication by the edge agents 44 and 47 can be significantly reduced.

A method of transferring certain data using an IP address is conventional while a workload in the receiver side is great since a preliminary bundle of a Web browser or a specific soft is required to display and store the transferred data, for example. In contrast, as shown in FIGS. 4 to 8 of the present application, the transference data main body VALPRT and the data control data KEYPRT having a very simple data structure are transferred at the same time. As a result, a workload of preliminary bundle of Web browser and specific soft is not put on the receiver side and the process of transference data is highly simply performed in the receiver side.

As a result of the above process, as shown in FIG. 9A, only the analyzed data d' and e' are stored in the memory 6 of the dispersed server group 4. If an advanced data analysis is performed in the dispersed server group 4 according to step 6 of FIG. 9B, a very long time is required with using the analyzed data d and e. As compared to this, an advanced data analysis is performed using only the analyzed data d' and e', the data analysis can be performed effectively in a very short period of time.

As an example of an advanced data analysis performed in the dispersed server group 4, behavioral analysis and request estimation of each of end users may be cited. For example, an advanced service such as dimming an illumination device of a room and playing calm music when an end user is irritated to calm down the user may be achieved.

Specific contents of advanced service instructions from the dispersed server group 4 to the edge agents 44 and 47 according to step 7 of FIG. 9B may include dimming the illumination device of the room and automatically playing calm music (the user will like), for example.

A method of instruction in this case is that the IP addresses of the edge agents 44 and 47 are included in the arrangement area of the receiver side IP address data DIPADRS (cf. FIG. 3(b)) and IP address data of (reception server of) the dispersed server group 4 is included in the arrangement area of the server side IP address data SIPADRS.

Furthermore, "PUT" is set in a control type CTTYPE in the control data CNTINF (FIG. 6(a)), and the brightness of the room after dimming and contents of music used are stored in the storage area of the communication data main body VALPRT. Furthermore, a period of time to output the music may be set in "Time-Zone" of FIG. 8(*c*). With such simple data control data KEYPRT, a very advanced service is provided with end users.

Specific contents of providing advanced service with respect to end users described in step 8 of FIG. 9B include that the edge agents 44 and 47 drive a drive device (which is not shown in FIG. 9A) connected to the network along the specific instruction contents from the dispersed server group 4.

The advanced data analysis and the advanced service provided with end users explained with reference to FIGS. 9A and 9B are not limited to the above examples, and any data analysis and any service are achievable by the present embodiment.

Section 3.2 Data Analysis and Data Publication/Charge Condition Corresponding to Personal Information Protection The communication data handled in the present embodiment include personal information, and personal information corresponding to each person must be protected. In order to handle very sensitive data of each person, in the present embodiment, user management data shown in FIG. 10 may be included as a part of the memory of the dispersed server group 4 and the management data 66 of the memory devices 20, 22, and 26.

As an example of data publication class setting which indicates a range of data publication (usage), a method of setting a publication level of data is explained in Section 2.3 where a certain network domain or a certain group member is used as a unit. Data of all members participating the network domain or certain members included in a certain group may be obtained using the above method to prepare the management data of FIG. 10.

Vertical lines of FIG. 10 show individual data of users U1, U2, U3, . . . , while the vertical lines may be described using a family, organization, or specific group as a unit. In FIG. 10, data related to individual user data USEINF, user identification data USRECG, user attribution data USBL, and data publication condition data PUBCND are described.

When user identification data USR_ID and password PASSWD are included in the individual user data USEINF, users who participate the domain managed by the dispersed server group 4 using the user identification data USR_ID and password PASSWD can easily be identified. Furthermore, the dispersed server group 4 and the edge agents 44, 47, and 48 inquire whether or not a certain data are published can be inquired to users using the data of E-mail address EMADRS.

Many ordinary users do not like publication of personal information while a certain amount of users will publish personal information if a publication fee is paid at the time of publication of personal information. Thus, information users can automatically transfer a publication fee to a fee transfer bank account BNKACT when data publication condition data PUBCND are meet (or agreed) or when a publication approval of personal information using the E-mail address EMADRS.

For example, if sensor data are collected by the sensor device 32 (FIG. 1 or 11), the dispersed server group 4 and the edge agents 44, 47, and 48 must automatically identify whether or not personal information is included in the sensor data. As user identification data USREC used in the automatic identification, the dispersed server group 4 and the edge agents 44, 47, and 48 may use face recognition link destination data FRECLK and fingerprint match link destination data FGPRLK. Such data include link data of corresponding database in URI format.

In the present embodiment, as a data publication class DPUBCL, data publication or data use limited to a certain group member and data publication and data use limited to a certain network domain are performable.

Thus, as user attribution data USBL shown in FIG. 10, there are data of group identification data GRP_ID of group to which users participate and network domain NDM_ID to which user devices are registered. With the data, to what extent the data publication/use is possible can easily be determined.

On the other hand, there are users who will agree to publishing personal information if a publication fee is paid. Thus, a full open publication PUBOPN, in-domain limited publication PUBDMN, and specific member limited publication PUBMMB are prepared corresponding to the data publication class DPUBCL. Then, according to each publication condition, fees charged by users at the time of publication can be listed.

A charge fee (including publication ban data) PUBORG charged when raw sensor data before processing are published or are allowed for a third party to use is describable for each user. If "No", "Forbiddance", "Forbidden Condition", or the like are described herein, data publication or use by a third party are banned.

For example, in a video or an image of high definition (high resolution) where a certain person is included, identification of the person is easy and the data publication thereof is not preferred. However, when data are processed, and a video or an image becomes low definition (low resolution) or a video or an image show a face of the person blurred, identification of the person is difficult, and data publication may be allowed.

Thus, a charge fee (including publication ban data) PUBCDA at the time of publication of data process condition A (for example, degraded image quality) and charge fee (including publication ban data) PUBCDB at the time of publication of data process condition B (for example, blurring a face position) can be set individually.

As shown in FIG. 10, in the sections of full open publication PUBOPN, in-domain limited publication PUBDMN, and specific member limited publication PUBMMB, a charge fee (including publication ban data) PUBORG at the time of raw data publication, charge fee (including publication ban data) PUBCDA at the time of publication with the data process condition A and charge fee (including publication ban data) PUBCDB at the time of publication with the data process condition B (for example, blurring a face position) can be set, respectively.

In an example of description of FIG. 10, user U2 totally bans data publication. In contrast, user U3 bans full open publication and raw data publication in the in-domain limited publication PUBDMN. User U3 charges one dollar as a publication fee if the data process conditions A and B are satisfied in the in-domain limited publication PUBDMN, charges one dollar for raw data publication PUBORG as to the specific member limited publication PUBMMB and allows the publications PUBCDA and PUBCDB with data process conditions A and B for free (charge fee zero). Furthermore, user U1 defines publication fees for conditions.

Figure 11:
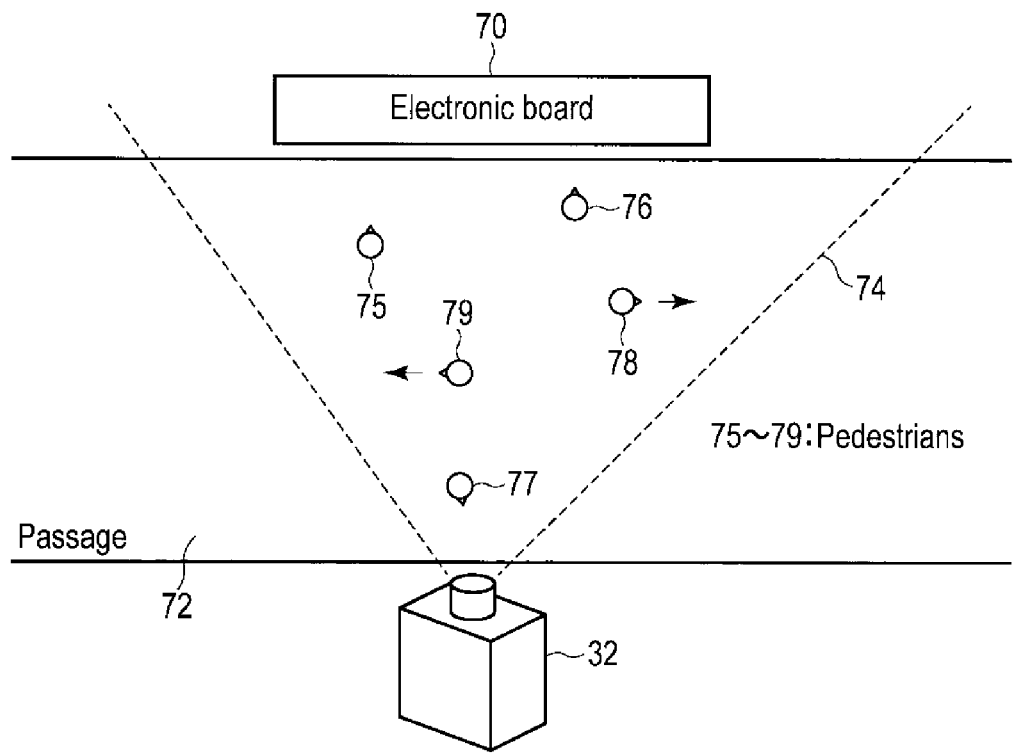
FIG. 11 shows an example of sensor data collection site.

Now, a method of using sensor data will be explained. In a method of using sensor data, identification of every user may not be required but identification of specific targets may be required in some cases. FIG. 11 shows such an example. For example, there is a case where advertisement contents displayed on an electronic board (digital signage) 70 are changed as time passes, and advertisement fees are collected based on pedestrians watching the ad or listening to the ad voice.

FIG. 11 shows an example where pedestrians 75 to 79 walk on a passage 72 and two pedestrians 75 and 76 stop and watch the electronic board 70. In such as case, only the number of people is grasped and identification data of each pedestrian are not necessary.

Figure 12:
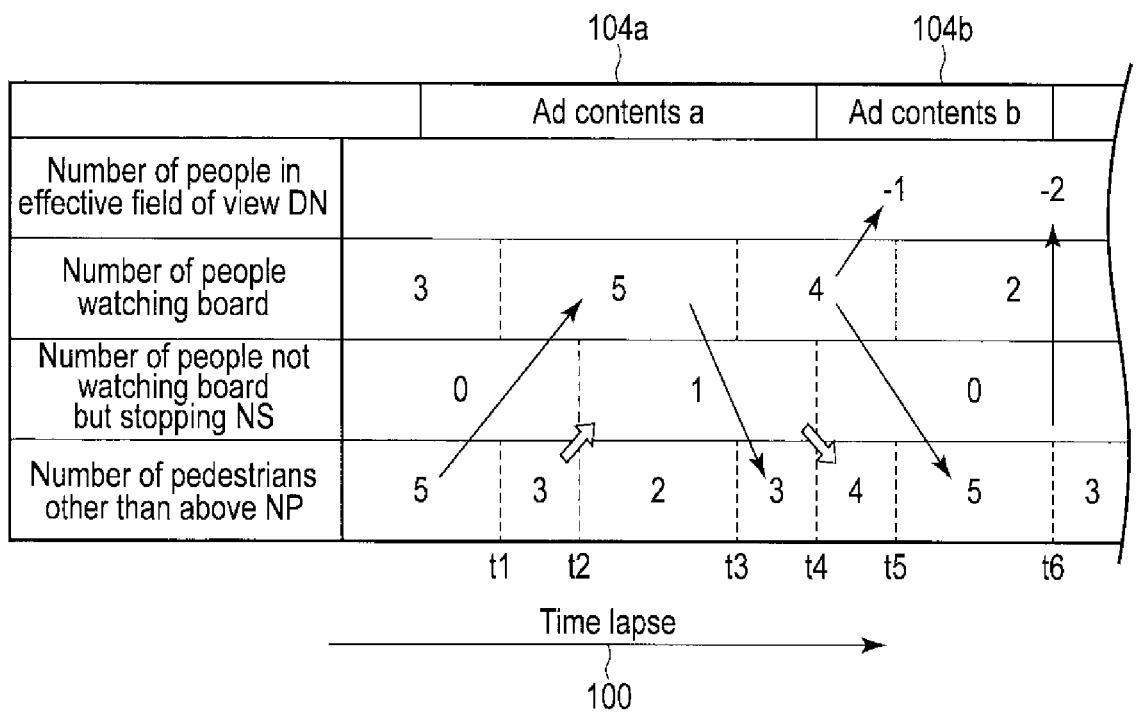
FIG. 12 shows a relationship between displayed advertisement and condition of a pedestrian.

FIG. 12 shows a variation of the use case of FIG. 11 along the time lapse 100. FIG. 12 shows an example where the contents of the display on the electronic board 70 change from an advertisement content a_104a to an advertisement content b_104b. When the advertisement content a_104a is displayed, the number NW of people watching the electronic board 70 increases from 3 to 5 in a time t1 and then becomes 4 in a time t3. Then, the advertisement content b_104b is displayed, the number NW decreases to 2 in a time t5.

The electronic board 70 outputs an image (video) and audio at the same time. Thus, some pedestrians who stop there but do not watch the electronic display board 70 may listen to the output audio. Thus, the number NS of people who does not watch the board but stop around it is monitored at the same time.

The number of people changes in times t1 to t6 along the time lapse 100 in FIG. 12. The device agent in the sensor device 32 or the edge agent 44 collecting the sensor data (cf. FIG. 1) analyze the sensor data and the communication data main body inner packs VALPCK-1, VALPCK-2 are automatically divided in times t1 to t6.

Figure 13A:
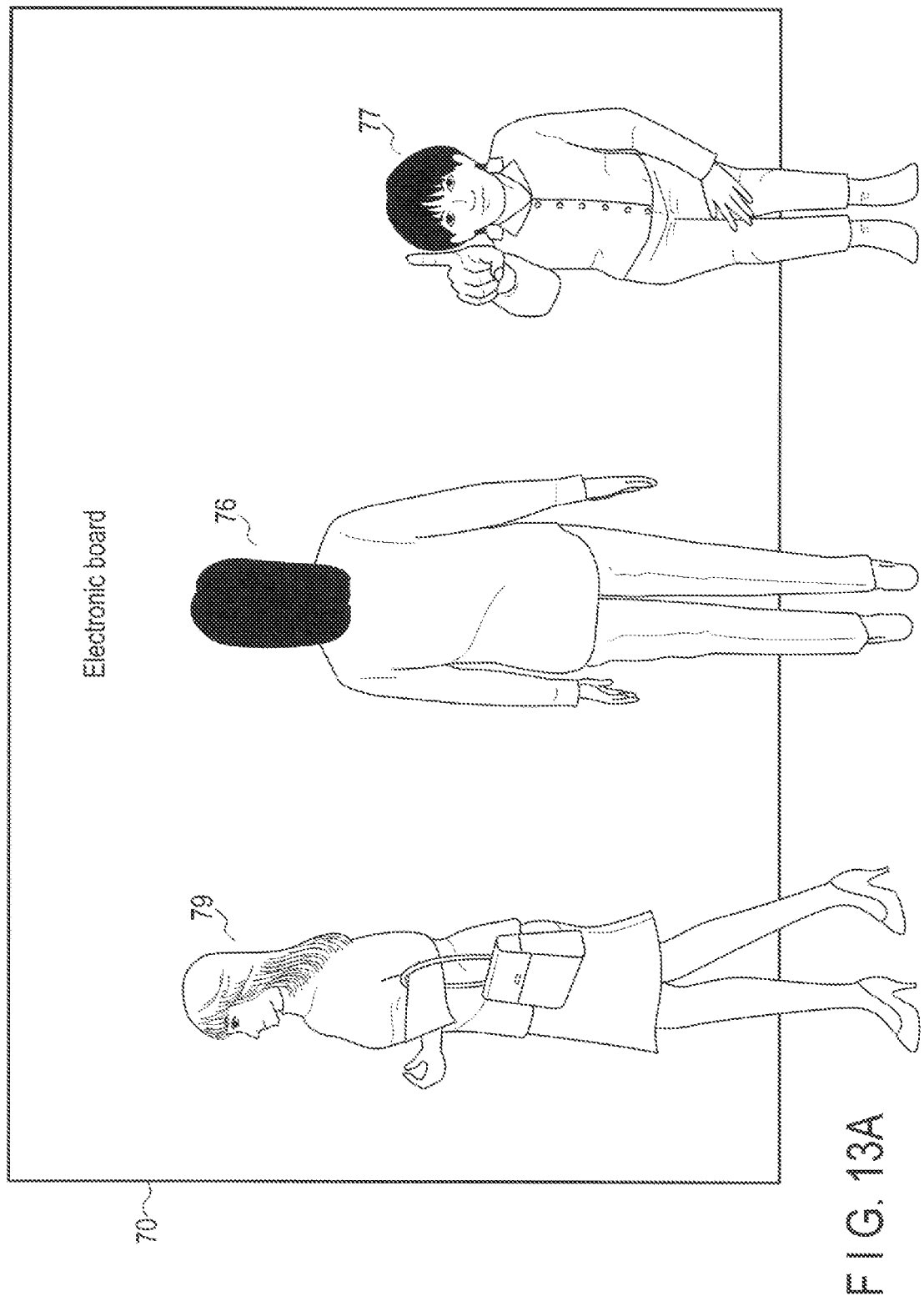
FIG. 13A shows an example of live sensor data captured by the sensor device.

An example of an image (video) captured by the sensor device 32 of FIG. 11 is shown in FIG. 13A. Since a pedestrian 77 faces to the sensor device 32, the front face of the pedestrian 77 is captured. The device agent in the sensor device 32 or the edge agent 44 collecting the sensor data analyzes this raw data and the face position is automatically detected. As shown in FIG. 13B, the face position may be blurred as a data process result.

The above series of process is shown in FIG. 14. Sensor data are collected by the sensor device 32 in step 31. Then, pack cut positions are automatically detected on the basis of the video/image analysis corresponding to times t1 to t6 in step 38 of FIG. 12, and a result thereof is used in automatic generation of the management packet MNPKT in step 51.

At the same time of sensor data collection by the sensor device 32, video/image of low quality (low resolution) is automatically generated in the device agent in the sensor device 32 or in the edge agent 44, and data buffering is performed together with raw sensor data (step 37).

Furthermore, in parallel, in the device agent of the sensor device 32 or the edge agent 44, automatic distinguishing process of uses by the face recognition (step 33), and each distinguished user is matched to the management data contents of FIG. 10 to extract a publication range and a charge fee of each user (step 35).

Then, on the basis of a result obtained in step 35, whether or not a publication condition matches between the raw sensor data and data processed per process condition in steps 41 to 43 in steps 41 to 43. Here, if the result of step 33 indicates that user U2 who does not allow data publication/use in the whole publication range is included in the senor data as a description content of FIG. 10, raw sensor data and all processed data per process condition are entirely discarded (steps 46 to 48).

Furthermore, as to the data conforming to the publication conditions in the determination of steps 41 to 43, all users related to each data content are automatically distinguished and the management packets are automatically generated on the basis of the total value of the charge fees of FIG. 10 (step 51). For example, if a specific communication data main body inner pack VALPCK in the data relates to five users, the publication charge fees of the five per data publication condition (per horizontal line of data publication condition data PUBCND) in FIG. 10 are summed and the total value is described in the publication fees FEEMMB, FEEDMN, and FEEOPN of FIG. 5(e).

In the present embodiment, users related to each communication data main body inner pack VALPCK in the data are identified, and setting of data publication/use by third party and charged fees in data publication/use can be determined finely. Thus, fine data publication/use services can be provided. Note that, in the example of FIG. 14, users related to the data are identified using the face recognition technique. However, in addition thereto, any optional method may be used as a user identification/recognition method of users related to data.

The management packet MNPKT automatically generated in step 51 of FIG. 14 is inserted into (multiplied in) raw data or processed data in step 52 according to a format of FIG. 5(b).

Furthermore, in the stage of data storage in step 53, the data publication class DPUBCL is determined corresponding to the description contents of the data publication condition data PUBCND of FIG. 10 per raw data and data process condition, and the data are stored in a memory area corresponding to the data publication class DPUBBCL described in the memory area management data RDMG in FIG. 16.

In the present embodiment, as described above, data are preliminarily stored in a memory area corresponding to a designated data publication class, and thus, a third party easily perform data retrieval of publishable/usable data.

Section 3.3 In-Domain Memory Area Expansion Method

In recent years, IoT related techniques are drawing wide attention, and data from various sensors are successively collected. Furthermore, in order to use the collected data effectively, data collected in the past are retrieved for the use in many cases. Thus, data successively collected are stored and accumulated in a memory. As a result, the amount of data stored in the memory becomes too large as the time passes. Thus, a data management method which can effectively use data stored in past regardless of characteristics and capacity of a memory storing data, or a device using the same method are required.

Here, an example of the structure to solve the above problem will be explained. In this example, as shown in FIG. 1, a case where original sensor data a, b, and c and analyzed data a', b', and c' are preliminarily recorded in a memory area of the memory device 22 will be explained. Then, in FIG. 19A, sensor data d and f collected by the sensor devices 32 and 34 are analyzed by the edge agent 44 to generate analyzed data d' and f'. Then, if the sensor data d and f and analyzed data d' and f' are stored in the memory area of the memory device 22, a recording capacity in the memory area may probably be used up.

If the past data a, b, a', and b' can be discarded, newly obtained data may be overwritten on the area where the data a, b, a', and b' are recorded. However, after such an overwriting process, use of the past data a, b, a', and b' becomes impossible.

In the present embodiment, for example, data obtained by managing the condition of the memory area such as an effective record capacity will be referred to as maintenance data. As a result of the maintenance data, a risk of approaching necessity of an overwriting process may be estimated in advance and a response process may be performed. As a risk to be estimated in advance in the example of FIG. 19A, for example, there is a condition where the effective record capacity is used up, and an overwriting process will be required if collection of the sensor data from the sensor devices 32 and 34 is kept (part of the sensor data and analyzed data obtained in past will be deleted).

The above problem is difficult to be solved when a single memory area of the memory device 22 is considered. To deal with this matter, the memory area cooperates with other memory areas via a network line including the internet 2, a storage environment with high freedom can be provided. Specifically, data already recorded in a specific memory area can be moved to or copied in different memory areas. As a result, unnecessary erase process of the data is prevented, and the data already recorded can be used in future. That is, if a data recording process or a data resuming process is performed cooperatively between a plurality of memory areas connected to each other via the network line, a storage environment of high freedom with respect to various data storage requests which often cause the record capacity to exceed.

In the present embodiment, various cooperation methods of the memory areas can be adopted. For example, the cooperation of the memory areas may be achieved between the memory devices 20, 22, and 26. Although this is not shown, a plurality of memory devices 22 may be connected to one edge device 14 to achieve mutual communication between the memory devices 22. For example, even if a plurality of memory devices 22 are connected in a tree shape with the edge device 14 as its apex as in USB connection, independent communication between the memory device 22 may be performed. Specifically, if the devices are connected in series as in Small Computer System Interface (SCSI), communication between the memory devices 22 without the edge device 14 becomes further easy.

As will be described later with reference to FIG. 18, the device agents 42 and 46 resident in the memory devices 22 and 26 manage even physical characteristics in the memory areas. Thus, the device agents 42 and 46 can have the memory areas cooperate to use the memory areas effectively and a bit cost which means cost required to record one bit on a physical address can be lowered.

Figure 18:
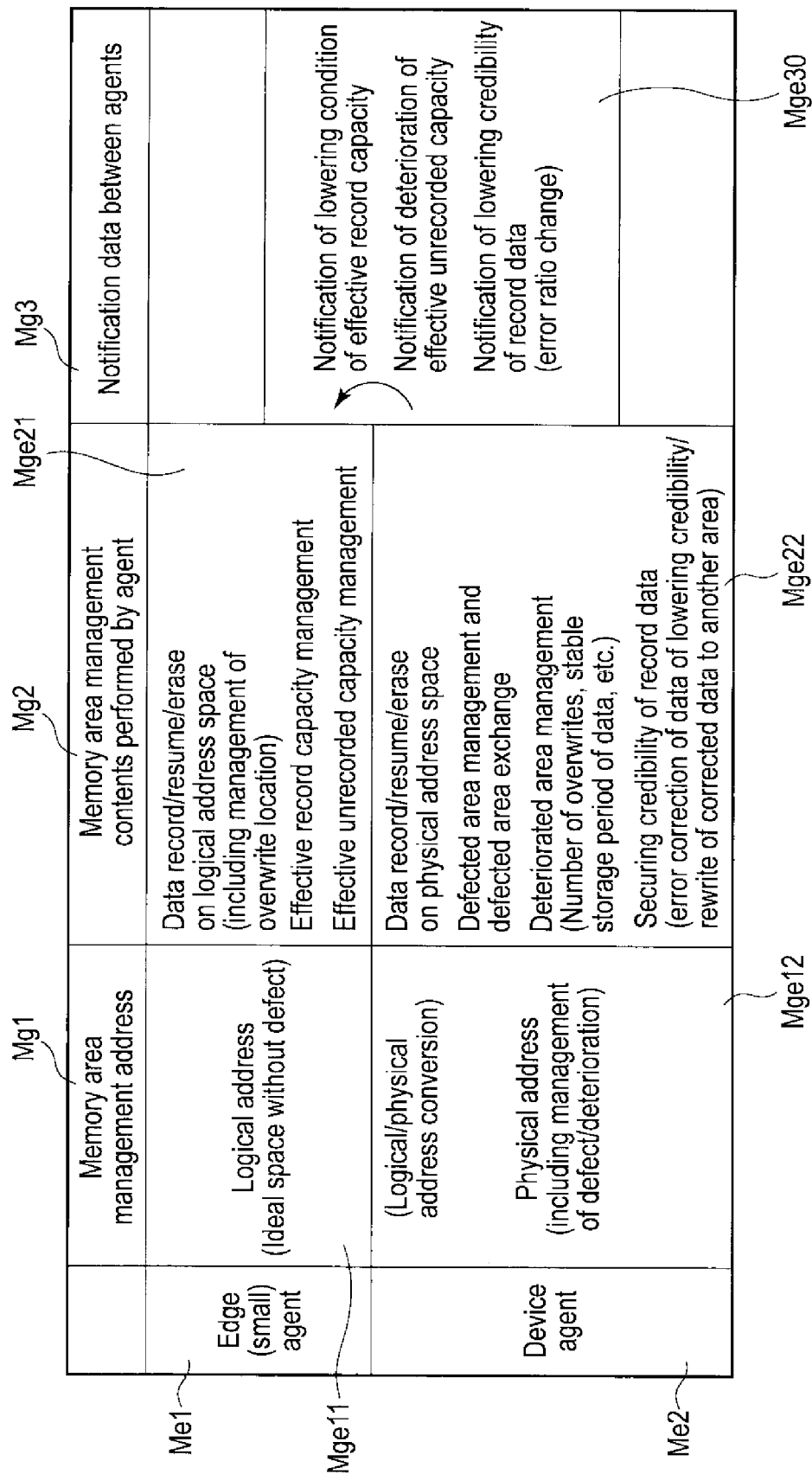
FIG. 18 shows roles of edge/small/device agents.

On the other hand, as shown in FIG. 18, the edge agents 44 and 47 resident in the edge devices 14 and 16 handle a logical address (ideal space) which is not defected in the memory areas and do not manage the physical characteristics of the memory areas. Thus, by performing a cooperative process of the memory areas between the edge agents 44 and 47, the maintenance costs can be reduced.

Furthermore, in addition to the above, the memory areas may cooperate between the dispersed server group 4 and the edge agents 44 and 47. In general, the record capacity of the memory 6 in the dispersed server group 4 is great, and furthermore, freedom of the process functions of the dispersed server group 4 is great. Thus, if the memory areas cooperate between the dispersed server group 4 and the edge agents 44 and 47, various data storage requests can be met flexibly. Thus, a storage environment with high freedom can be presented.

In the present embodiment, data of memory areas which can cooperate are obtained in advance, and the dispersed server group 4, edge agents 44, 47, and 48, and small agent 40 can use all cooperative memory areas freely. Thus, as compared to a process is performed by a single memory device 22, the record capacity of the entire memory areas will be significantly increased and freedom of data storage is increased.

Figure 19C:
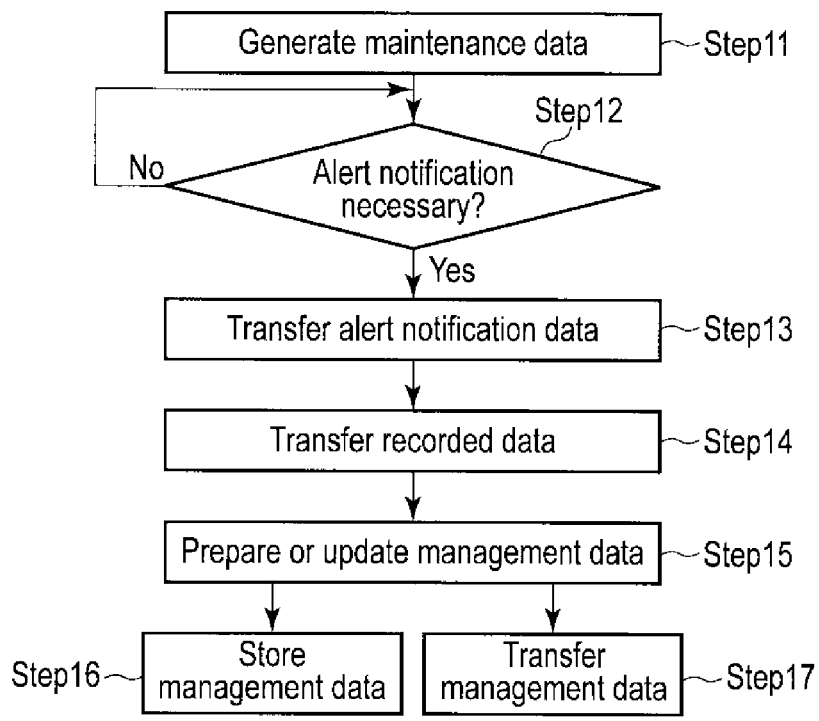
FIG. 19C is a flowchart of a method of changing a record location of storage data.
Figure 19A:
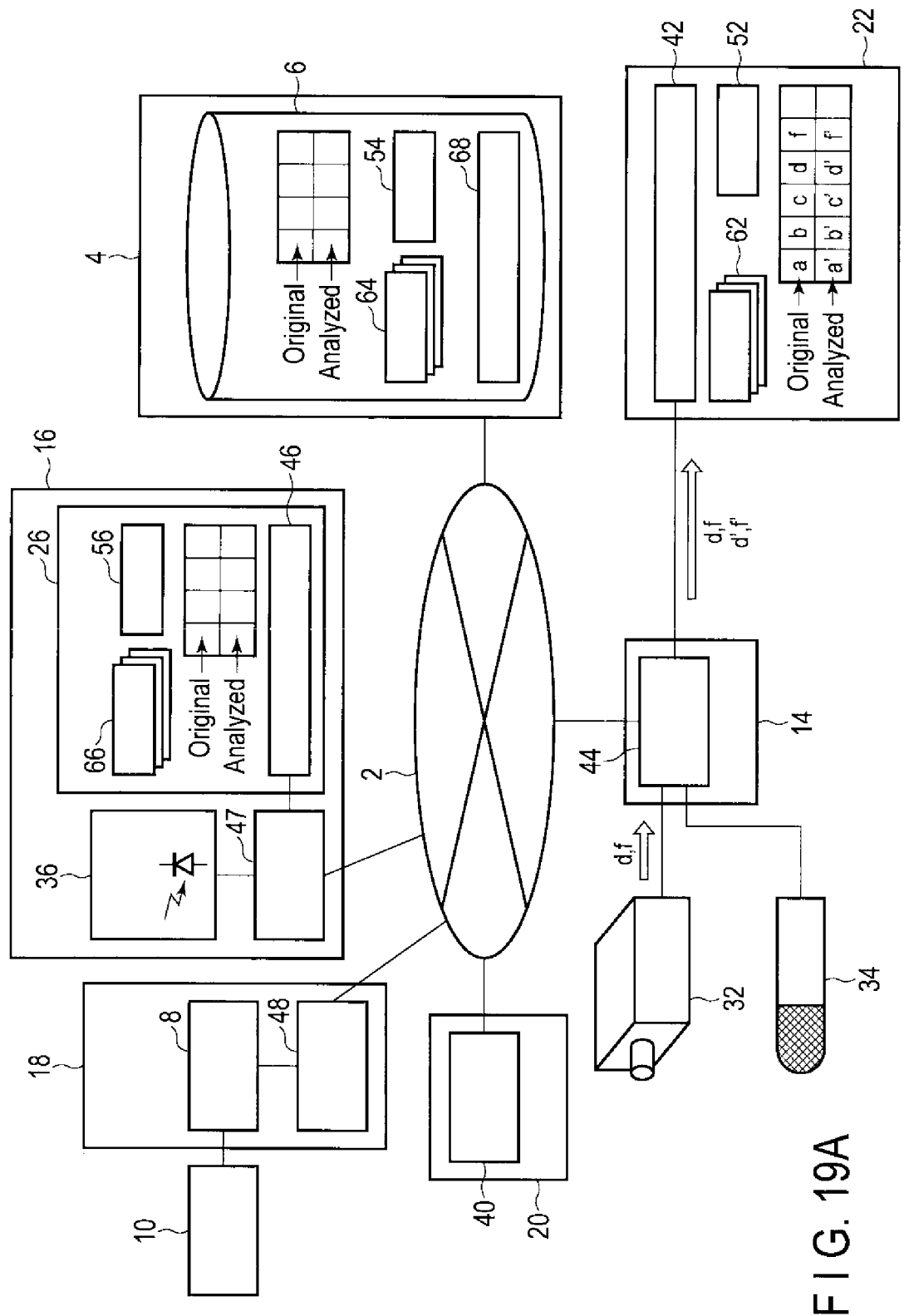
FIG. 19A shows a change of data recorded in the memory device.

For example, as shown in FIG. 19A, a record capacity may become insufficient in the memory device 22. In that case, if the edge agent 44 may include data of the memory device 22 alone, there may be a problem, and if the edge agent 44 includes data of the memory areas which can work in cooperatively in advance, there is an advantage. If the edge agent 44 does not know data of other memory areas, alert notification data must be transferred to the dispersed server group 4. Then, the dispersed server group 4 must find a data transference destination and reply the finding to the edge agent 44. Since the dispersed server group 4 must find a data transference destination and to send a reply, operation and management costs (maintenance costs) of the whole system increase, and this is a problem. In contrast, if the edge agent 44 knows the cooperative memory areas in advance, costs to find a data transference destination can be omitted, and the costs of the whole system can be reduced.

FIG. 15 shows a network connection relationship of FIGS. 1 and 19A. In the embodiment of FIG. 15, higher connection destination of each of the devices 20, 22, 26, 32, 34, and 36 and each of the edge devices 14, 16, and 18 is uniquely determined.

Specific contents of the edge/device table 68 stored in the memory 6 in the dispersed server group 4 of FIGS. 1 and 19A are shown in FIG. 16. Data of the whole structure of the present embodiment shown in FIG. 1 or 19A are collected in FIG. 16. The higher connection destination of each of the devices 20, 22, 26, 32, 34, and 36 and each of the edge devices 14, 16, and 18 is described in the higher connection destination UPCNT in the setting/arrangement EDDRIF of FIG. 16.

In FIG. 16, as type EDDR, devices and edge devices are classified, and identification data (ID data) of each device are stored in individual identification EDR_ID. Specifically, using data of IP address IPADRS of each of the devices 20, 22, 26, 32, 34, and 36 and each of the edge devices 14, 16, and 18 recorded in the edge/device table 68, direct data communication between one and another of the devices 20, 22, 26, 32, 34, and 36 and each of the edge devices 14, 16, and 18 is achieved. As explained in Section 2.1, when the data of IP address IPADRS are described in the area storing the receiver side IP address data DIPADRS in FIG. 3(b), the data communication via the internet 2 is performable.

In the memory area management data RDMG of FIG. 16 (edge/device table 68 in FIG. 19A), data related to cooperative memory areas are gathered. The memory areas in the memory devices 20, 22, and 26 of FIG. 1 or 19A include one or more partitions, folders/directories or corresponding drive, and identification data FLD_ID is set therein. Furthermore, each memory area corresponds to the data publication class DPUBCL, and may be classified as a memory area which can fully open the data to anyone or can publish the data to a certain domain alone, or a memory area which can publish the data to certain group members, or a memory area which can publish the data to certain individuals. When the memory areas are classified by data publication class DPUBCL, data management and data publication management can be performed easily.

Furthermore, using the manager identification data MAN_ID indicative of a manager of each divided data area, a charge process at the time of publication can easily be performed. Specifically, every time when the data stored in a certain data area are viewed or used, a publication/use fee is paid to the manager corresponding to the manager identification data MAN_ID, and the publication/use fee may be distributed by the manager to individual user shown in FIG. 10. Furthermore, since a monthly fee corresponding to the number of bytes resumed/used is described in a dollar-base in the memory area use fee FEEMEM, the publication/use fee of each memory area can be easily calculated in the whole world.

Note that fee is charged in the present embodiment in A) a case where data already stored (raw data of sensor data, analyzed data obtained by processing/analyzing the raw data, and data related to control history of drive device) are published to or used by a third party member, and in B) a case where memory areas are rend to a third party member (a third party member use memory areas to store certain data).

The publication fees FEEMMB, FEEDMN, and FEEOPN of FIG. 5(e), Publication_Fee of FIG. 8(d), and publication charge fees PUBORG, PUBCDA, PUBCDB of FIG. 10 are fees to be paid for the service model of [A] while memory area use fee FEEMEM of FIG. 16 is paid for the service model of [B].

For example, in the example of FIG. 16, data prepared (participated to prepare) by Ando are stored in a memory area B corresponding to a full open data publication class DPUBCL in the memory device 22 managed by Suzuki. In that case, Ando pays monthly memory area rental fee corresponding to the stored data size (byte unit) in dollar to Suzuki.

Furthermore, if the data are resumed or processed/edited by Kato, Kato pays a publication fee to Ando. On the other hand, if the data are related to three people A, B, and C (for example, if A, B, and C are in the video data), Ando distributes the fee from Kato to A, B, and C corresponding to the charge fee described in the data publication condition data PUBCND of FIG. 10.

Note that, the total value of charge fee distributed to A, B, and C is preliminarily described in the publication fees FEEMMB, FEEDMN, and FEEOPN in FIG. 5(e). Thus, Kato may check whether or not the publication fee is suitable to determine whether or not the data resume or process/edit should be performed.

In the edge/device table 68, not only a certain domain but also devices 20, 22, 26, 32, 34, and 36 and edge devices 14, 16, and 18 in an optional range may be managed (may be registered in the edge/device table 68).

Figure 17:
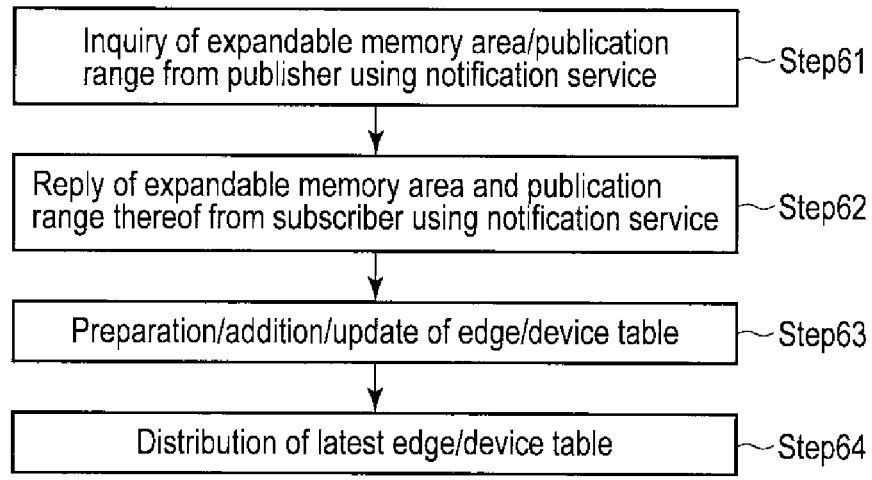
FIG. 17 shows a method of retrieving an expandable memory area in a domain.

A method to prepare the edge/device table 68 will be explained with reference to FIG. 17. Devices 20, 22, 26, 32, 34, and 36 and edge devices 14, 16, and 18 connected to the internet 2 or the like change constantly (connection and disconnection are repeated frequently), and thus, the edge/device table 68 is difficult to arbitrarily update.

Thus, the dispersed server group 4 or the agents 40, 44, 47, and 48 perform an inquiry if necessary via the network line, and replies are gathered in the edge/device table 68 and distributed to related devices (other dispersed server groups 4 or agents 40, 44, 47, and 48). Thus, flexibility of preparation of the edge/device table 68 preparation is improved, and scalability of the whole network system is improved.

For example, a Publish/Subscribe messaging model is proposed in Java (registered trademark) Message Service (JMS), for example. This is a messaging model where the same message (data) is sent to n, and the message sender is referred to as publisher and the message receiver is referred to as subscriber. Thus, optional agents 40, 44, 47, and 48 including the dispersed server group 4 can be publisher and subscriber. Furthermore, an inquiry service (environment) in the Publish/Subscribe messaging model will be referred to as notification service.

When the edge/device table 68 is prepared, the publisher requiring the edge/device table 68 uses notification service in step 61 to inquire an expandable memory area and data publication class DPUBCL (including memory area use fee FEEMEM).

The subscriber receives the inquiry in step 62 and sends a reply of the expandable memory area and data publication class DPUBCL (including memory area use fee FEEMEM). Based on the reply, the publisher prepares or adds/updates the edge/device table 68 (step 63), and a result is distributed to the related devices (step 64). Note that the edge/device table 68 distributed here is stored as a part of the management data 62 and 66 in the memory device 22 and 26.

Here, the Publish/Subscribe messaging model is used to explain a flow of inquiry and reply. In the present embodiment, however, any type of message exchange can be performed. For example, instead of Publish/Subscribe messaging model of 1-to-n (multiple), a messaging method of bulletin board format of Social Network Service (SNS) written optionally may be adopted.

Note that, at the time of data communication related to the inquiry and reply, the communication data structure of FIG. 2 is used and the transference of data control data KEYPRT explained above with reference to FIGS. 4 and 6 to 8.

Section 3.4 Management and Network Communication of Maintenance Data

A difference in the management performed by the edge agents 44 and 47 (including a small agent 40) and device agents 42 and 46 in the memory device shown in FIG. 1 or 19A will be explained.

FIG. 18 shows a memory area management address (Mg1), agent-performed memory area management contents (Mg2), and in-agents notification data (Mg3) in the horizontal direction, and edge (small) agent (Me1) and device agent (Me2) in the vertical direction.

In many storage devices (memory devices) such as a semiconductor memory, hard disk drive, or optical disk, a memory area is managed using two addresses of the physical address and the logical address. The logical address is an address defined in an ideal space where no defect is found therein. However, in reality, defect areas and deteriorated areas are found in storage devices (memory devices). Thus, the physical address is used to manage such defected/deteriorated area locations.

In this example, the edge (small) agent only manages the logical address (ideal space without defect) (Mgel1) and the device agent mainly manages the physical address (including defected and deteriorated areas) (Mge12). Furthermore, a conversion between the physical address and the logical address is performed by the device agent.

Furthermore, the device agent performs management of defected area and switching process management of the defected area. Furthermore, the device agent performs deteriorated area management related to the number of overwrites, data security storage period. Furthermore, the device agent may perform, as a process of securing the credibility of record data, an error correction process of data with lowered credibility and rewriting process of the data after the error correction to another area, for example. Thus, the device agent performs data recording/resuming/erasing process on the physical address space (Mge22).

In comparison, the edge (small) agent mainly performs data recording/resuming/erasing process (including management of overwrite location/target data) on the logical address space (Mge21). In relation thereto, effective record capacity and effective unrecorded capacity are managed.

To assist the edge (small) agent to perform the above process, the device agents 42 and 46 notify a lowering condition of effective record capacity, deterioration condition of the effective unrecorded capacity, lowering condition of already-recorded data credibility (change of error ratio of the already-recorded data) to the edge agents 44 and 47 (Mge30).

Then, on the basis of the notification from the device agents 42 and 46, the edge agents 44 and 47 arbitrarily prepare maintenance data indicative of timely conditions in the memory areas, and the maintenance data are recorded in the memory device 22 as a part of the management data 62.

As shown in FIG. 19A, lowering unrecorded capacity in the memory area is detected by the device agent 42 and notification thereof is sent from the device agent 42 to the edge agent 44. Then, on the basis of the notification, the edge agent 44 performs update/generation of the maintenance data (step 11 of FIG. 19C).

Then, in step 12 of FIG. 19C, whether or no alert is required to the other edge agent 47 and the dispersed server group 4. When the sensor data collection continues from the sensor devices 32 and 34, the edge agent 42 refers to the above maintenance data contents and determines whether or not there is an overwrite risk in the location where the record data a, b, a', and b' are already recorded. Here, when a risk is detected, sensor data currently being collected, data publication class DPUBCL corresponding to the analyzed data, and data publication class DPUBCL in the edge/device table 68 shown in FIG. 16 are compared and a location where the record data a, b, a', and b' can be moved is identified. Then, in the example of FIG. 19B, the record data a, b, a', and b' are moved to the memory 6 of the dispersed server group 4 and the memory area in the memory device 26 at the same time.

When the data transference destination is determined, the edge agent 44 transfers alert notification data indicative of shortage of the effective unrecorded capacity in the memory area in the memory device 22 (step 13 of FIG. 19C). Immediately after that, the record data a, b, a', and b' are sent to the transference destination in step 14 of FIG. 19C.

In that case, the data a, b, a', and b' are stored in the communication data main body VALPRT of FIG. 4(b), and the contents of IP address IPADRS described in the edge/device table of FIG. 16 are described in the storage area of the receiver IP address data DIPADRS of FIG. 3(b). Through the above, the memory areas are expanded via the internet 2. Specifically, in the present embodiment, when the data a, b, a', and b' are transferred, the data structure of FIG. 2 and data control data and communication data main body KEYVAL of FIG. 4(a) are formed, and thus, the network communication is achievable in the whole world even if the internet 2, intranet, or local network is used.

Then, the management data 62 are prepared, updated, stored, and transferred to the edge device 16 and the dispersed server group 4 according to steps 15, 16, and 17 of FIG. 19(c).

Figure 20A:
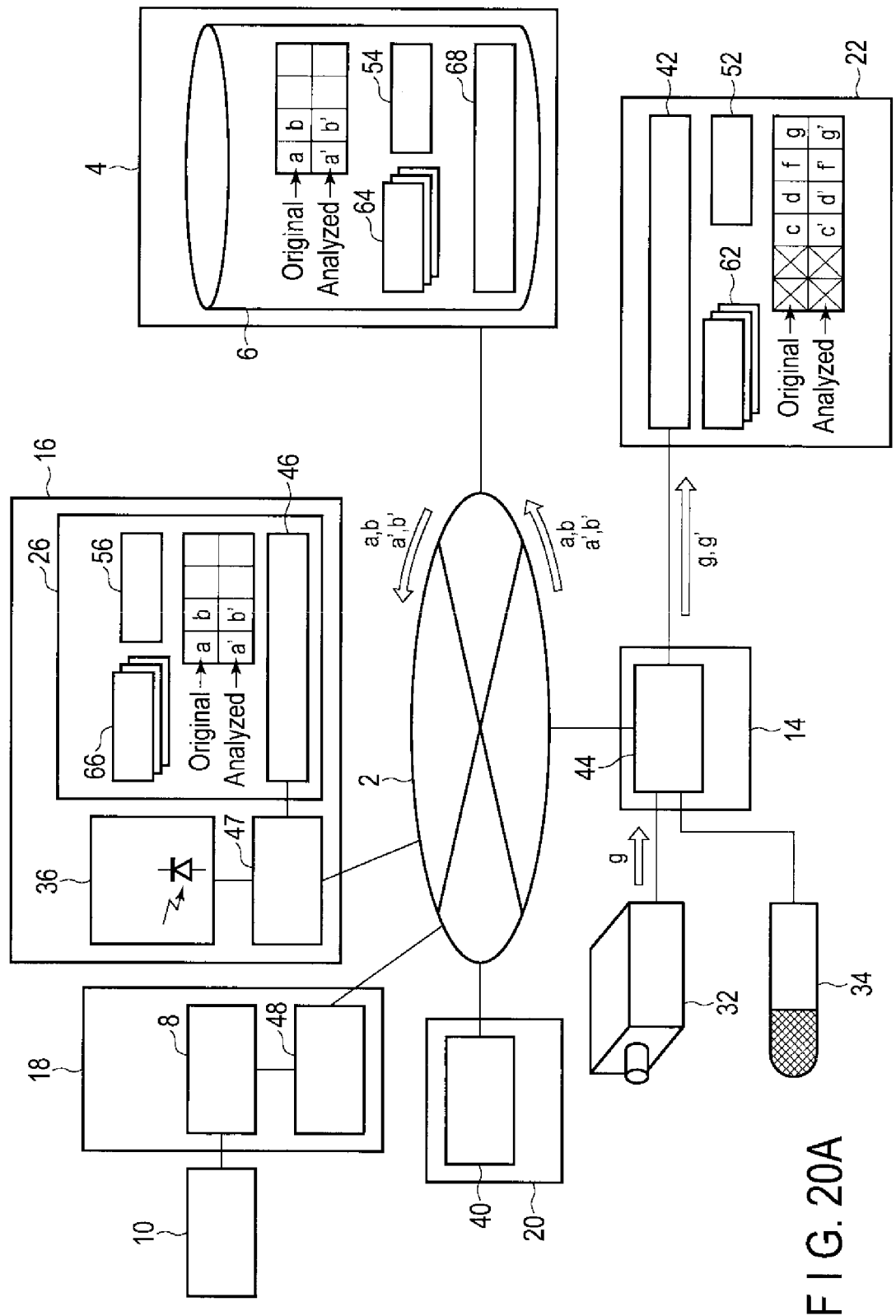
FIG. 20A shows a change of condition in the memory device.

There may be a case where the device agent 42 checks the condition of the memory area of the memory device 22, finds unusable area (location denoted by x in FIG. 20A) because the number of rewrites exceeds a threshold value in an area, for example, and the effective recorded capacity of the memory device 22 is below a security value and the effective unrecorded capacity is deteriorated. The process will be explained with reference to FIGS. 20A, 20B, and 20C.

In that case, the device agent 42 hands data which indicate that the effective record capacity is below the security value and the effective unrecorded capacity is deteriorated to the edge agent 44. In response to the data, the edge agent 44 generates or rewrites the maintenance data as in step 21 of FIG. 20C.

To determine necessity of issuing alert (step 22 of FIG. 20C), a risk where the maintenance data are used and the record data c, d, c', and d' are overwritten and deleted is determined. If there is a necessity of issuing alert, the process shown in FIG. 19C is performed similarly. Specifically, as shown in FIG. 20B, the record data c, d, c', and d' are moved to two locations in the memory 6 of the dispersed server group and the memory device 26 in the edge device 16.

Section 3.5 Method of Database Retrieval

Figure 19B:
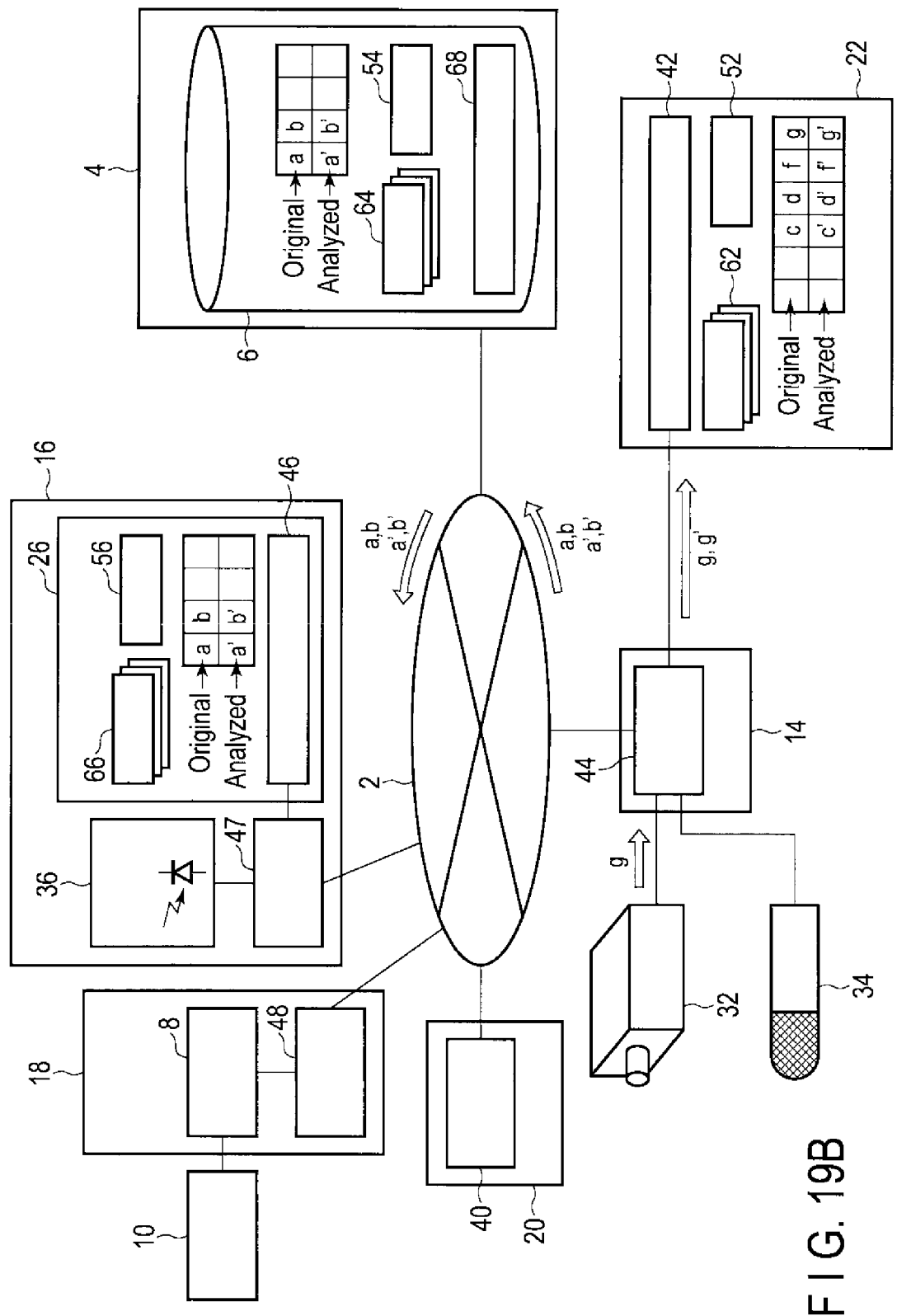
FIG. 19B further shows the change of data recorded in the memory device.
Figure 20B:
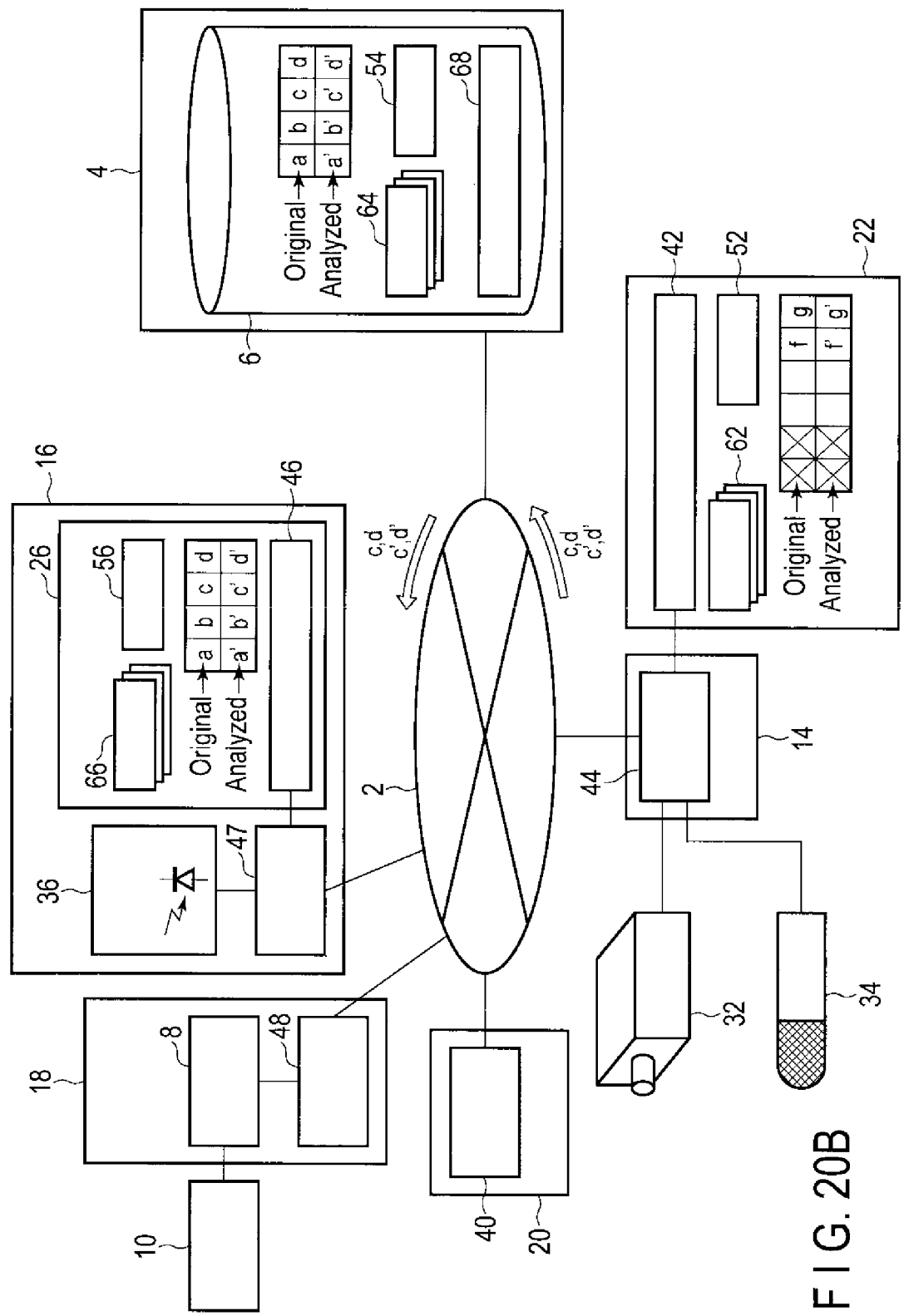
FIG. 20B shows a method of dealing with the change of condition in the memory device.

In the present embodiment, as shown in FIGS. 19B and 20B, a series of data a, b, c, d, f, g, a', b', c', d', f', and g' are dispersed in different memory areas. A retrieval method of dispersed data to resume and use the series of data altogether will be explained below.

In the present embodiment, as described in Section 3.3, dispersed data may be collected or used by inquiry and reply between the dispersed server group 4 and the agents 40, 44, 47, and 48 via the network line.

An example of such a data retrieval method using the Publish/Subscribe messaging model of Section 3.3 is explained with reference to FIG. 21. The publisher requiring collection or use of the data dispersed in the dispersed server group 4 or agents 40, 44, 47, and 48 uses the notification service to inquire the designated data storage location to the other dispersed server group 4 or agents 40, 44, 47, and 48 (step 71).

The, the dispersed server group 4 and agents 40, 44, 47, and 48 participating the storage of corresponding data use the notification service to reply the storage location of the designated data as a subscriber (step 72). In that case, the structure (a) of FIG. 2 is used. Then, in the control data CNTINF in the data control data and communication data main body KEYVAL (FIG. 4(c)), the above storage location may be descried in the description area of the data storage location TENTID of FIG. 6(b). Or, the storage location may be described in a certain format in the communication data main body VALPRT of FIG. 4(b).

After receiving the reply, the publisher prepares data resume table related to the designated data dispersed in the domain as in step 73 of FIG. 21. Then, in step 74, the data resume table is used to perform a data transfer request ("PUT" request of FIG. 7) to the subscriber which replied last time.

If the memory devices 20, 22, and 26 where the designated data are recorded are disconnected from the network line, an error correction process may be performed as described later in Chapter 4 to recover the credibility of the collected data (step 75).

Since the devices 20, 22, 26, 32, 34, and 36 and edge devices 14, 16, and 18 connected to the internet 2 or the like change constantly (connected and disconnected frequently), and thus, the scalability of the whole system increases with the above data retrieval method adopted.

Note that, as explained in Section 3.3, the data retrieval method of the present embodiment is not limited to the Publish/Subscribe messaging model and any type of message exchange model of 1-to-n and multi-to-multi messaging method such as bulletin board format of Social Network Service (SNS) environment.

Furthermore, in addition to a specific data retrieval method shown in FIG. 21, the above method can be used in retrieval of database of any model in the present embodiment.

Section 3.6 Method of Control of Pay-as-You-go

Section 3.6.1 Method of Control of Pay-as-You-go in Resuming Storage Data

Figure 22:
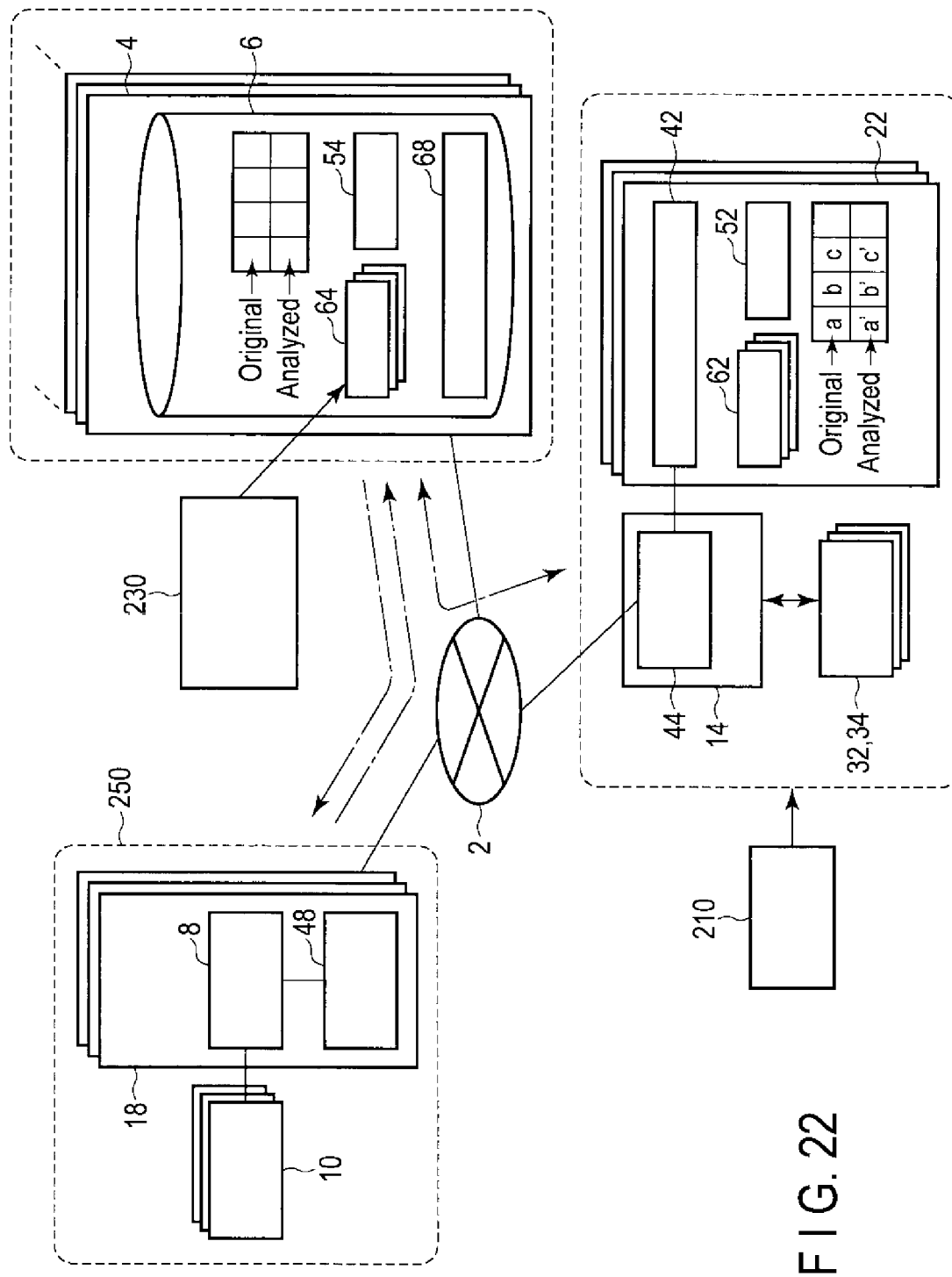
FIG. 22 shows an example of movement of charge target data via a network.
Figure 23:
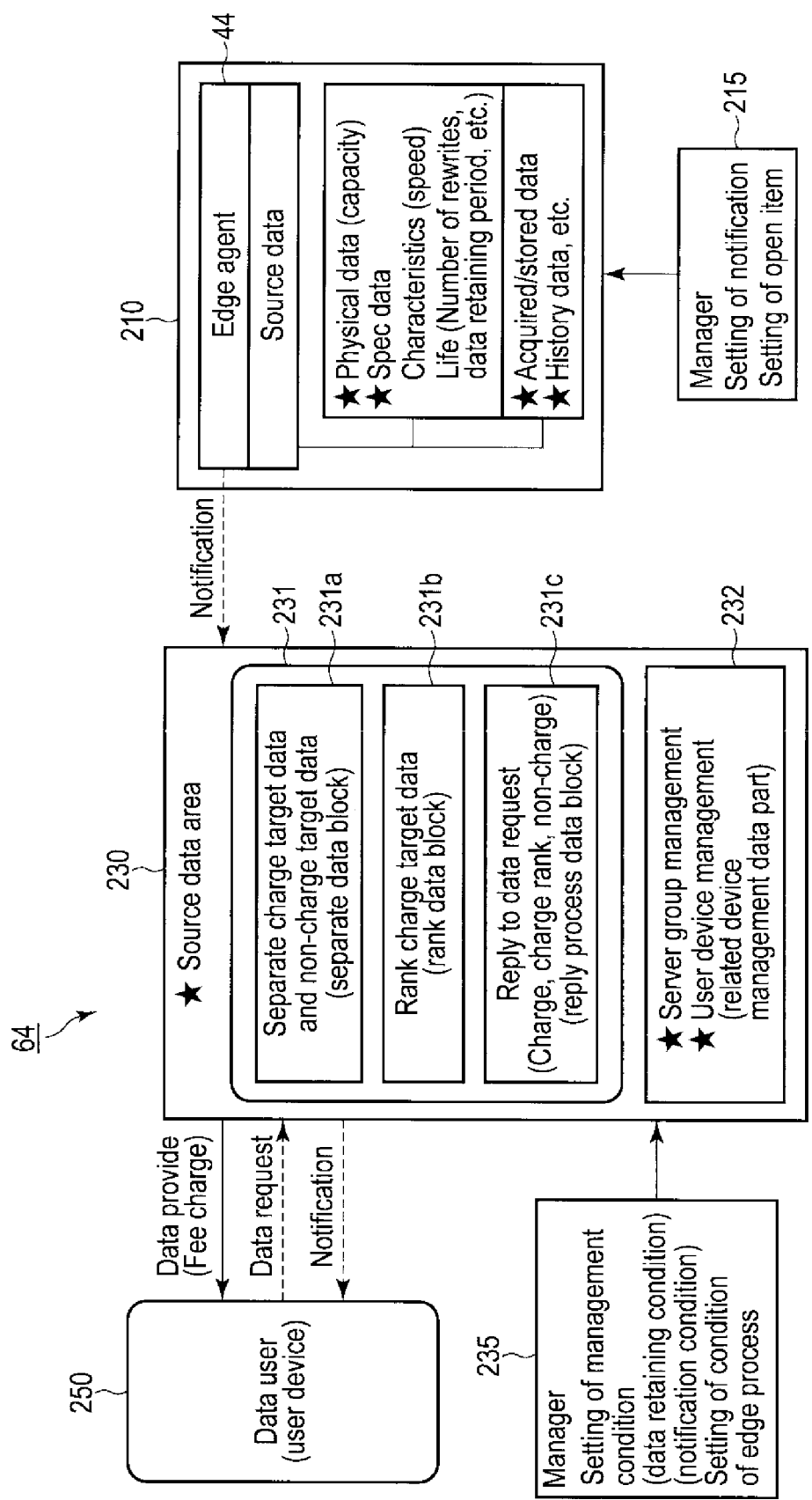
FIG. 23 shows an outline of a charge control method.

FIGS. 22 and 23 show how a charging process is performed when the dispersed server group 4 stores data in response to a request by a user and provides the stored data to a user. The memory device 22 and/or the edge device 44 described above may be regarded as a data generator 210. The data generated by the data generator 210 are managed in the dispersed server group 4, for example. Each server included in the dispersed server group 4 includes a controller (not shown) and management data 64. For example, the management data 64 may include a source data management area 230. Furthermore, each server is controlled by a corresponding controller, and various data explained below are processed based on the control by the controller.

The source data management area 230 includes a charge control data area 231, and the charge control data area 231 manages the data from the source data generator 210 and executes a charge process to a user when the data are used. A user side device is optional, and for example, a mobile edge device 18 is considered. A user side device is shown as user side device 250.

Note that data transferred/received via the internet are encrypted by the common keys 52, 54, and 56. The receiver side can decrypt the data using the common keys 52, 54, and 56. A common key 52 is prepared in the memory device 22, and a common key 54 is prepared in the memory 6. Note that the memory device 22 and the memory 6 do not perform encryption of data which can be published.

When the source data management area 230 provides data in response to a request from the user side device 250, the data is encrypted in the source data management area 230 on the basis of an encryption method preliminarily determined between the device and the area. Data required by a user and data prepared in the source data management area 230 include various data. Not only raw data received from the edge agent 44 but also data obtained from the data analysis in the server are therein.

The source data output by the data generator 210 include various data. As shown in FIG. 23, the source data include, for example, physical data, spec data, acquired and stored data, and history data. The physical data are data indicative of a physical value of a memory and of a memory capacity, for example. The spec data are data indicative of memory characteristics such as write speed and read speed. The spec data include data of memory life, and the data of memory life include a maximum value of rewrites and a value of data retain period indicative of data retaining performance.

In addition, the acquired and stored data include video data from cameras, audio data from microphones, detection data from sensors detecting temperature, humidity, pressure, chemical reaction, vibration, acceleration, distortion, and rotation number. Furthermore, the history data are data indicative of history of data transference and reception. The acquired and stored data may include additional data such as date of acquisition, location of acquisition, and weather data at the time of acquisition (temperature, humidity, fine, cloudy, rain, and snow).

The data generator 210 transfers (or notifies) the above data to a sever periodically or when a preset condition is satisfied.

The present condition is set based on the physical data and spec data. The condition is satisfied when, for example, a storage data amount exceeds a certain amount of the memory capacity, rewrites are performed above a certain number, or data retain period exceeds a predetermined period. The data are used in a basic maintenance work of an agent.

Furthermore, the condition may be satisfied when video data and audio data behave in a certain way (for example, brightness of video data is converted abnormally, video data cannot be acquired, color display by video data is abnormal such as all frames displayed in a single color of red, blue, or yellow), audio level of the audio data is zero or above the peak for a long period of time, and the temperature, humidity, pressure, chemical reaction, vibration, acceleration, distortion, and rotation number are abnormal (exceeding a preset threshold). Such data are related to data business.

The data generator 210 receives condition data from a notification condition setting device 215 on the basis of the control of the controller. The condition data are data to set a condition when data are transferred to a server from the data generator 210 and limitations to the transferred data (approval, ban, or the like). For example, a transference ban flag is added to data personally used and requiring secrecy. Furthermore, an encryption process in transferring the data may be omitted from data to be published.

Upon reception of the above data from the data generator 210, the server manages the data (received data) as a part of the management data 64. Now, a charge system will be explained.

The management data 64 include the source data management area 230 and therein a charge control data area 231 is provided. The charge control data area 231 receives data from the data generator 210, separates charge target data and non-charge target data, and stores or identifies the data separately. For data separation, the charge control data area 231 includes a separation block 231a.

The non-charge target data are mainly used for maintenance security of agents in the data generator 210 side. For example, if the storage data capacity exceeds a certain capacity, the rewrites exceed a certain number, and the data retain period exceeds a preset period, the source data management area 230 notifies the agents and/or the manager thereof.

The charge target data are used for data business. The charge target data include primary data directly received from the data generator 210 and secondary data independently processed in the source data management area 230. The secondary data are obtained by processing the primary data, combining the primary data with other data, or analyzing the primary data or processed data. An additional value (or rank) is added to the primary data and the secondary data. For ranking, the charge control data area 231 includes a ranking block 231b.

On the basis of the control by the controller, the source data management area 230 can provide data to the user side device 230 if requested thereby. Data provided may be charged data or free data. If the charged data are provided with the user side device 250, the source data management area 230 manages charge data. The charge data are managed in a response process block 231c in each user side device 250.

On the basis of the control by the controller, the source data management area 230 can receive condition data from a management condition setting device 235. The condition data include rank change data with respect to the charge data, and data provide control data to determine whether or not the data are provided to a certain user side device. The data provide control data are determined on the basis of a contract between the data provider manager and the device 250 manager. The contents of determination are put in the source data management area 230 from the management condition setting device 235 as the condition data.

The source data management area 230 includes a related device management data 232 to manage a server group and to register user devices (for example, user side devices 250). On the basis of the control by the controller, if a new user device accesses the server, the related device management data 232 acquire unique data of the new user device for control thereof. In a similar manner, the related device management data 232 can control a new server and a new data generator, for example.

The above explanation indicates a case where the user side device 250 requests data and the sever provides data in response to the request. Then, when the data are provided with the user side service 250, the charge process is performed. However, the charge process is not limited to a time of the above action (operation).

On the other hand, if data are published to all users, the charge process is not performed and the data are published for free.

Section 3.6.2 Method of Control of Pay-as-You-go in Changing Data Storage Location For example, a source data generator 210 may stock data temporarily in a server (or in the dispersed server group 4). Data sent from the source data generator to the server may be temporarily stocked. For example, if the number of rewrites of the memory used in the source data generator 210 exceeds a certain number, a data retain period may be over a preset period. In such a case, the source data generator 210 temporarily moves the data stored in the memory to the server. Then, the source data generator 210 requests a reply of the data moved to the server and performs rewrite of the data in a changed new memory or in a refreshed memory from which the data are deleted. In that case, since the data process is for a maintenance work, the server does not charge a data processing fee.

In the source data generator 210, a memory in use may be filled with memory data. In that case, the source data generator 210 notifies the memory condition data to the server before the capacity of the memory is filled with data. In general, if a memory capacity is filled, the source data generator 210 performs overwriting of the memory. In that case, old data stored in the memory are deleted in the overwrite process.

However, in the present embodiment, the source data generator 210 notifies the memory condition data to the server. The source data generator 210 notifies the memory condition data to the server as a pre-notification before the memory is filled with data.

Then, the server inquires the source data generator 210 how to deal with the data, specifically, whether the data are overwritten on the old data or are stocked in the server, and if the data are to be stocked, how long the data are secured, and the like. In response to the inquiry, the source data generator 210 determines whether or not the data are stocked in the server on the basis of condition data set in the notification condition setting device 215. Furthermore, on the basis of the condition data, a range of data to be stocked (a range of old data or data type) can be set.

When the data are stocked in the server, the source data generator 210 can designate the main server. The main server can perform a charge process depending on the data to be stocked. The server uses a method in which the fee becomes high when the data to be stocked are old (data stored in an early stage) and the fee becomes low when the data to be stocked are new (data stored recently). Furthermore, the source data generator 210 may weigh the data to be stocked to indicate importance of the data. In that case, when the weight of data increases, the fee is increased by the main server.

Chapter 4 Method of Securing Credibility of Dispersed Data and Management Data

FIG. 24 shows an example of securing data credibility and a basic idea thereof in the above embodiment. In a data credibility securing system, an area of dispersed data is worldwide and media to stock data may be memory media in various servers and/or agents.

In the present embodiment, the small agent 40, device agents 42 and 46, and edge agents 44 and 48 have a function to store data and a function to transfer data. Furthermore, the agents 40, 42, 44, 46, and 48 may need to temporarily stock the stored data to an external server or agent for a long or short period of time.

For example, the data may be stocked for a short period of time if a memory of an agent is repaired and inspected for some reason. For example, the data may be stocked for a long period of time if old data and history data are stored. In such a case, in the data credibility securing system, each agent converts a data block or a data file into an Error Correction Control (ECC) block group and stock each sector of each ECC blocks to be dispersed in a plurality of servers (6a, 6b, 6c, . . . ), and this will be referred to as a block-distribution arrangement.

One ECC block includes, for example, sixteen sectors, and one sector includes, for example, data of 13 lines. One ECC block includes an outer code parity PO and an inner code parity PI used for error correction, and the outer code parity PO is separated line-by-line and is embedded in one of the 13 lines of the sector.

Destination of each of the 16 sectors is maintained in the agent as management data (URL data). On the other hand, the server or the agent in the receiver side secures a data stock area in a part of the memory thereof. When the server or the agent in the receiver side stocks the data, the stocked data are related to the URL data of the destination agent and kept in the memory.

When the agent of sender side of the data collects the dispersed data, the URL data of each server are read from the management data and a request of the stocked data is sent to the server. Thus, sectors are collected from the servers and the ECC block is structured in the agent. Then, an error correction process is performed with respect to the ECC block, and the agent can restore the original data file or data block.

With the dispersed arrangement as above, even if collection of stock data is not performable from a part of servers, the original data can be restored within the error correction performance of the ECC block. Although the server group 4 is exemplified in the above description, no limitation is intended thereby. A data stock device can be expanded in the whole world when personal computers of ordinary users and corporate servers are partly used by contracting memory area rental managers. That is, in the present system, a data stock job can be expanded by memory area managers. As the data stock period of time varies in short, middle, and long, the fees for stock may be changed.

Note that, in the agents, when the original data are encoded into ECC blocks, the original data may preliminarily be scrambled. Thus, even if a part of the ECC block is not restored, the damaged location is dispersed in small pieces in the restored data.

Chapter 5 Another Embodiment of Edge Device

Aforementioned examples in Chapters 1 to 4 are based on the embodiment of FIG. 1. The edge devices of the present application may vary as in the following different embodiments.

For example, a factory or a manufacturing process may be regarded as one edge device as shown in FIG. 25. Furthermore, as shown in FIG. 25, a level network connection may be performed between a plurality of edge devices 314 and 318.

In FIG. 25, an edge agent 344 in a factory (edge device) 314 collects sensor data from various sensor devices 332 to 338 arranged in the process and performs condition monitoring of the factory. Setting conditions of detection required in the data collecting may be displayed to a user 310 by an image display 376. Furthermore, as an interface with a user 310, a voice interactive device 374 may be used.

The sensor data collected are partly sent to a dispersed server group 304, stored in a memory 306, and used in a machine study device 370. The dispersed server group 304, memory 306, and machine study device 370 perform collection, storing, and analysis of the sensor data.

Figure 26:
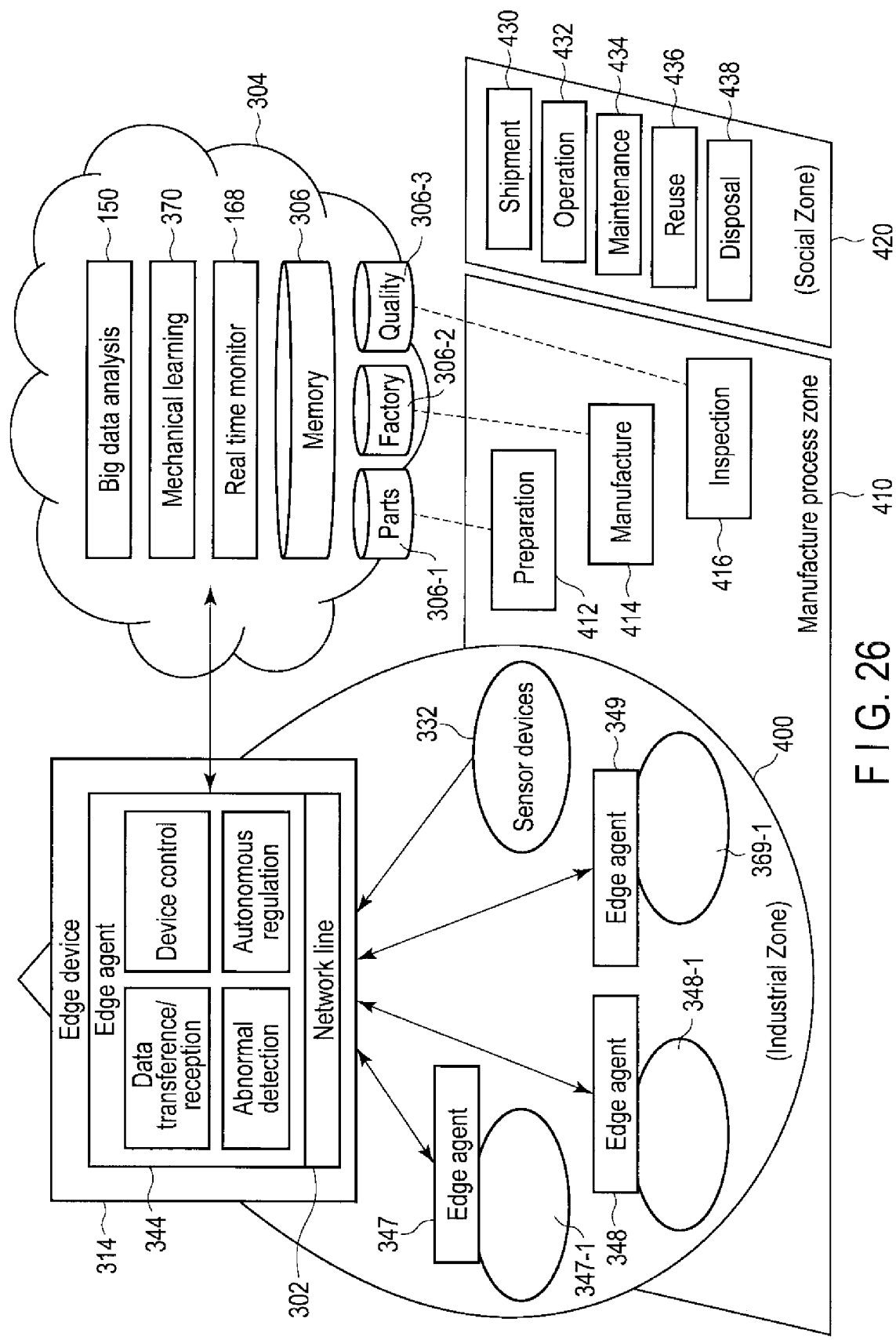
FIG. 26 shows an application example of the embodiment in a wide use scene.

As described above, the present embodiment may be applied to a worksite zone 400, manufacturing process zone 410, market zone 420 instead of the factory as shown in FIG. 26. In the example of FIG. 26, a plurality of edge devices are connected in levels. That is, in the manufacturing device, inspection device, and conveyor device corresponding to the edge devices, there are an edge agent 347 (edge device 347-1 of manufacturing device, for example), edge agent 348 (edge device 348-1 of inspection device, for example), and edge agent 349 (edge device 349-1 of conveyor device, for example). Various data are transferred from the edge agents 347, 348, and 349, and the sensor device 332 to necessary locations via the network line 302.

The edge agent 344 in the edge device 314 which manages and controls the whole worksite zone 400 autonomously controls data transfer control, abnormality detection, and device control.

In the dispersed server group 304 side connected to the edge device 314, a big data analysis 150, machine study 370, and real time monitoring 168 are performed. The memory 306 of the dispersed server group 304 includes data of member 306-1, data of factory management 306-2, data of quality management 306-3. The data of member are used to manage a preparation process 412, the data of factory management are used to manage a manufacturing process 414, and data of quality management are used to manage an inspection process 416.

In addition, in the market zone 420, edge devices and edge agents are arranged in a shipment side 430, operation site 432, security site 434, reuse site 436, and disposal site 438, and used for data communication and data keep/disclosure/use explained in Chapters 1 to 4.

Figure 27:
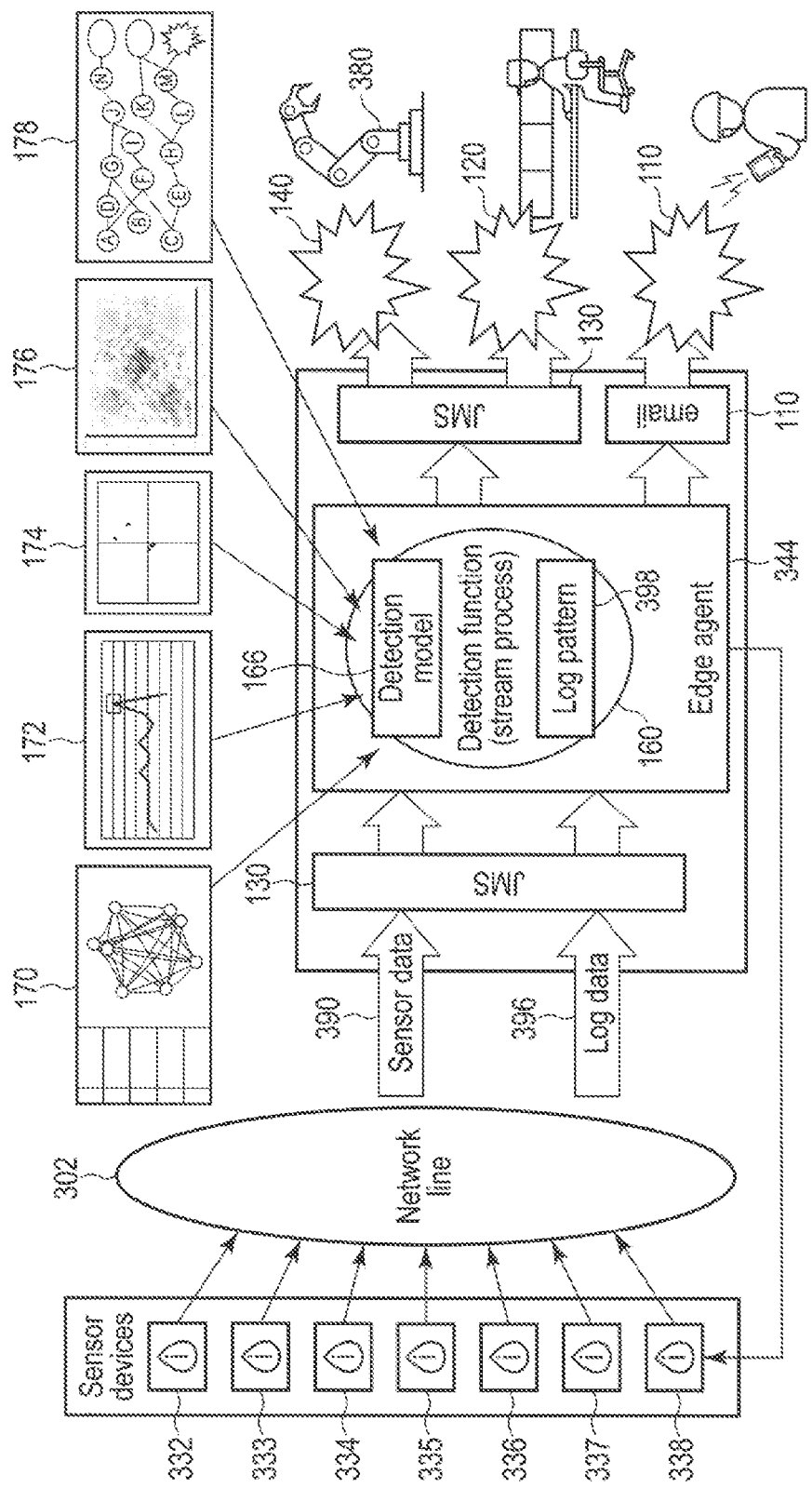
FIG. 27 shows a data analysis method of the embodiment in a wide use scene.

As an example of data analysis in Chapter 3, video analysis and image analysis of FIGS. 11 to 14 are explained. However, the data analysis of optional model may be performed in the present embodiment. FIG. 27 shows an example of the data analysis.

In FIG. 27, various sensor data 390 and various log data 396 from the sensor devices 332 to 338 are collected by the edge agent 344 with Java Message Service (JMS as explained in Sections 3.3 and 3.5) via the network line 302. A detection function (stream processing function) 160 of the edge agent 344 includes a function using a log pattern 398 and a function using a detection model 166.

The detection model 166 may be a multivariate correlation 170, Western Electric Company Rule (WECO) (3 sigma) 172, Mahalanobis Taguchi (MT) Method 174, clustering 176, event pattern 178, and the like.

Based on a result of the data analysis, the edge agent 344 uses JMA to perform automatic control 140 with respect to the drive device 380 and to issue alert 120. In addition, a notification or interaction with a specific user by mail 110 may be performed using the data of E-mail address EMADRS in individual user data USEINF of FIG. 10.

Furthermore, a using method of the result of data analysis is not limited to the above, and is applicable to any using method as in Chapter 3.

The edge devices in the above explanation is mainly a situated type. The present application, however, is applicable to a movable body (connected car, connected bus, connected truck, or the like).

Figure 28:
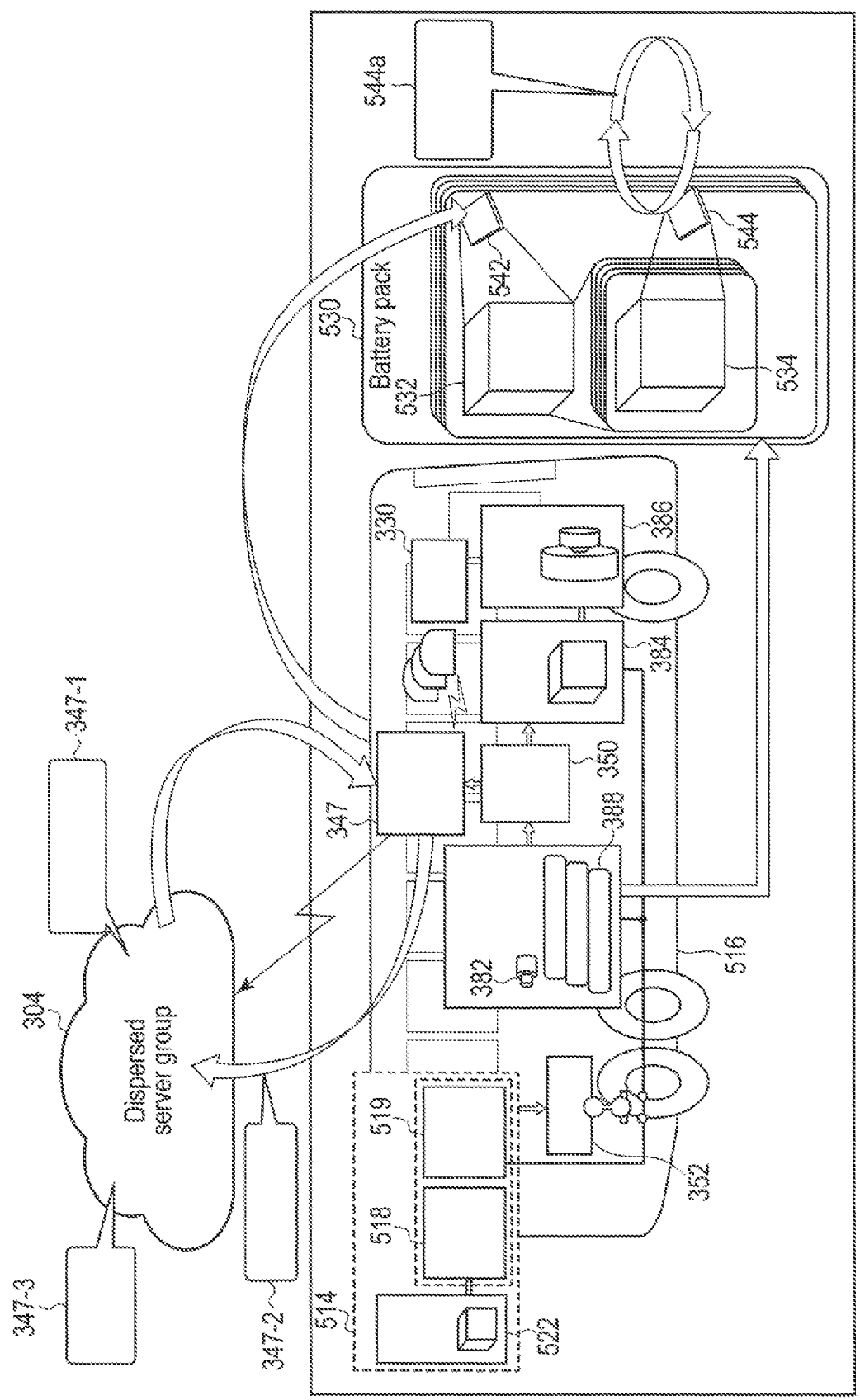
FIG. 28 shows an application example of the embodiment in a movable body which is connectable to the network.

As shown in FIG. 28, a large bus which is connectable to a network may be regarded as an edge device 516. A central control processor 350 (edge agent 347) disposed in the bus performs the control of battery pack 530, air cooling drive device 382 which is a drive device, inverter 384, and motor 386. The bus includes various sensor devices 330 and various sensor data can be transferred to the edge agent 347.

Furthermore, as shown in FIG. 28, a cloud-ready battery bank 532 is in the battery pack 530 and includes a plurality of cloud-ready battery modules 534. Furthermore, as device agents, a batter management unit 542 is disposed in the cloud-ready battery bank 532, and a cell monitoring unit 544 is disposed in the cloud-ready battery module 534.

The cell monitoring unit 544 can monitor a state of charge. Furthermore, when the battery pack 530 is charged, a charge percentage may be monitored, and connection/shutdown control of the charge power may be performed.

The edge agent 347 can download a battery condition parameter 347 suitable for a used battery from the dispersed server group 304 to calculate the battery condition. Furthermore, a battery condition grasp data 347-2 grasping the condition of battery in use (battery percentage and battery characteristics) may be uploaded to the dispersed server group. The dispersed server group 304 performs monitoring and diagnosis 347-2 of the battery used by the bus on the basis of the battery condition grasping data 347-2, and a result can be sent to the edge agent 347 (bus) as service data.

The bus further includes a charge device (edge device) 514. The charge device 514 includes a charge power source (device) 522, feed device (edge device) 518, receiver device (edge device) 519. When the receiver device 519 operates, the charge to each cell in the battery pack 530 is performed via the charge controller 352. The feed device 518 operates when the charge is performed with respect to other cars, for example.

Figure 29:
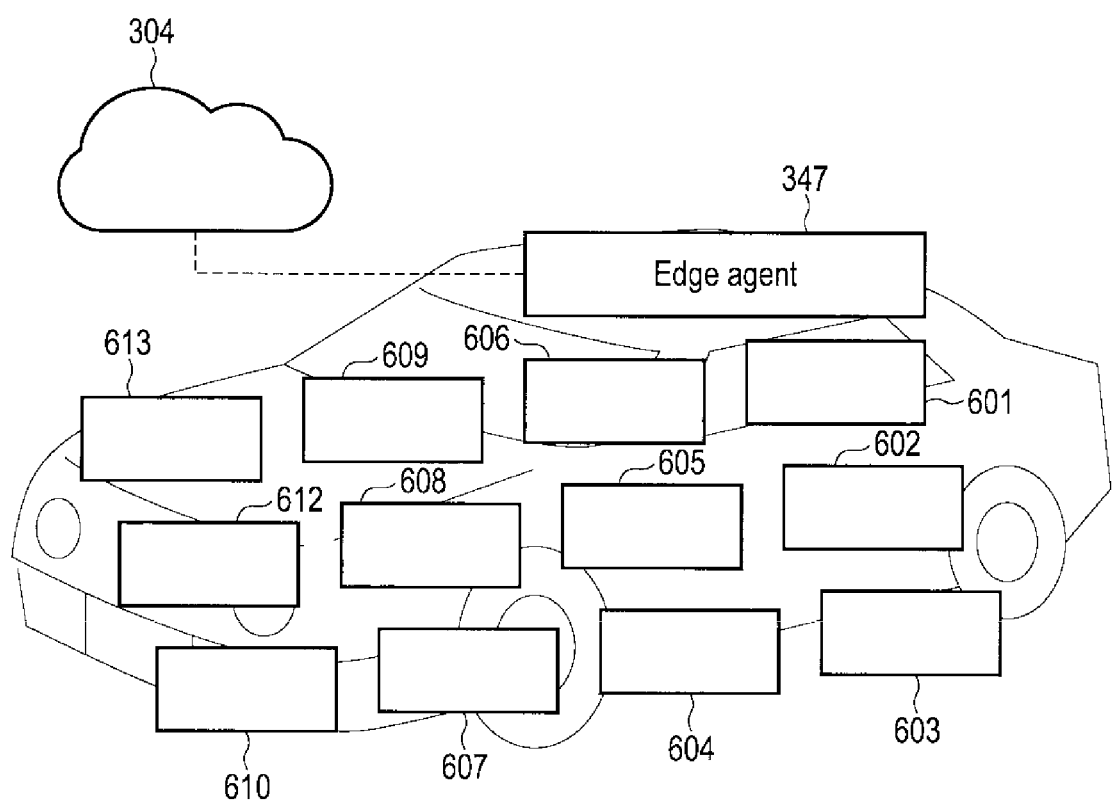
FIG. 29 shows sensor/drive in a movable body which is connectable to the network.

FIG. 29 shows various functions in an automobile (connected car) which is connectable to the network. As shown in FIG. 29, a seat control function 601, rear view monitor 602, antilock brake function 603, stability controller 604, precrush function 605, car navigator 606, power steering function 607, motor generator 608, engine control function 609, auto cruise function 610, lighting control function 612, millimeter wave radar 613 are included in the automobile, and they are managed/controlled by the common edge agent 347.

FIG. 30 shows functions of the edge agent 347. Output signals from various devices 632, special device 634, and edge device 618 are input in the edge agent 347 via an in-car network line. Furthermore, in the edge agent 347, there is an edge cooperative function part 676 to achieve cooperative operation with the edge device 618 in the car. The device controller 674 performs the control interface of the device 632 in the car and special input/output part 670 performs the interface with the special device 634.

Sensor data collected by the device 632 in the car are analyzed in the data processor 672. In addition, highly classified sensor data and analyzed data are security controlled by the security controller 620.

Furthermore, in the management function part 648 of FIG. 30, various functions of FIG. 29 are managed and controlled. Furthermore, the edge agent 347 stores a suitable transmission/reception controller 642 which corresponds to the cloud and communication condition, and a transmission/reception controller 644 corresponding to data types and emergency rate.

Furthermore, in the edge agent 347, could selection 646 to select a communication party (specific cloud) in the dispersed server group 304, traffic control 678 to solve a data communication trouble in the in-car network line, and data selection 622 based on a particular rule may be performed.

Specifically, a car-mount camera (sensor device) 339 may be used as means to monitor a driver 52 of a movable body and a condition of a passenger as shown in FIG. 31. In that case, the data analysis by the device agent 347 resident in the movable body includes, as shown in FIG. 31, performing big data analysis 150 (for example, tracking a peak of pressure of each individual and measuring spectral density of the peak) using data 150-1 including pulse number and the like, and performing image analysis 180 using captured image data 180-1 including an image of yawning of a driver. On the basis of the data analysis result, a notification may be issued to the driver 522, or a feedback may be made to a related employer 554.

From the data collected, quality data 711 of the car and its components, map data 712 from the image analysis, and environmental data from the voice analysis. Furthermore, using the quality data 711, market consideration data, quality consideration data 714 may be prepared, alarm data 715 and mailing data 716 may be prepared.

Note that the above embodiments are examples. Various data and their handling methods, management methods may be selectively combined, and various data, memory device (memory), memorization methods, communication methods, and data processing methods may be selectively combined as well, and are encompassed in the scope of the present invention. For example, in the communication method, the same contents may not be transferred on one channel or one stream between devices but may be dispersed in a several channels or several streams for communication. Furthermore, the areas handling the data may be combined arbitrarily, and a combination of personal devices, homes, factories, regions, spaces (including a flying object, for example) may be encompassed.

Furthermore, the data compression method is not limited to the example of the above embodiment and various methods (including newly found methods in future) can be applied. In addition, different data compression methods may be selectively adopted in a specific region or agent to increase secrecy of the data and to distinguish system use fees.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data management method using multiple edge devices connected to the Internet,
a format of communication data on the Internet including data control information and communication data main body,
the data control information including control information,
the control information including a description of storage locations of distributed data,
a first edge device including a first edge agent, the first edge device for acquiring original data,
a first memory device including a device agent, a first data area, and a first management information area, the first memory device for recording the original data,
a second edge device connected to the first edge device via the Internet including a second edge agent and a second memory device, the second memory device including a second data area and a second management information area, and
a third edge device connected to the first edge device via the Internet including a third edge agent and a third memory device, the third memory device including a third data area and a third management information area,
the method comprising:
when determining a risk of overwriting recorded data in the first data area by the device agent, performing cooperation between the first edge agent and the device agent;
distributing the recorded data to the second data area of the second memory device and the third data area of the third memory device by the first edge agent; and
at a time of the distributing, conveying the recorded data by the communication data main body, conveying a description of a storage location of the recorded data in the communication data main body by the control information, storing the communication data main body in the second data area and the third data area, and storing the control information including a description of storage locations of the distributed data in the second management information area and the third management information area wherein
the first edge device inquires of the second edge device and the third edge device for the storage locations,
wherein, if one of the description of data storage locations stored in one of the second edge device or third edge device is lost, the first edge device can use another one of the description of data storage locations.

2. The data management method of claim 1, wherein the original data is data from a sensor.

3. The data management method of claim 1, wherein the communication data main body includes image data, and
the data control information includes information about disclosure of the image data.

4. The data management method of claim 1, wherein the data control information includes charging information about use of the communication data main body.

5. A data management system using multiple edge devices connected to the Internet,
- a format of communication data on the Internet including data control information and communication data main body,
  - the data control information including control information,
  - the control information including a description of storage locations of distributed data,
- the system comprising:
  - a first edge device including a first edge agent, the first edge device for acquiring original data;
  - a first memory device including a device agent, a first data area, and a first management information area, the first memory device for recording the original data;
  - a second edge device connected to the first edge device via the Internet including a second edge agent and a second memory device, the second memory device including a second data area and a second management information area; and
  - a third edge device connected to the first edge device via the Internet including a third edge agent and a third memory device, the third memory device including a third data area and a third management information area, wherein
- when the device agent determines a risk of overwriting recorded data in the first data area, the device agent cooperates with the first edge agent,
- the first edge agent distributes the recorded data to the second data area of the second memory device and the third data area of the third memory device, and
- at a time of the first edge agent distributing the recorded data, the recorded data is conveyed by the communication data main body, a description of a storage location of the recorded data in the communication data main body is conveyed by the control information, the communication data main body is stored in the second data area and the third data area, and the control information including a description of storage locations of the distributed data is stored in the second management information area and the third management information area, wherein
- the first edge device inquires of the second edge device and the third edge device for the storage locations,
- wherein, if one of the description of data storage locations stored in one of the second edge device or third edge device is lost, the first edge device can use another one of the description of data storage locations.

* * * * *